(12) United States Patent
Yamamoto

(10) Patent No.: US 12,247,836 B2
(45) Date of Patent: Mar. 11, 2025

(54) IMAGE-PROCESSING METHOD, IMAGE-PROCESSING DEVICE, AND RECORDING MEDIUM

(71) Applicant: Evident Corporation, Nagano (JP)

(72) Inventor: Naoki Yamamoto, Hino (JP)

(73) Assignee: Evident Corporation, Nagano (JP)

( * ) Notice: Subject to any disclaimer, the term of this patent is extended or adjusted under 35 U.S.C. 154(b) by 300 days.

(21) Appl. No.: 17/729,280

(22) Filed: Apr. 26, 2022

(65) Prior Publication Data
US 2022/0357157 A1 Nov. 10, 2022

(30) Foreign Application Priority Data

May 6, 2021 (JP) .................................. 2021-078629

(51) Int. Cl.
| | | |
|---|---|---|
| *G01C 11/02* | (2006.01) | |
| *G06T 7/136* | (2017.01) | |
| *G06T 7/174* | (2017.01) | |
| *H04N 23/00* | (2023.01) | |
| *H04N 23/50* | (2023.01) | |

(52) U.S. Cl.
CPC .............. *G01C 11/02* (2013.01); *G06T 7/136* (2017.01); *G06T 7/174* (2017.01); *H04N 23/00* (2023.01); *H04N 23/555* (2023.01)

(58) Field of Classification Search
CPC ......... G01C 11/02; G06T 7/136; G06T 7/174; H04N 23/00; H04N 23/555
See application file for complete search history.

(56) References Cited

U.S. PATENT DOCUMENTS

2019/0068956 A1* 2/2019 Sakamoto ............ H04N 13/254

FOREIGN PATENT DOCUMENTS

| JP | 2011218090 A | 11/2011 |
|---|---|---|
| JP | 2019045249 A | 3/2019 |
| JP | 2019190918 A | 10/2019 |
| JP | 2020-149611 A | 9/2020 |
| WO | 2018042801 A1 | 3/2018 |

(Continued)

OTHER PUBLICATIONS

Yoichi Matsubara et al., "A Study on Pixel-wise Concurrent Calculation for Depth from Focus using Gray Level Variance", vol. 42, Issue 26, Aug. 2, 2018, 9-12, The Institute of Image Information and Television Engineers.

(Continued)

*Primary Examiner* — Diane D Mizrahi
(74) *Attorney, Agent, or Firm* — Scully, Scott, Murphy & Presser, P.C.

(57) ABSTRACT

An image-processing method includes a measurement step, an index calculation step, a comparison step, and a selection step. A processor measures a distance at each of two or more points in one or more images of a subject in the measurement step. The processor calculates a first index or a second index on the basis of the distance in the index calculation step. The processor compares the first index or the second index with a threshold value in the comparison step. The processor selects at least one image included in the one or more images in the selection step when the first index is greater than the threshold value or the second index is less than the threshold value.

18 Claims, 40 Drawing Sheets

(56) References Cited

FOREIGN PATENT DOCUMENTS

WO        2019239715 A1    12/2019

OTHER PUBLICATIONS

Colette A. Stott et al., "Pulsed Eddy Current Detection of Cracks in Multilayer Aluminum Lap Joints", IEEE Sensors Journal vol. 15, Issue: 2, Feb. 2015, 956-962.
Japanese Office Action dated Jan. 7, 2025 received in 2021-078629.

\* cited by examiner

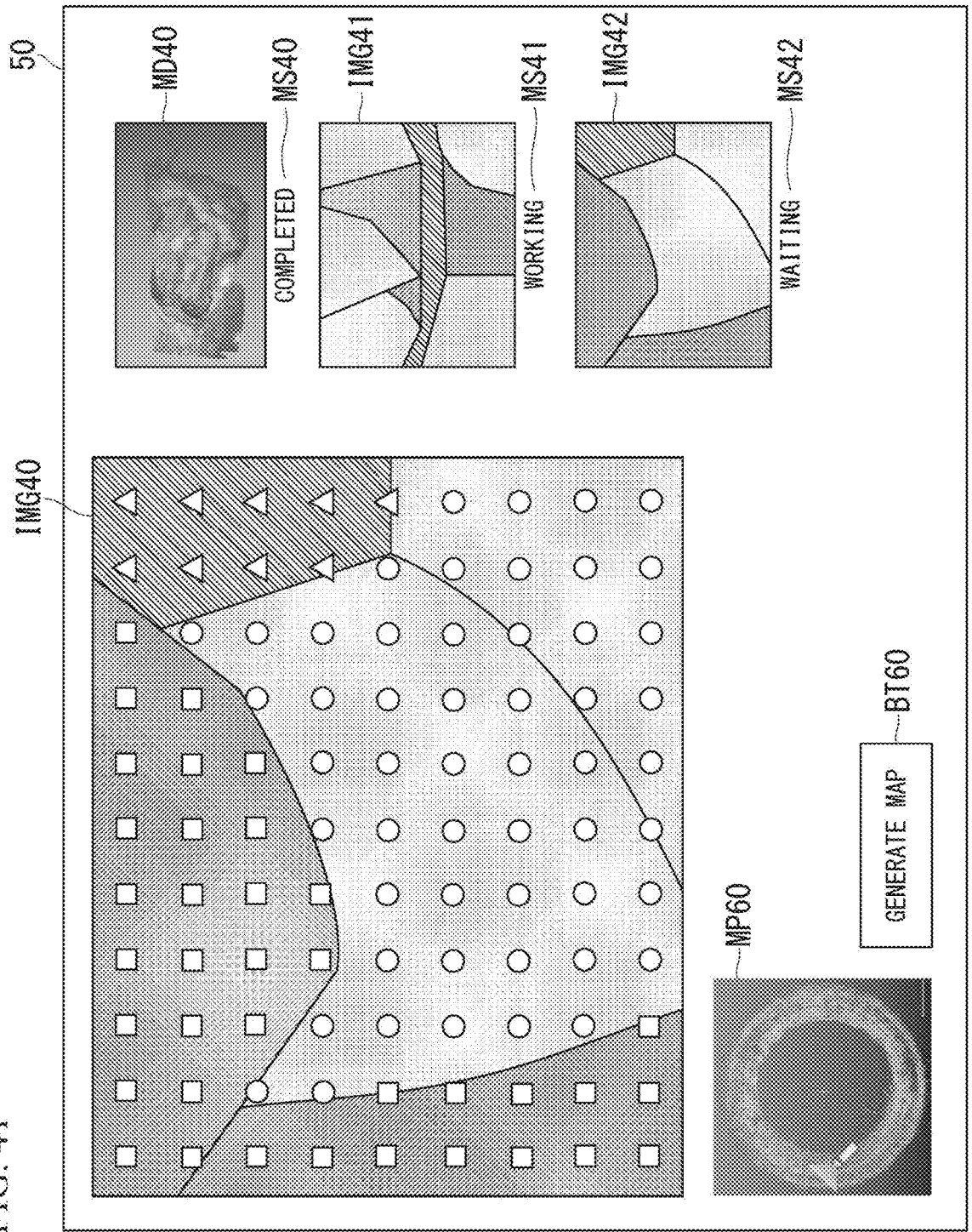

IMAGE-PROCESSING METHOD, IMAGE-PROCESSING DEVICE, AND RECORDING MEDIUM

BACKGROUND OF THE INVENTION

Field of the Invention

The present invention relates to an image-processing method, an image-processing device, and a recording medium.

Priority is claimed on Japanese Patent Application No. 2021-078629, filed on May 6, 2021, the content of which is incorporated herein by reference.

Description of Related Art

Industrial endoscope devices have been used for observation and inspection of internal damage, corrosion, and the like of boilers, pipes, aircraft engines, and the like. In such an endoscope device, multiple types of optical adapters for observing and inspecting various objects to be observed are prepared. An optical adapter is attached to the distal end of an endoscope and is exchangeable. In an inspection using such an endoscope device, there is a demand for quantitatively measuring the size of an abnormal region (defect, damage, or the like) of a subject. To meet this demand, an endoscope device having a three-dimensional measurement function (3D measurement function) has been developed. For example, such an endoscope device has a function of measuring geometric sizes of a subject on the basis of information of a point designated on an image by a user.

In addition, an endoscope device having a three-dimensional reconfiguration function (3D reconfiguration function) has been developed. Such an endoscope device calculates a three-dimensional shape (3D shape) of a subject and generates an image for visualizing the 3D shape. A user can determine the state of the subject by checking the 3D shape of the subject on the image. For example, the user can determine whether there is an abnormality such as damage is on the subject.

In a case in which an endoscope device has the 3D measurement function or the 3D reconfiguration function, the endoscope device calculates three-dimensional coordinates (3D coordinates) in a subject. There is a case in which an endoscope device acquires an unsuitable image for calculating 3D coordinates. Therefore, there is a case in which an endoscope device cannot calculate 3D coordinates in a region of a subject. Alternatively, there is a case in which large noise is included in the calculated 3D coordinates. In a case in which the 3D coordinates in the region are not calculated, an endoscope device cannot calculate the size of the region or a 3D shape of the region. In a case in which the calculated 3D coordinates include large noise, the size of the region or the 3D shape of the region includes a great error.

In a case in which the distance from the distal end of an endoscope device to a subject is long, there is a possibility that an unsuitable image for calculating 3D coordinates is acquired. In a case in which the distance is short, the surface of a subject looks large and bright in an image acquired by an endoscope device. Such an image is suitable for calculating 3D coordinates. In addition, in a case in which the distance is short, an image acquired by an endoscope device is generally suitable for calculating 3D coordinates by using a principle of triangulation.

In a case in which an endoscope device fails to calculate 3D coordinates or calculated 3D coordinates include large noise, the endoscope device needs to acquire an image again. Therefore, a burden on a user for operating an endoscope device occurs. While an endoscope device acquires an image, the user can check an image displayed by the endoscope device. However, the user needs to be highly skillful in order to determine whether a suitable image for calculating 3D coordinates has been acquired. A method for the user to check an image suitable for calculating 3D coordinates is necessary.

Japanese Unexamined Patent Application, First Publication No. 2020-149611 discloses a method of reducing the number of images used for inspecting a structure. In the method, an information-processing device selects an image on the basis of the size of a subject seen in the image. Specifically, the information-processing device selects an image in which a specific part looks the largest. Alternatively, the information-processing device selects an image such that the ratio of a subject included in an imaging range of the image is greater than or equal to a predetermined value. The information-processing device accumulates selected images.

SUMMARY OF THE INVENTION

According to a first aspect of the present invention, an image-processing method includes a measurement step, an index calculation step, a comparison step, and a selection step. A processor measures a distance at each of two or more points in one or more images of a subject in the measurement step. The distance indicates a three-dimensional distance from a camera that acquires the one or more images to each of the two or more points. The processor calculates a first index or a second index on the basis of the distance in the index calculation step. The first index increases as the camera nears the subject. The second index decreases as the camera nears the subject. The processor compares the first index or the second index with a threshold value in the comparison step. The processor selects at least one image included in the one or more images when the first index is greater than the threshold value or the second index is less than the threshold value in the selection step. The at least one image is an image used for calculating the first index greater than the threshold value or calculating the second index less than the threshold value.

According to a second aspect of the present invention, in the first aspect, the image-processing method may further include a distance-information display step in which the processor displays distance information on a display. The distance information indicates the distance at each of the two or more points.

According to a third aspect of the present invention, in the second aspect, the processor may display the one or more images on which the distance information is superimposed on the display in the distance-information display step.

According to a fourth aspect of the present invention, in the first aspect, the image-processing method may further include a classification-processing step and a distance-information display step. The processor classifies the distance at each of the two or more points into two or more groups including a first group and a second group in the classification-processing step. A range of the distance classified into the first group is different from a range of the distance classified into the second group. The processor displays first distance information in a first state on a display and displays second distance information in a second state different from the first state on the display in the distance-information display step. The first distance information indicates the distance classified into the first group. The second distance information indicates the distance classified into the second group.

According to a fifth aspect of the present invention, in the first aspect, the image-processing method may further include a recording step in which the processor records the at least one image on a recording medium.

According to a sixth aspect of the present invention, in the fifth aspect, the image-processing method may further include a shape calculation step in which the processor calculates a three-dimensional shape of the subject by using the at least one image recorded on the recording medium.

According to a seventh aspect of the present invention, in the sixth aspect, the image-processing method may further include a shape display step in which the processor displays the three-dimensional shape on a display.

According to an eighth aspect of the present invention, in the sixth aspect, the image-processing method may further include an image display step in which the processor displays the at least one image on a display.

According to a ninth aspect of the present invention, in the sixth aspect, the image-processing method may further include an image selection step in which the processor selects one or more images of the at least one image. The processor may calculate, in the shape calculation step, the three-dimensional shape by using the one or more images selected in the image selection step.

According to a tenth aspect of the present invention, in the first aspect, the image-processing method may further include a setting step in which the processor sets a measurement region in the one or more images. The measurement region includes the two or more points.

According to an eleventh aspect of the present invention, in the tenth aspect, the image-processing method may further include a region display step in which the processor displays each of the one or more images on a display and displays the measurement region on each of the one or more images.

According to a twelfth aspect of the present invention, in the tenth aspect, the processor may set the measurement region on the basis of region information input into an input device in the setting step. The region information indicates a position of the measurement region in the one or more images.

According to a thirteenth aspect of the present invention, in the tenth aspect, the image-processing method may further include a division step in which the processor divides an entire region of each of the one or more images into two or more partial regions. The processor may set the measurement region in at least one partial region included in the two or more partial regions in the setting step.

According to a fourteenth aspect of the present invention, in the first aspect, the processor may calculate the first index or the second index on the basis of the number of points at which the distance is less than a predetermined value among the two or more points, the number of points at which the distance is greater than a predetermined value among the two or more points, an average value of the distances at the two or more points, or a minimum value of the distances at the two or more points in the index calculation step.

According to a fifteenth aspect of the present invention, in the first aspect, the measurement step, the index calculation step, and the comparison step may be executed for a first image included in the one or more images. The measurement step, the index calculation step, and the comparison step may be executed for a second image included in the one or more images and different from the first image when the first index is less than or equal to the threshold value or the second index is greater than or equal to the threshold value.

According to a sixteenth aspect of the present invention, in the first aspect, the image-processing method may further include a position-information display step in which the processor displays position information indicating two or more positions on the subject on a display.

According to a seventeenth aspect of the present invention, an image-processing method includes a measurement step, an index calculation step, a comparison step, an output step, and a selection step. A processor measures a distance at each of two or more points in one or more images of a subject in the measurement step. The distance indicates a three-dimensional distance from a camera that acquires the one or more images to each of the two or more points. The processor calculates a first index or a second index on the basis of the distance in the index calculation step. The first index increases as the camera nears the subject. The second index decreases as the camera nears the subject. The processor compares the first index or the second index with a threshold value in the comparison step. The processor outputs, to an information-reporting device, comparison information indicating a result of comparing the first index with the threshold value or a result of comparing the second index with the threshold value in the output step. The processor selects at least one image included in the one or more images after the output step is executed in the selection step. The at least one image is an image used for calculating the first index or the second index.

According to an eighteenth aspect of the present invention, an image-processing device includes a processor. The processor is configured to measure a distance at each of two or more points in one or more images of a subject. The distance indicates a three-dimensional distance from a camera that acquires the one or more images to each of the two or more points. The processor is configured to calculate a first index or a second index on the basis of the distance. The first index increases as the camera nears the subject. The second index decreases as the camera nears the subject. The processor is configured to compare the first index or the second index with a threshold value. The processor is configured to select at least one image included in the one or more images when the first index is greater than the threshold value or the second index is less than the threshold value. The at least one image is an image used for calculating the first index greater than the threshold value or calculating the second index less than the threshold value.

According to a nineteenth aspect of the present invention, a non-transitory computer-readable recording medium stores a program causing a computer to execute a measurement step, an index calculation step, a comparison step, and a selection step. The computer measures a distance at each of two or more points in one or more images of a subject in the measurement step. The distance indicates a three-dimensional distance from a camera that acquires the one or more images to each of the two or more points. The computer calculates a first index or a second index on the basis of the distance in the index calculation step. The first index increases as the camera nears the subject. The second index decreases as the camera nears the subject. The computer compares the first index or the second index with a threshold value in the comparison step. The computer selects at least one image included in the one or more images when the first index is greater than the threshold value or the second index is less than the threshold value in the selection step. The at least one image is an image used for calculating the first index greater than the threshold value or calculating the second index less than the threshold value.

BRIEF DESCRIPTION OF THE DRAWINGS

FIG. 41 is a diagram showing an example of an image displayed on a display unit in the third modified example of the sixth embodiment of the present invention.

DETAILED DESCRIPTION OF THE INVENTION

Hereinafter, embodiments of the present invention will be described with reference to the drawings.

First Embodiment

Figure 1:
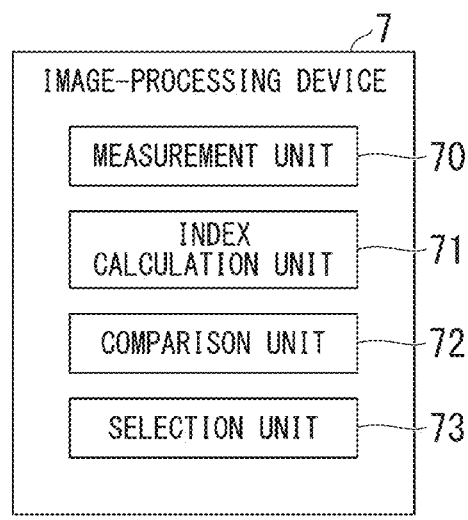
FIG. 1 is a block diagram showing a configuration of an image-processing device according to a first embodiment of the present invention.

FIG. 1 shows a configuration of an image-processing device 7 according to a first embodiment of the present invention. The image-processing device 7 shown in FIG. 1 includes a measurement unit 70, an index calculation unit 71, a comparison unit 72, and a selection unit 73.

The measurement unit 70 measures the distance at each of two or more points in one or more images of a subject (measurement step). The distance indicates a three-dimensional distance (3D distance) from a camera that acquires the one or more images to each of the two or more points. The index calculation unit 71 calculates a first index or a second index on the basis of the distance (index calculation step). The first index increases as the camera nears the subject. The second index decreases as the camera nears the subject. The comparison unit 72 compares the first index or the second index with a threshold value (comparison step). The selection unit 73 selects at least one image included in the one or more images when the first index is greater than the threshold value or the second index is less than the threshold value (selection step). The at least one image is an image used for calculating the first index greater than the threshold value or calculating the second index less than the threshold value.

Each unit shown in FIG. 1 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit shown in FIG. 1 may include one or a plurality of processors. Each unit shown in FIG. 1 may include one or a plurality of logic circuits.

A computer of the image-processing device 7 may read a program and execute the read program. The program includes commands defining the operations of the measurement unit 70, the index calculation unit 71, the comparison unit 72, and the selection unit 73. In other words, the functions of the measurement unit 70, the index calculation unit 71, the comparison unit 72, and the selection unit 73 may be realized by software.

The program described above, for example, may be provided by using a "computer-readable storage medium" such as a flash memory. The program may be transmitted from the computer storing the program to the image-processing device 7 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

Figure 2:
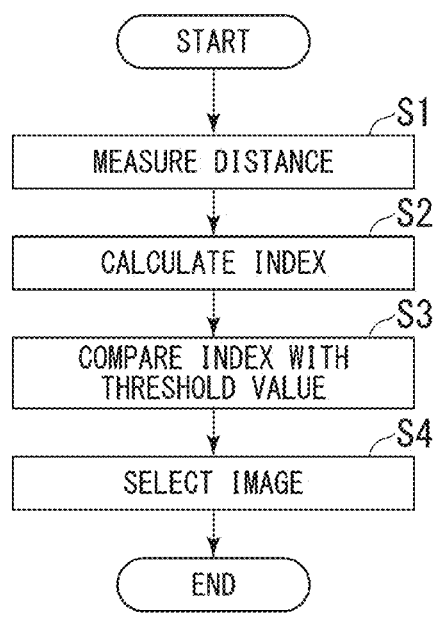
FIG. 2 is a flow chart showing a procedure of image processing in the first embodiment of the present invention.

Image processing in the first embodiment will be described by using FIG. 2. FIG. 2 shows a procedure of the image processing.

One or more images of a subject are used for the image processing. The image-processing device 7 may include a recording medium that stores the one or more images. Alternatively, the recording medium may be connected to the image-processing device 7.

The measurement unit 70 measures the distance at each of two or more points in the one or more images (Step S1). Step S1 corresponds to the measurement step.

The distance indicates the 3D distance from the camera, which acquires the one or more images, to each of the two or more points. The camera includes an imaging device and an observation optical system. The observation optical system leads light, which enters the observation optical system, to the imaging device. For example, the distance indicates the 3D distance from the imaging device or the observation optical system to each of the points. In a case in which two or more images are used, the measurement unit 70 measures the distance at each of the two or more points included in each of the images in Step S1.

For example, the above-described distance indicates the Euclidean distance between a reference point in the camera and each of the two or more points. In a case in which the X-axis and the Y-axis are perpendicular to the optical axis of the optical system of the camera and the Z-axis is parallel to the optical axis, the above-described distance may indicate the Z-coordinate of each of the two or more points.

After Step S1, the index calculation unit 71 calculates a first index or a second index on the basis of the distance calculated in Step S1 (Step S2). Step S2 corresponds to the index calculation step.

The first index or the second index indicates the number or the ratio (density) of measurement points. The measurement point indicates a point at which the above-described distance is calculated.

The first index and the second index indicate the proximity of the camera to a region of a subject. For example, the first index is set to a ratio of the number of first measurement points to the number of all the measurement points. The first measurement point indicates a point at which the above-described distance is less than a predetermined distance. The first index increases as the camera nears a subject. For example, the second index is set to a ratio of the number of second measurement points to the number of all the measurement points. The second measurement point indicates a point at which the above-described distance is greater than the predetermined distance. The second index decreases as the camera nears a subject.

Figure 3:
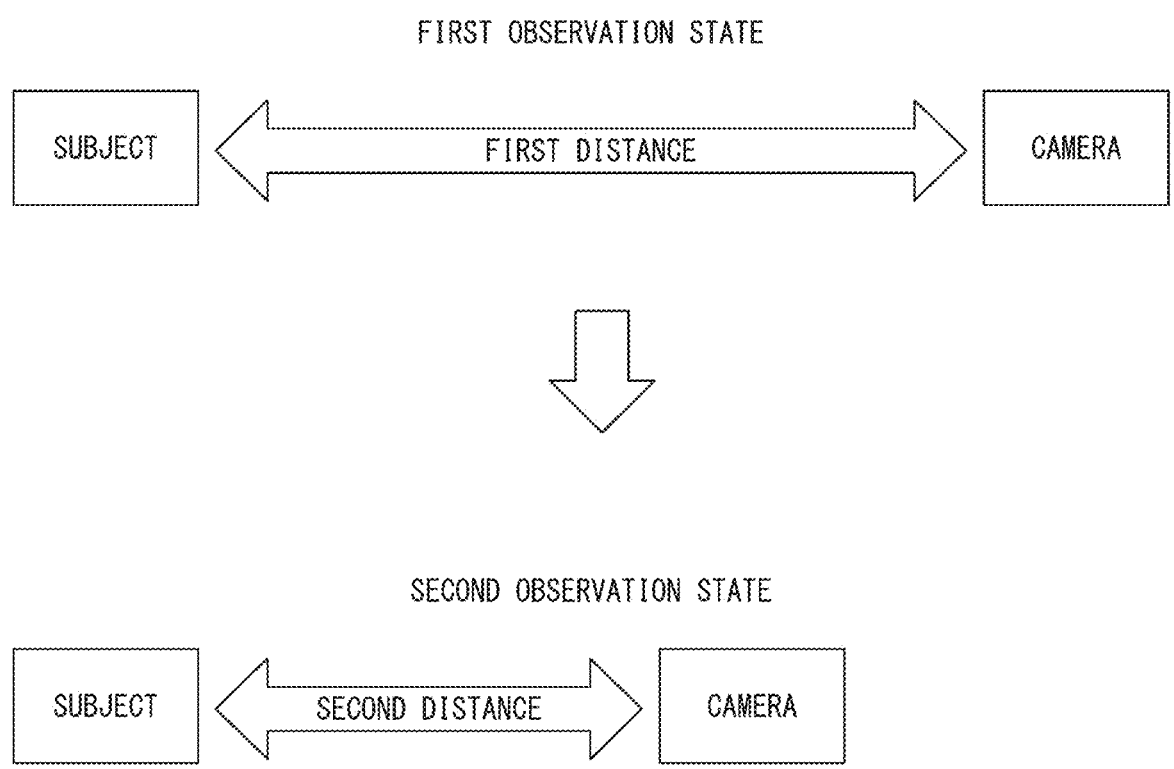
FIG. 3 is a diagram showing a change of the distance between a camera and a subject in the first embodiment of the present invention.

FIG. 3 shows a change of the distance between the camera and a subject. For example, the distance between the camera and the subject is a first distance in a first observation state. For example, the first index at this time has a first value. Thereafter, the camera nears the subject, and the first observation state changes to a second observation state. For example, the distance between the camera and the subject is a second distance in the second observation state. The first index at this time has a second value.

Figure 4:
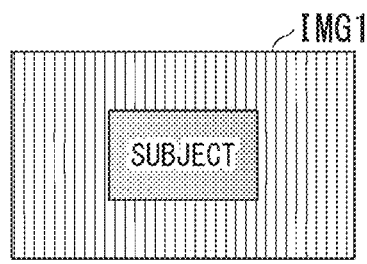
FIG. 4 is a diagram showing a change of an image in accordance with the distance in the first embodiment of the present invention.
Figure 4:
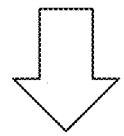
Figure 4:
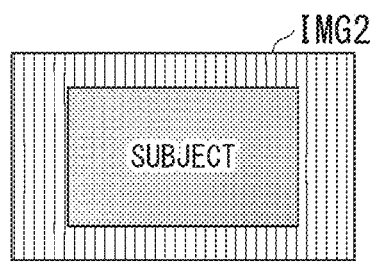

FIG. 4 shows an example of an image acquired by the camera in each of the first observation state and the second observation state. The camera acquires an image IMG1 in the first observation state and acquires an image IMG2 in the second observation state. In a case in which the second distance in the second observation state is less than the first distance in the first observation state as shown in FIG. 3, a subject seen in the image IMG2 is larger than a subject seen in the image IMG1. Therefore, the second value of the first index is greater than the first value of the first index.

For example, the distance between the camera and the subject is a first distance in a first observation state. For example, the second index at this time has a first value. Thereafter, the camera goes away from the subject, and the first observation state changes to a second observation state. For example, the distance between the camera and the subject is a second distance in the second observation state. The second index at this time has a second value. In a case in which the second distance in the second observation state is greater than the first distance in the first observation state, a subject seen in the image IMG2 is less than a subject seen in the image IMG1. Therefore, the second value of the second index is less than the first value of the second index.

The index calculation unit 71 may calculate only one of the first index and the second index in Step S2. The index calculation unit 71 may calculate the first index and the second index in Step S2.

After Step S2, the comparison unit 72 compares the first index or the second index with a threshold value (Step S3). Step S3 corresponds to the comparison step.

After Step S3, the selection unit 73 selects at least one image on the basis of the result of Step S3. Specifically, when the first index is greater than the threshold value or the second index is less than the threshold value, the selection unit 73 selects at least one image included in the one or more images (Step S4). Step S4 corresponds to the selection step. When Step S4 is executed, the image processing is completed.

The threshold value indicates a condition of a suitable distance for calculating three-dimensional coordinates (3D coordinates) in a subject. When the first index is greater than the threshold value, the selection unit 73 selects an image used for calculating the first index. Alternatively, when the second index is less than the threshold value, the selection unit 73 selects an image used for calculating the second index. The threshold value compared with the first index is not necessarily the same as the threshold value compared with the second index. When the first index is greater than the threshold value or the second index is less than the threshold value, the camera is close to a subject. Therefore, the selected image is expected to be suitable for calculating 3D coordinates.

The selection unit 73 may select all the one or more images recorded on a recording medium. When two or more images are recorded on a recording medium, the selection unit 73 may select at least one image included in the two or more images. When two or more images are recorded on a recording medium, the selection unit 73 may select all or some of the two or more images.

When the first index is less than or equal to the threshold value or the second index is greater than or equal to the threshold value, the selection unit 73 does not select any image. In this case, Step S4 is not executed.

An image-processing method according to each aspect of the present invention includes the measurement step (Step S1), the index calculation step (Step S2), the comparison step (Step S3), and the selection step (Step S4).

In the first embodiment, the image-processing device 7 calculates the distance between the camera and a subject and calculates an index on the basis of the distance. The image-processing device 7 selects at least one image on the basis of the result of comparing the index with a threshold value. Therefore, the image-processing device 7 can increase the possibility that a suitable image for calculating 3D coordinates in a subject is selected.

Second Embodiment

A second embodiment of the present invention will be described. Hereinafter, an example in which the image-processing device is an endoscope device will be described. The image-processing device has only to be a device having the functions shown in the first embodiment and is not limited to an endoscope device. The image-processing device may be built-in equipment mounted on a specific device or a system. The image-processing device may be a personal computer (PC) or a tablet terminal. Some of the functions of the image-processing device may be realized in a cloud environment. A subject is an industrial product.

Figure 5:
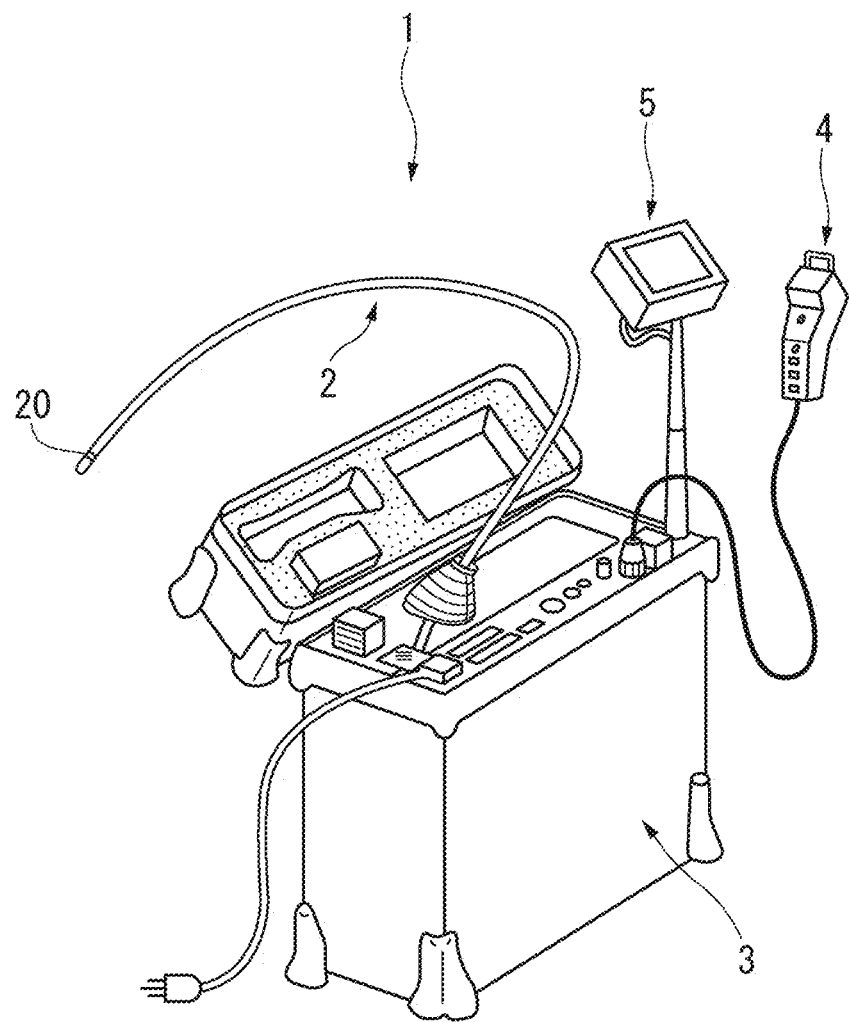
FIG. 5 is a perspective view showing an entire configuration of an endoscope device according to a second embodiment of the present invention.
Figure 6:
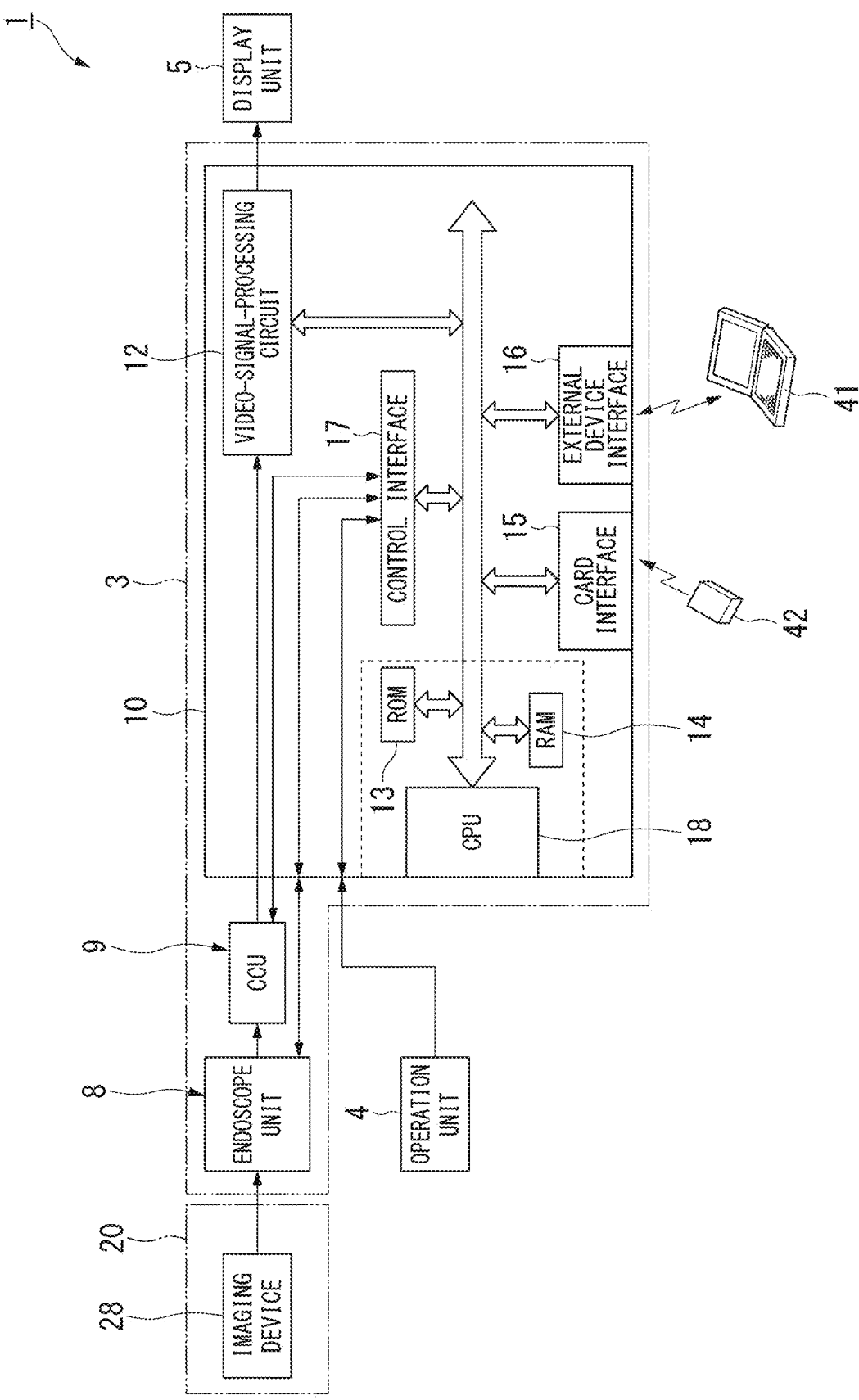
FIG. 6 is a block diagram showing an internal configuration of the endoscope device according to the second embodiment of the present invention.

FIG. 5 shows an external appearance of an endoscope device 1 according to the second embodiment. FIG. 6 shows an internal configuration of the endoscope device 1. The endoscope device 1 images a subject and generates an image. In order to observe various subjects, an inspector can perform replacement of an optical adaptor mounted at a distal end of an insertion unit 2, selection of a built-in video-processing program, and addition of a video-processing program.

The endoscope device 1 shown in FIG. 5 includes the insertion unit 2, a main body unit 3, an operation unit 4, and a display unit 5.

The insertion unit 2 is inserted into the inside of a subject. The insertion unit 2 has a long and thin bendable tube shape from a distal end 20 to a base end portion. The insertion unit 2 images a subject and outputs an imaging signal to the main body unit 3. An optical adapter is mounted on the distal end 20 of the insertion unit 2. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface (input device). For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated. A user touches the display screen of the display unit 5 by using a part of the body or a tool. For example, the part of the body is a finger.

The main body unit 3 shown in FIG. 6 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism built in the insertion unit 2. An imaging device 28 is built in the distal end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. The imaging signal output from the imaging device 28 is input into the CCU 9. The CCU 9 performs preprocessing including amplification, noise elimination, and the like for the imaging signal acquired by the imaging device 28. The CCU 9 converts the processed imaging signal into a video signal such as an NTSC signal. The imaging device 28 constitutes an endoscope.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. The video-signal-processing circuit 12 combines the video signal output from the CCU 9 and a graphic image signal generated by the CPU 18. The graphic image signal includes an image of the operation screen, an image of a subject, measurement information, and the like. The measurement information includes a measurement result and the like. The video-signal-processing circuit 12 outputs a combined video signal to the display unit 5. In addition, the video-signal-processing circuit 12 outputs image data to the CPU 18 on the basis of the video signal output from the CCU 9.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42, which is a removable recording medium, is connected to the card interface 15. The card interface 15 inputs control-processing information, image information, and the like stored on the memory card 42 into the control device 10. In addition, the card interface 15 records control-processing information, image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. In this way, a monitor of the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by imaging the subject. The image acquired by the imaging device 28 is input into the CPU 18 via the video-signal-processing circuit 12. The camera in the second embodiment includes the imaging device 28 and an observation optical system.

The imaging device 28 has a function of an image acquisition unit that acquires an image of a subject. The image acquisition unit may be an image input device. For example, in a case in which the PC 41 operates as an image-processing device, the image acquisition unit is a communication interface (communicator) that performs communication with the endoscope device 1. The image acquisition unit may be a wireless communicator. The image acquisition unit may be a reading circuit that reads an image from a recording medium on which the image is recorded.

Figure 7:
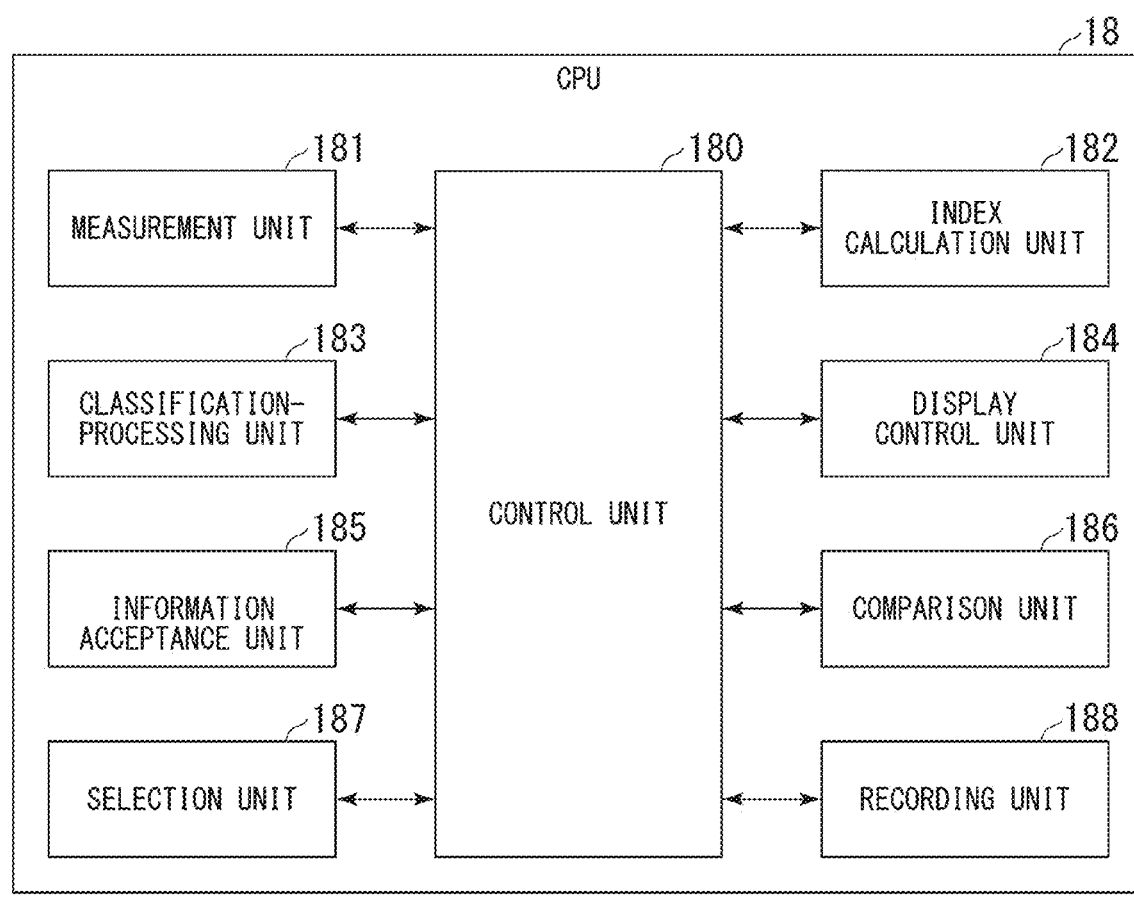
FIG. 7 is a block diagram showing a functional configuration of a CPU included in the endoscope device according to the second embodiment of the present invention.

FIG. 7 shows a functional configuration of the CPU 18. The CPU 18 has functional units including a control unit 180, a measurement unit 181, an index calculation unit 182, a classification-processing unit 183, a display control unit 184, an information acceptance unit 185, a comparison unit 186, a selection unit 187, and a recording unit 188. At least one of the blocks shown in FIG. 7 may be constituted by a different circuit from the CPU 18.

Each unit shown in FIG. 7 may be constituted by at least one of a processor and a logic circuit. Each unit shown in FIG. 7 may include one or a plurality of processors. Each unit shown in FIG. 7 may include one or a plurality of logic circuits.

The control unit 180 acquires a 2D image (image data) of a subject from the video-signal-processing circuit 12 and controls processing executed by each unit shown in FIG. 7.

The measurement unit 181 has the function of the measurement unit 70 shown in FIG. 1. The measurement unit 181 measures the distance at each of two or more points in an image acquired by the imaging device 28 (measurement step).

For example, a stereo optical system having two different visual fields is mounted as an optical adaptor on the distal end 20 of the insertion unit 2. In this case, the imaging device 28 generates a stereo image including a 2D image (first 2D image) of a subject seen from a first viewpoint and a 2D image (second 2D image) of the subject seen from a second viewpoint different from the first viewpoint. The measurement unit 181 sets two or more points in the first 2D image. The measurement unit 181 searches for a point on the second 2D image corresponding to a point on the first 2D image. The measurement unit 181 calculates the distance at each of two or more points on the first 2D image by using a principle of triangulation.

The stereo optical system includes a first optical system and a second optical system. The endoscope device 1 may switch between a first state and a second state. In the first state, only light passing through the first optical system is incident on the imaging device 28. In the second state, only light passing through the second optical system is incident on the imaging device 28. The imaging device 28 may generate the first 2D image in the first state and may generate the second 2D image in the second state. A combination of the first 2D image and the second 2D image constitutes a stereo image. The measurement unit 181 may measure the distance by using one or more of the first 2D images and one or more of the second 2D images.

A single-eye optical system having a single visual field may be mounted as an optical adaptor on the distal end 20 of the insertion unit 2. The measurement unit 181 may measure the distance on the basis of a principle of an active stereo method. Hereinafter, an example in which the active stereo method is used will be described.

For example, the measurement unit 181 may measure the distance by using one or more 2D images acquired when light having a predetermined pattern including bright parts and dark parts is projected on a subject. For example, the pattern is a random pattern. The measurement unit 181 may measure the distance by using two or more 2D images acquired when light having a stripe pattern or a lattice pattern is projected on a subject. The measurement unit 181 may measure the distance by using one or more 2D images acquired when laser light (spotlight) or slit light is projected on a subject. In a case in which no patterns are on the surface of a subject, the measurement unit 181 can stably measure the distance.

The measurement unit 181 may measure the distance by using a technique called time of flight (ToF). In a case in which ToF is used, the measurement unit 181 measures the length of time in which light (infrared light or the like) or ultrasound travels from a first timing to a second timing. The first timing indicates a time point at which the light or the ultrasound is projected on a subject from the camera. The second timing indicates a time point at which light or ultrasound reflected by a subject reaches the camera. The measurement unit 181 calculates a distance on the basis of the length of time from the first timing to the second timing. In this case, the measurement unit 181 does not need to use an image in order to measure the distance.

The endoscope device 1 may use a camera called a TOF camera. A TOF camera acquires a color image and a distance image at the same time. The value of each pixel of the distance image indicates the distance from the camera to the subject. In this case, each pixel of the color image and each pixel of the distance image are associated with each other.

A method of measuring the distance is not limited to the above-described examples. A method of measuring the distance is not limited to an example using an image.

Coordinates of each of two or more points in an image are set in advance. For example, the coordinates are included in a program recorded on the ROM 13. The measurement unit 181 may measure the distance at each of three or more points in an image.

The index calculation unit 182 has the function of the index calculation unit 71 shown in FIG. 1. The index calculation unit 182 calculates an index on the basis of the distance measured by the measurement unit 181 (index calculation step). The index calculation unit 182 associates the index with an image used for calculating the distance.

For example, the index indicates the number of points at which a predetermined condition is met. The predetermined condition indicates that the distance is less than a predetermined value. For example, the predetermined value is 15 mm. The index increases as the distal end 20 of the insertion unit 2 nears a subject. Therefore, the index corresponds to the first index in the first embodiment.

The predetermined condition may indicate that the distance is greater than a predetermined value. The index decreases as the distal end 20 of the insertion unit 2 nears a subject. Therefore, the index corresponds to the second index in the first embodiment.

The ratio (density) of points may be used as the number of points. For example, the index calculation unit 182 may calculate the ratio of the number of points at which a predetermined condition is met to the number of all the points as the index.

The index calculation unit 182 may calculate the average value of distances at two or more points as the index. The index calculation unit 182 may select the minimum value of distances at two or more points as the index. The average value or the minimum value decreases as the distal end 20 of the insertion unit 2 nears a subject. Therefore, the average value or the minimum value corresponds to the second index in the first embodiment.

In the above-described examples, the index is greater than or equal to zero. The index may be less than zero. For example, the index calculation unit 182 may calculate a value obtained by multiplying the above-described number of points or the like by a coefficient less than zero as the index.

The classification-processing unit 183 classifies two or more distances calculated at two or more points into two or more groups (classification-processing step). The range of each of the groups is different from that of the other groups. For example, the classification-processing unit 183 classifies two or more distances into three groups. The three groups are a group A, a group B, and a group C. The distance less than 15 mm is classified into the group A. The distance greater than or equal to 15 mm and less than 30 mm is classified into the group B. The distance greater than or equal to 30 mm is classified into the group C. For example, the range of the distance of each group is included in a program recorded on the ROM 13.

Each of two or more distances is classified into any one of two or more groups. Each of the two or more groups includes one or more distances.

The display control unit 184 controls processing executed by the video-signal-processing circuit 12. The CCU 9 outputs a 2D video signal. The 2D video signal includes color data of each pixel of a 2D image acquired by the imaging device 28. The display control unit 184 causes the video-signal-processing circuit 12 to output the 2D video signal output from the CCU 9 to the display unit 5. The video-signal-processing circuit 12 outputs the 2D video signal to the display unit 5. The display unit 5 displays a 2D image on the basis of the 2D video signal output from the video-signal-processing circuit 12. In this way, the display control unit 184 displays the 2D image acquired by the imaging device 28 as a live image on the display unit 5.

The display control unit 184 displays various kinds of information on the display unit 5. In other words, the display control unit 184 displays various kinds of information on an image. The various kinds of information include a measurement result and the like. The various kinds of information may include a cursor. The cursor is a mark used by a user to designate a specific point on an image.

For example, the display control unit 184 generates a graphic image signal of the various kinds of information. The display control unit 184 outputs the generated graphic image signal to the video-signal-processing circuit 12. The video-signal-processing circuit 12 combines the video signal output from the CCU 9 and the graphic image signal output from the CPU 18. In this way, the various kinds of information are superimposed on an image. The video-signal-processing circuit 12 outputs the combined video signal to the display unit 5. The display unit 5 displays an image on which the various kinds of information are superimposed.

The display control unit 184 generates a graphic image signal indicating distance information. The distance information indicates the distance at each of two or more points. The display control unit 184 outputs the graphic image signal to the video-signal-processing circuit 12. In this way, the display control unit 184 displays the distance information on the display unit 5 (distance-information display step).

A user inputs various kinds of information into the endoscope device 1 by operating the operation unit 4. The operation unit 4 outputs the information input by the user. The information is input into the control interface 17, which is an input unit. The information is output from the control interface 17 to the CPU 18. The information acceptance unit 185 accepts the information input into the endoscope device 1 via the operation unit 4.

For example, a user inputs position information of a cursor into the endoscope device 1 by operating the operation unit 4. In a case in which the display unit 5 is constituted as a touch panel, the user inputs position information indicating a position on an image into the endoscope device 1 by touching the screen of the display unit 5. The information acceptance unit 185 accepts the position information input into the endoscope device 1. The information acceptance unit 185 calculates the position on the image on the basis of the position information. The display control unit 184 displays a cursor at the position calculated by the information acceptance unit 185.

The comparison unit 186 has the function of the comparison unit 72 shown in FIG. 1. The comparison unit 186 compares the index calculated by the index calculation unit 182 with a threshold value (comparison step). For example, the threshold value is included in a program recorded on the ROM 13.

The selection unit 187 has the function of the selection unit 73 shown in FIG. 1. The selection unit 187 selects at least one image on the basis of the result of comparison executed by the comparison unit 186 (selection step). When the index calculated by the index calculation unit 182 meets a selection condition, the selection unit 187 selects an image associated with the index.

For example, the index indicates the number of points at which a predetermined condition is met. The predetermined condition indicates that the distance is less than a predetermined value. In this case, the above-described selection condition indicates that the index is greater than a threshold value. In this case, the index corresponds to the first index described above. Alternatively, the predetermined condition indicates that the distance is greater than a predetermined value. In this case, the above-described selection condition indicates that the index is less than a threshold value. In this case, the index corresponds to the second index described above.

Alternatively, the index indicates the average value of distances at two or more points or the minimum value of distances at two or more points. In this case, the above-described selection condition indicates that the index is less than a threshold value. In this case, the index corresponds to the second index described above.

For example, the threshold value is greater than or equal to zero. In a case in which the index is less than zero, the threshold value may be less than zero.

The recording unit 188 records at least one image selected by the selection unit 187 on a recording medium (recording step). For example, the recording unit 188 records the at least one image on a recording medium in the PC 41 or on the memory card 42.

Figure 8:
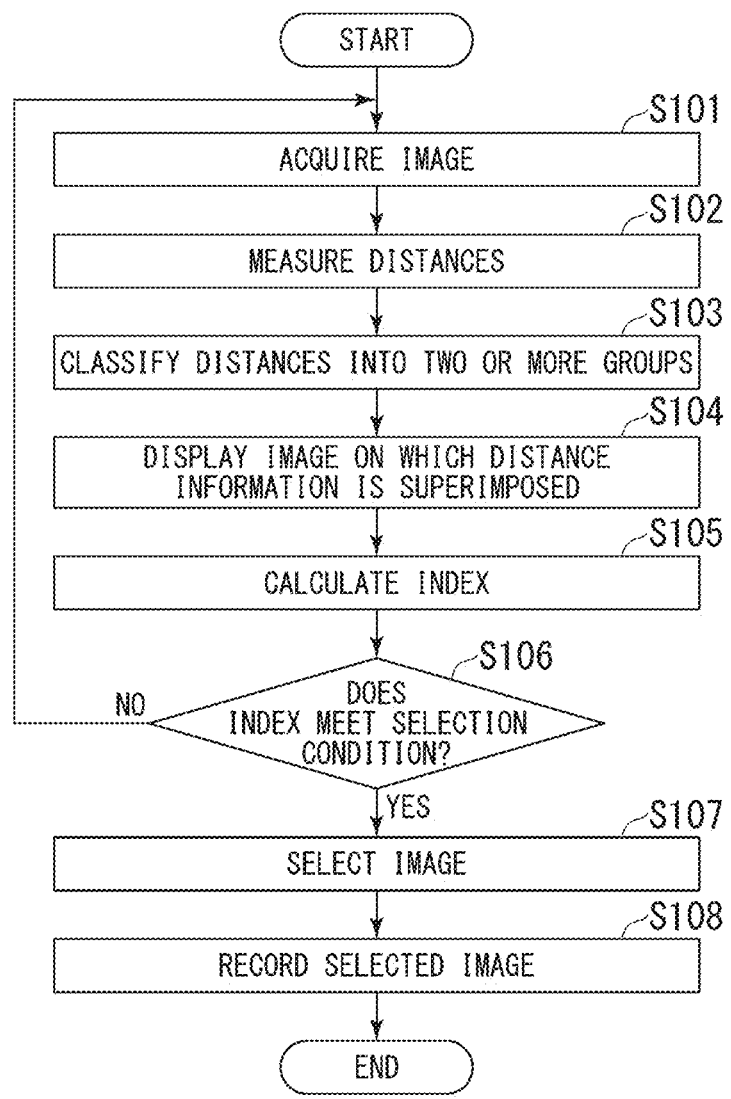
FIG. 8 is a flow chart showing a procedure of image processing in the second embodiment of the present invention.

Image processing in the second embodiment will be described by using FIG. 8. FIG. 8 shows a procedure of the image processing.

The imaging device 28 sequentially generates an imaging signal. In other words, the imaging device 28 generates an imaging signal of each frame corresponding to a live image. The live image is a 2D image of a subject and is sequentially updated at a predetermined frame rate. In other words, the live image is a video. The video includes two or more frames. Each of the frames is constituted by a 2D image acquired by the imaging device 28.

The control unit 180 acquires an image (2D image) acquired by the imaging device 28 (Step S101).

After Step S101, the measurement unit 181 measures the distance at each of two or more points in the image acquired in Step S101 (Step S102). Step S102 corresponds to the measurement step.

The measurement unit 181 measures the distance at each of the points. Since two or more points are included in one image, the measurement unit 181 measures two or more distances.

After Step S102, the classification-processing unit 183 classifies the two or more distances calculated in Step S102 into two or more groups (Step S103). Step S103 corresponds to the classification-processing step.

After Step S103, the display control unit 184 displays an image on which the distance information is superimposed on the display unit 5. Specifically, the display control unit 184 generates a graphic image signal indicating the distance information and outputs the graphic image signal to the video-signal-processing circuit 12. Similar processing to that described above is executed, and the display unit 5 displays an image on which the distance information is superimposed (Step S104). Step S104 corresponds to the distance-information display step. In the second embodiment, the display control unit 184 displays an image and the distance information on the display unit 5 while the imaging device 28 acquires the image.

Figure 9:
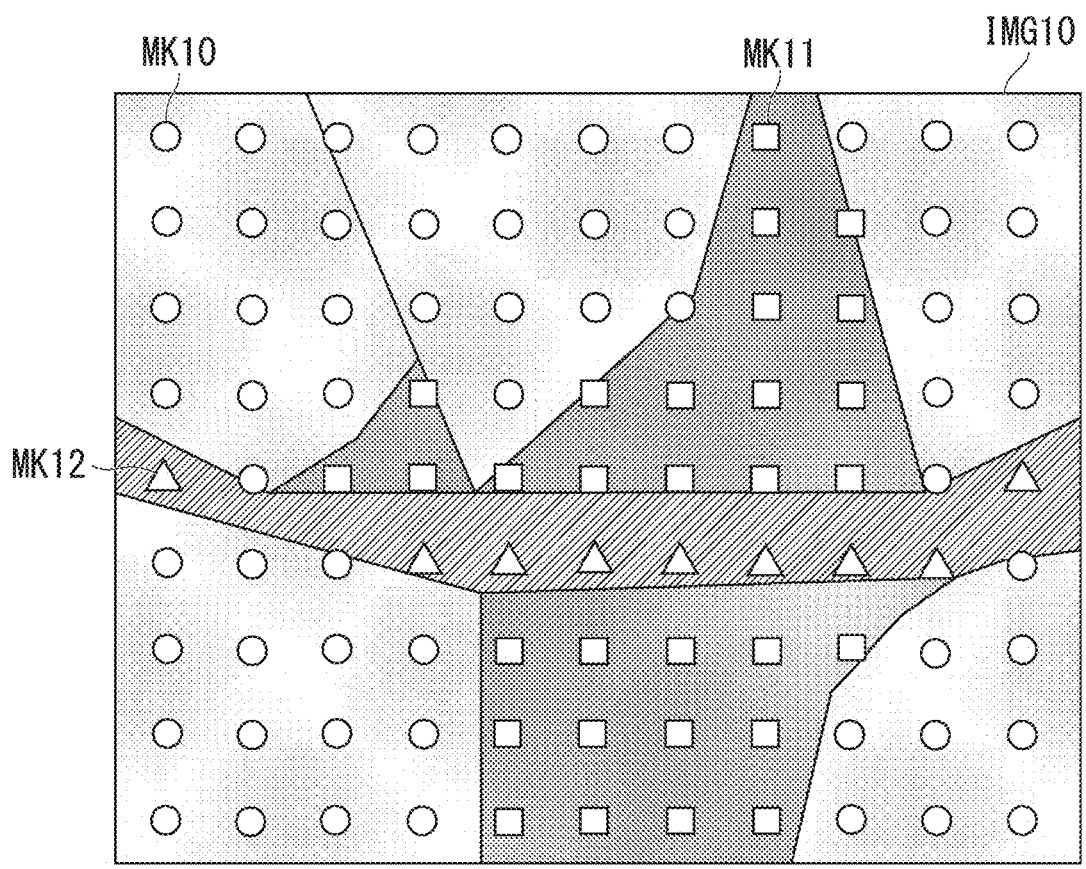
FIG. 9 is a diagram showing an example of an image displayed on a display unit in the second embodiment of the present invention.

FIG. 9 shows an example of an image displayed on the display unit 5 in Step S104. The display control unit 184 displays an image IMG10 on the display unit 5. The image IMG10 is a 2D image of a subject. In a case in which the imaging device 28 acquires a stereo image, the display control unit 184 displays one of two images constituting the stereo image on the display unit 5.

In the example shown in FIG. 9, the measurement unit 181 measures distances at 99 points arranged in 9 rows and 11 columns. In the example shown in FIG. 9, the classification-processing unit 183 classifies 99 distances calculated at the 99 points into three groups. The three groups are the group A, the group B, and the group C described above. The distance less than 15 mm belongs to the group A. The distance greater than or equal to 15 mm and less than 30 mm belongs to the group B. The distance greater than or equal to 30 mm belongs to the group C.

The display control unit 184 displays the distance information on the display unit 5. The distance information is superimposed on the image IMG10. In the example shown in FIG. 9, the display control unit 184 displays a mark MK10, a mark MK11, and a mark MK12 on the image IMG10. The mark MK10 indicates a distance classified into the group A. The mark MK11 indicates a distance classified into the group B. The mark MK12 indicates a distance classified into the group C. Each of the marks corresponds to the distance information. Each of the marks is displayed at the position of a point at which the distance is measured. Each of the marks has a shape corresponding to each of the groups. In the example shown in FIG. 9, the mark MK10 is a circle, the mark MK11 is a quadrilateral, and the mark MK12 is a triangle.

A user can determine whether the image IMG10 is suitable for calculating 3D coordinates. The camera is close to a region in which the number of marks MK10 is great. Therefore, the region is suitable for calculating 3D coordinates. The camera is far from a region in which the number of marks MK12 is great. Therefore, the region is unsuitable for calculating 3D coordinates. When the number of marks MK10 is great in the image IMG10, the user can determine that the image IMG10 is suitable for calculating 3D coordinates.

The user changes the composition of photography by referring to the distance information. The distance information is indicated by each of the marks displayed on the image IMG10. For example, the user changes the composition such that the number of marks MK10 is great, which increases the possibility that a suitable image for calculating 3D coordinates is acquired.

An example in which a stereo optical system is used will be described. The stereo optical system includes a first optical system and a second optical system. The first optical system and the second optical system are away from each other, and a parallax occurs. Therefore, a first optical image and a second optical image are different from each other. The first optical image is formed by light passing through the first optical system. The second optical image is formed by light passing through the second optical system.

Not only the parallax but also the posture of the camera influences the difference between the first optical image and the second optical image. The imaging direction of the camera changes in accordance with the posture of the camera with respect to the surface of a subject. In a case in which the surface of a subject is a plane and the imaging direction is almost perpendicular to the plane, the difference of the distance between each point of the subject and the camera is small. The difference does not influence the difference between the first optical image and the second optical image very much. On the other hand, in a case in which the surface of a subject is a plane and the imaging direction is almost parallel to the plane, the difference of the distance between each point and the camera is great between a point on the front side and a point on the back side. The difference substantially influences the difference between the first optical image and the second optical image. In a region in which the difference of the distance between each point and the camera is great, a sufficient parallax does not occur. Therefore, an image in which such a region looks large is unsuitable for calculating 3D coordinates. Due to this reason, it is difficult for a user to have a sense of perspective from only a 2D image and to recognize that the posture of the camera is inappropriate.

A user can check the posture of the camera by referring to the distance information. When the marks MK10 expand throughout the entire image IMG10, the camera is almost perpendicular to the surface of a subject. When the marks MK10 are displayed only in some regions of the image IMG10, the camera is tilted against the surface of a subject. For example, when the imaging direction is almost parallel to the surface of a subject, the marks MK10 are displayed only in a region close to the camera. Therefore, the user can recognize that the imaging direction is almost parallel to the surface of a subject. The user changes the posture of the camera such that the marks MK10 expand throughout the entire image IMG10. In other words, the user changes the composition such that the imaging direction is perpendicular to the surface of a subject, which increases the possibility that a suitable image for calculating 3D coordinates is acquired.

The display control unit 184 may display each point of the image IMG10 in a color corresponding to the distance information. For example, the display control unit 184 displays a point at which the distance belonging to the group A is calculated in green. The display control unit 184 displays a point at which the distance belonging to the group B is calculated in yellow. The display control unit 184 displays a point at which the distance belonging to the group C is calculated in red. The display control unit 184 may display a mark having the size corresponding to the distance information at each point of the image IMG10. The display control unit 184 may display a number or a character indicating the distance information at each point of the image IMG10. A method of displaying the distance information is not limited to the above-described examples.

The display control unit 184 does not need to display the distance information of a point at which the distance greater than or equal to a predetermined value is calculated. The predetermined value indicates a distance at which a parallax does not sufficiently occur and the measurement unit 181 cannot calculate 3D coordinates. In a case in which the display control unit 184 does not display the distance information, time and effort of a user for identifying the displayed mark can be saved. Therefore, it is easy for the user to intuitively perform operations.

A stereo image includes a first 2D image and a second 2D image, as described above. In a case in which the imaging device 28 acquires a stereo image, the measurement unit 181 searches for a point on the second 2D image corresponding to a point on the first 2D image. This processing includes matching-processing of calculating a correlation coefficient between the first 2D image and the second 2D image. The minimum value of a correlation coefficient is $-1$ and the maximum value of a correlation coefficient is 1. When the correlation coefficient is less than zero, the measurement unit 181 may determine that it is impossible to measure the distance at a position on the first 2D image. The measurement unit 181 may determine whether it is possible to measure the distance on the basis of a value indicating the intensity of texture of an image or the like. The display control unit 184 does not need to display the distance information at a point at which it is impossible to measure the distance.

The number of points at which the distance is measured is not limited to 99. The number of groups into which two or more distances are classified is not limited to three.

The display screen of the display unit 5 may include a first region and a second region different from each other. The display control unit 184 may display a first image on which the distance information is not superimposed in the first region and may display a second image on which the distance information is superimposed in the second region. A user can easily check the state of a subject by referring to the first image. The display control unit 184 may display the first image in the first region and may display a second image constituted by only the distance information in the second region. For example, the second image includes only points at which the distance is measured. Thus, the user can check in detail an image of a subject on which the distance information is not superimposed.

After Step S104, the index calculation unit 182 calculates an index on the basis of the distance measured in Step S102. The index calculation unit 182 associates the index with an image used for calculating the distance (Step S105). Step S105 corresponds to the index calculation step.

In the example shown in FIG. 9, the index calculation unit 182 may calculate the number of points belonging to the group A as the index. The index calculation unit 182 may calculate the sum of the number of points belonging to the group B and the number of points belonging to the group C as the index. The index calculation unit 182 may calculate the average value of distances at two or more points or the minimum value of distances at two or more points as the index.

After Step S105, the comparison unit 186 compares the index calculated by the index calculation unit 182 with a threshold value. The comparison unit 186 determines whether the index meets a selection condition (Step S106). Step S106 corresponds to the comparison step.

For example, the index calculation unit 182 calculates the number of points belonging to the group A as a first index in Step S105. For example, the threshold value used in Step S106 is 75. The comparison unit 186 compares the first index with 75 in Step S106. The selection condition indicates that the first index is greater than the threshold value. When the first index is greater than 75, the comparison unit 186 determines that the first index meets the selection condition in Step S106. When the first index is less than or equal to 75, the comparison unit 186 determines that the first index does not meet the selection condition in Step S106.

For example, previously executed measurement shows that predetermined measurement accuracy can be obtained when the distance between the camera and a subject is less than 15 mm. In such a case, the distance needs to be less than 15 mm in order to obtain the predetermined measurement accuracy. For example, the above-described threshold value of 75 indicates 75% of the number of all the points. The above-described distance of 15 mm may be changed in accordance with the magnification rate or the like of an optical system.

An example in which the index calculation unit 182 calculates the sum of the number of points belonging to the group B and the number of points belonging to the group C as the second index will be described. The comparison unit 186 uses a value obtained by subtracting the threshold value of the first index from the number of all the points as the threshold value in Step S106. The threshold value of the first index is 75, and the number of all the points is 99. The comparison unit 186 compares the second index with the calculated threshold value, which is 24. When the second index is less than 24, the comparison unit 186 determines that the second index meets the selection condition in Step S106. When the second index is greater than or equal to 24, the comparison unit 186 determines that the second index does not meet the selection condition in Step S106.

In a case in which the index calculation unit 182 calculates the average value of distances at two or more points or the minimum value of distances at two or more points as the second index, the comparison unit 186 may compare the index with 15 mm in Step S106. When the second index is less than 15 mm, the comparison unit 186 may determine that the second index meets the selection condition in Step S106. When the second index is greater than or equal to 15 mm, the comparison unit 186 may determine that the second index does not meet the selection condition in Step S106.

The type of the index may be automatically set in advance. A user may set the type of the index. The threshold value may be automatically set in advance. The user may set the threshold value.

When the comparison unit 186 determines that the index does not meet the selection condition in Step S106, Step S101 is executed. Steps S101 to S106 are repeatedly executed until the index meets the selection condition.

When the comparison unit 186 determines that the index meets the selection condition in Step S106, the selection unit 187 selects an image associated with the index (Step S107). Step S107 corresponds to the selection step.

After Step S107, the recording unit 188 records the image selected by the selection unit 187 on a recording medium (Step S108). Step S108 corresponds to the recording step. When Step S108 is executed, the image processing is completed.

After Step S108, the display control unit 184 may display a message indicating that the image is recorded on the display unit 5. In this way, the display control unit 184 can notify a user that a suitable image for calculating 3D coordinates is recorded.

When the comparison unit 186 determines that the index calculated by the index calculation unit 182 does not meet the selection condition in Step S106, the display control unit 184 may display a message for supporting the change of composition on the display unit 5. For example, when the index does not meet the condition of the threshold value, the display control unit 184 may display, on the display unit 5, a message to instruct a user to bring the distal end 20 of the insertion unit 2 close to a subject. For example, an image is divided into a region A, a region B, and a region C in the horizontal direction. The region A includes points belonging to the group A. The region B includes points belonging to the group B. The region C includes points belonging to the group C. In this case, the imaging direction is highly likely to be parallel to the surface of a subject. Therefore, the display control unit 184 may display, on the display unit 5, a message to instruct a user to change the posture of the distal end 20 of the insertion unit 2 such that a subject is seen in an image in a front view.

The display control unit 184 may display, on the display unit 5, a message in accordance with the state of an image. Even when the camera is at a position at which the distance described above can be measured with sufficient accuracy, the amount of illumination light is unsuitable for acquiring an image and the measurement unit 181 cannot measure the distance in some cases. For example, when pixels in an image are saturated, the display control unit 184 may determine that the image is dark. In this case, the display control unit 184 may display, on the display unit 5, a message to instruct a user to increase the amount of illumination light. Alternatively, the display control unit 184 may display, on the display unit 5, a message to instruct a user to reduce the amount of illumination light when an image is too bright.

In the above-described example, the index calculated by the index calculation unit 182 indicates the number of points at which a predetermined condition is met. The predetermined condition indicates that the distance is less than 15 mm. In a case in which the distance between the camera and a subject is very small, there is a possibility that an image, which is unsuitable for calculating 3D coordinates, is acquired. For example, when the distance is less than 5 mm, there is a possibility that an image is blurred. Therefore, the predetermined condition may indicate that the distance is less than 15 mm and greater than or equal to 5 mm.

The predetermined condition may indicate that the distance is greater than or equal to 15 mm and less than 5 mm. When the index is less than 24, the comparison unit 186 may determine that the index meets the selection condition in Step S106.

The index calculation unit 182 may calculate the average value of distances at two or more points or the minimum value of distances at two or more points as the index. When the average value or the minimum value is less than 15 mm and greater than or equal to 5 mm, the comparison unit 186 may determine that the index meets the selection condition in Step S106.

In the image processing shown in FIG. 8, one image is recorded on a recording medium. After Step S108, Step S101 may be executed. If Steps S101 to S108 are repeatedly executed, two or more images are recorded on a recording medium.

In a case in which the processing time of Step S102 is long, the control unit 180 may reduce the display frame rate for displaying an image acquired by the imaging device 28. Alternatively, the control unit 180 may reduce the frequency of superimposing the distance information on an image acquired by the imaging device 28 without reducing the display frame rate for displaying the image.

Step S105 may be executed at any timing between a timing at which Step S102 is executed and a timing at which Step S106 is executed. Therefore, Step S105 may be executed after any one of Steps S102 to S104 is executed.

The display control unit 184 does not need to display the distance information on the display unit 5. Therefore, the display control unit 184 may display only an image acquired by the imaging device 28 in Step S104. Even when the distance information is not displayed, the endoscope device 1 can select and record a suitable image for calculating 3D coordinates.

The display control unit 184 may display a value of the measured distance as the distance information on the display unit 5. In this case, Step S103 does not need to be executed. In a case in which the display control unit 184 does not display the distance information on the display unit 5, Step S103 does not need to be executed. Therefore, the CPU 18 does not need to include the classification-processing unit 183.

The image selected in Step S107 may be temporarily held in the RAM 14 without being recorded on a recording medium in the PC 41 or on the memory card 42. The image selected in Step S107 may be transmitted to an external server or the like. In these cases, Step S108 does not need to be executed. Therefore, the CPU 18 does not need to include the recording unit 188.

Each aspect of the present invention may include the following modified example. The display control unit 184 displays the distance information on the display unit 5 in the distance-information display step (Step S104). The distance information indicates the distance at each of two or more points in one or more images of a subject.

Each aspect of the present invention may include the following modified example. The display control unit 184 displays one or more images on which the distance information is superimposed on the display unit 5 in the distance-information display step (Step S104).

Each aspect of the present invention may include the following modified example. The classification-processing unit 183 classifies distances at two or more points into two or more groups including a first group and a second group in the classification-processing step (Step S103). The range of the distance classified into the first group is different from the range of the distance classified into the second group. The display control unit 184 displays first distance information in a first state on the display unit 5 and displays second distance information in a second state different from the first state on the display unit 5 in the distance-information display step (Step S104). The first distance information indicates the distance classified into the first group. The second distance information indicates the distance classified into the second group.

In the example shown in FIG. 9, each of the first group and the second group corresponds to any one of the group A, the group B, and the group C. For example, the first group corresponds to the group A, and the second group corresponds to the group B. The range of the distance classified into the first group is less than 15 mm. The range of the distance classified into the second group is greater than or equal to 15 mm and less than 30 mm. Each of the first state and the second state corresponds to the shape of each mark shown in FIG. 9. The number of groups may be two, or may be greater than or equal to four. The first state and the second state are not limited to the shape of a mark and may correspond to the size of a mark, the color of a point, or the like.

Each aspect of the present invention may include the following modified example. The recording unit 188 records at least one image selected by the selection unit 187 on a recording medium in the recording step (Step S108).

Each aspect of the present invention may include the following modified example. The index calculation unit 182 calculates at least one of the first index and the second index on the basis of the number of points at which the distance is less than a predetermined value among two or more points, the number of points at which the distance is greater than a predetermined value among two or more points, the average value of distances at two or more points, or the minimum value of distances at two or more points in the index calculation step (Step S105).

Each aspect of the present invention may include the following modified example. The measurement step (Step S102), the index calculation step (Step S105), and the comparison step (Step S106) are executed for one image included in one or more images of a subject. When at least one of a first condition indicating that the first index is less than or equal to a predetermined threshold value and a second condition indicating that the second index is greater than or equal to the predetermined threshold value is met, the measurement step, the index calculation step, and the comparison step are executed for another image included in the one or more images.

When the comparison unit 186 determines that at least one of the first index and the second index does not meet the selection condition in Step S106, an image is newly acquired in Step S101. Thereafter, Steps S102 to S106 are executed again by using the image.

In the second embodiment, the endoscope device 1 calculates the distance between the camera and a subject and calculates the index on the basis of the distance. The endoscope device 1 selects at least one image on the basis of the result of comparing the index with a threshold value. Therefore, the endoscope device 1 can increase the possibility that a suitable image for calculating 3D coordinates in a subject is selected.

The endoscope device 1 automatically records a suitable image for calculating 3D coordinates on a recording medium. Therefore, the burden on a user is alleviated.

The endoscope device 1 displays the distance information. When the index does not meet the selection condition, a user refers to the distance information and can change the composition of photography.

First Modified Example of Second Embodiment

A first modified example of the second embodiment of the present invention will be described. The endoscope device 1 notifies a user of the result of comparing the index calculated by the index calculation unit 182 with a threshold value. The user checks the result and inputs a recording instruction for recording an image into the endoscope device 1. When the recording instruction is input into the endoscope device 1, the endoscope device 1 records an image on a recording medium. The endoscope device 1 includes the CPU 18 shown in FIG. 7.

The display control unit 184 generates a graphic image signal including comparison information. The comparison information indicates the result of comparing the index calculated by the index calculation unit 182 with the threshold value. The display control unit 184 outputs the graphic image signal to the video-signal-processing circuit 12 (output step). In this way, the display control unit 184 displays the comparison information on the display unit 5.

The display control unit 184 functions as an output unit that outputs the comparison information to the display unit 5 (information-reporting device). A method of outputting the comparison information is not limited to this.

The output unit of the CPU 18 may output sound data to a speaker and may cause the speaker to generate sounds corresponding to the comparison information. For example, in a case in which the index calculated by the index calculation unit 182 meets the selection condition described above, the output unit outputs sound data corresponding to a first sound to the speaker. In a case in which the index calculated by the index calculation unit 182 does not meet the selection condition, the output unit outputs sound data corresponding to a second sound different from the first sound to the speaker.

The output unit may output a control signal indicating a pattern of vibration to a vibration generator and may cause the vibration generator to generate a vibration having a pattern corresponding to the comparison information. For example, in a case in which the index calculated by the index calculation unit 182 meets the selection condition, the output unit outputs a control signal indicating a first pattern to the vibration generator. In a case in which the index calculated by the index calculation unit 182 does not meet the selection condition, the output unit outputs a control signal indicating a second pattern different from the first pattern to the vibration generator.

The output unit may output a control signal indicating a pattern of light emission to a light source and may cause the light source to generate light having a pattern corresponding to the comparison information. For example, in a case in which the index calculated by the index calculation unit 182 meets the selection condition, the output unit outputs a control signal indicating a first pattern to the light source. In a case in which the index calculated by the index calculation unit 182 does not meet the selection condition, the output unit outputs a control signal indicating a second pattern different from the first pattern to the light source.

In a case in which the light source is capable of generating light of two or more types of colors, the output unit may output a control signal indicating a specific color to the light source and may cause the light source to generate light of a color corresponding to the comparison information. For example, in a case in which the index calculated by the index calculation unit 182 meets the selection condition, the output unit outputs a control signal indicating a first color to the light source. In a case in which the index calculated by the index calculation unit 182 does not meet the selection condition, the output unit outputs a control signal indicating a second color different from the first color to the light source.

Figure 10:
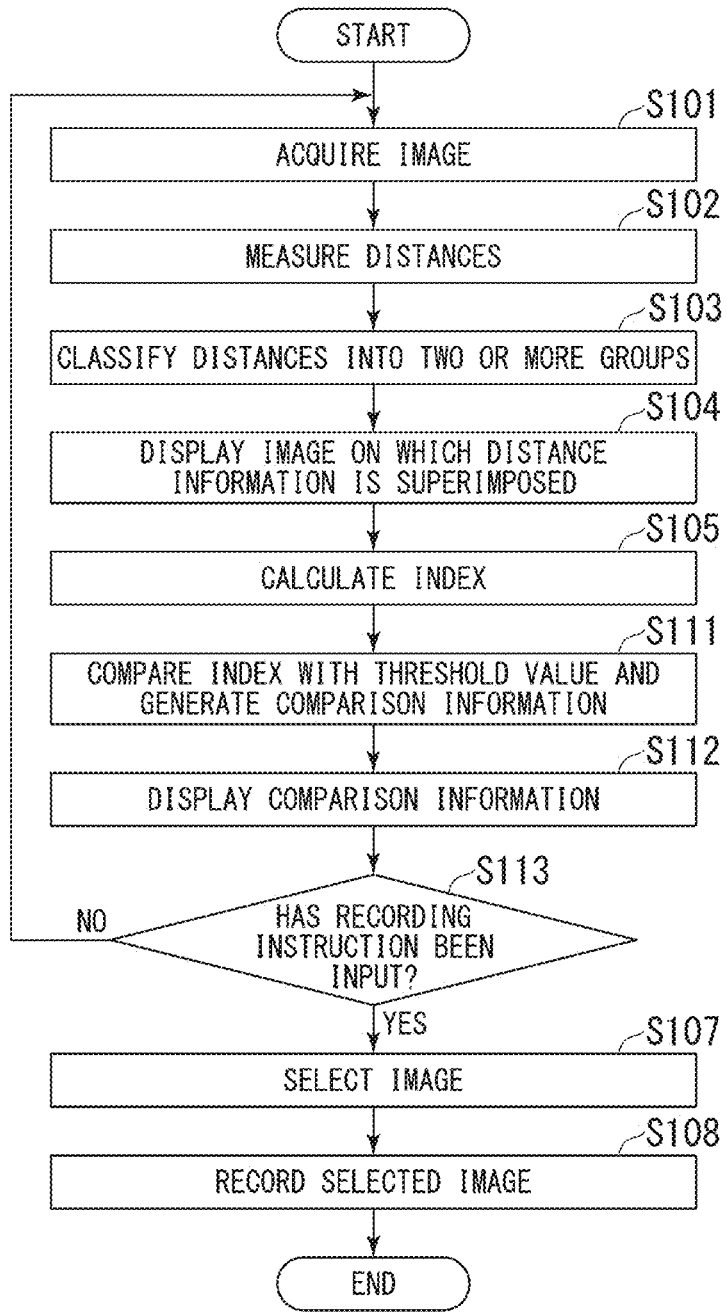
FIG. 10 is a flow chart showing a procedure of image processing in a first modified example of the second embodiment of the present invention.

Image processing in the first modified example of the second embodiment will be described by using FIG. 10. FIG. 10 shows a procedure of the image processing. The same processing as that shown in FIG. 8 will not be described.

After Step S105, the comparison unit 186 compares the index calculated by the index calculation unit 182 with a threshold value. The comparison unit 186 generates comparison information indicating a result of the comparison (Step S111). Step S111 corresponds to the comparison step.

After Step S111, the display control unit 184 displays an image on which the comparison information is superimposed on the display unit 5. Specifically, the display control unit 184 generates a graphic image signal indicating the comparison information and outputs the graphic image signal to the video-signal-processing circuit 12. Similar processing to that described above is executed, and the display unit 5 displays an image on which the comparison information is superimposed (Step S112). Step S112 corresponds to the output step.

Figure 11:
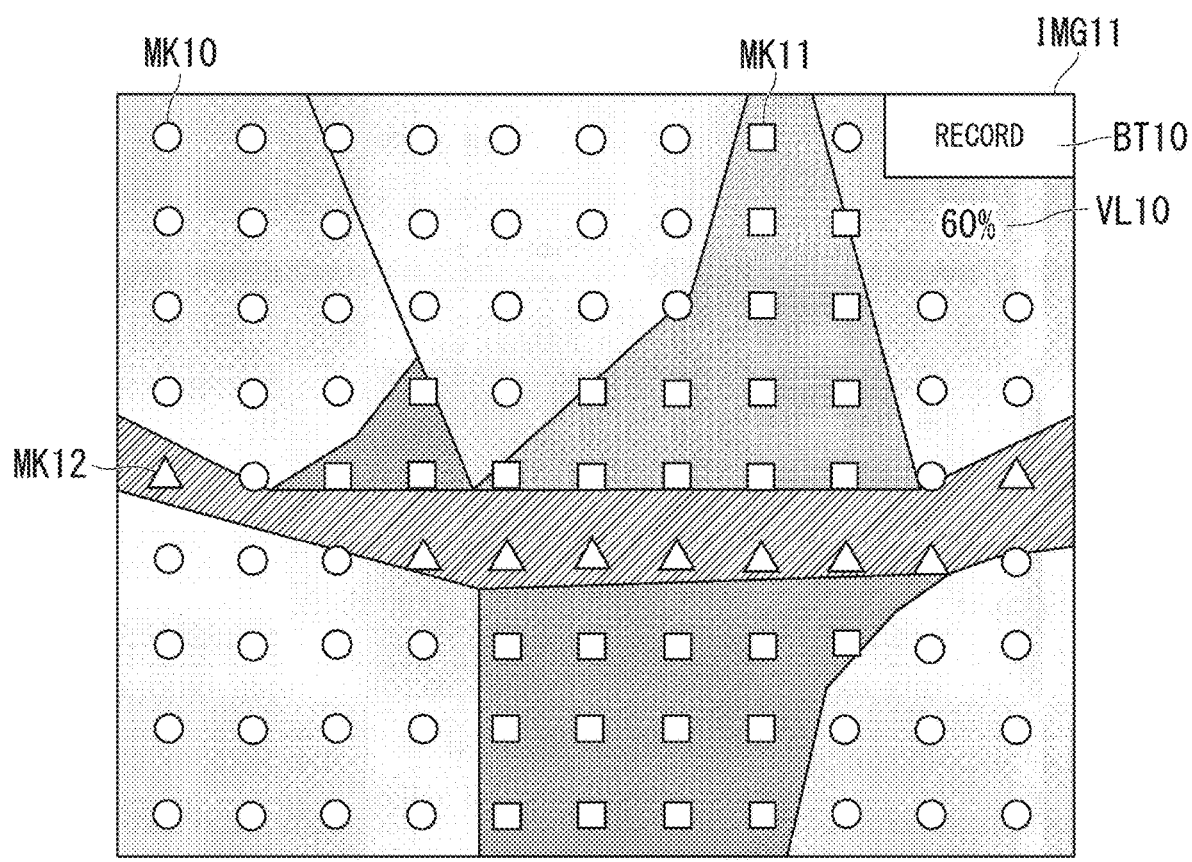
FIG. 11 is a diagram showing an example of an image displayed on a display unit in the first modified example of the second embodiment of the present invention.

FIG. 11 shows an example of an image displayed on the display unit 5 in Step S112. The display control unit 184 displays an image IMG11 on the display unit 5. The image IMG11 is a 2D image of a subject.

The display control unit 184 displays the distance information on the display unit 5. The distance information is superimposed on the image IMG11. In the example shown in FIG. 11, the display control unit 184 displays a mark MK10, a mark MK11, and a mark MK12 on the image IMG11. Each mark is the same as each mark shown in FIG. 9.

The display control unit 184 displays the comparison information on the display unit 5. The comparison information is superimposed on the image IMG11. In the example shown in FIG. 11, the display control unit 184 displays a value VL10 on the image IMG11. For example, the index calculation unit 182 calculates the number of points belonging to the group A in the second embodiment as the index. The value VL10 indicates a ratio of the number of points belonging to the group A to the number of all the points.

When the index calculated by the index calculation unit 182 meets the selection condition, the display control unit 184 may display the value VL10 in a first color. When the index calculated by the index calculation unit 182 does not meet the selection condition, the display control unit 184 may display the value VL10 in a second color different from the first color. The display control unit 184 may highlight the value VL10 only when the index calculated by the index calculation unit 182 meets the selection condition. For example, the display control unit 184 may display a box or the like around the value VL10.

The display control unit 184 may display an indicator showing the comparison information on the display unit 5. The indicator may be a graphical user interface (GUI) component. The position corresponding to the above-described ratio is displayed on the component. The indicator may be a mark or a symbol.

The display screen of the display unit 5 may include a first region and a second region different from each other. The display control unit 184 may display an image on which the comparison information is not superimposed in the first region and may display the comparison information in the second region. A user can easily check the state of a subject by referring to the image.

The display control unit 184 displays a button BT10 on the image IMG11. The button BT10 is a button for inputting an instruction for recording an image. The user can press a button on the display screen of the display unit 5 through the operation unit 4. In a case in which the display unit 5 is constituted as a touch panel, the user can press a button on the display screen by touching the display screen.

The user checks each mark and the value VL10 and determines whether the image IMG11 is suitable for calculating 3D coordinates. When the user determines that the image IMG11 is suitable for calculating 3D coordinates, the user presses the button BT10. When the user determines that the image IMG11 is unsuitable for calculating 3D coordinates, the user changes the composition of photography.

After Step S112, the control unit 180 determines whether a recording instruction for recording an image has been input into the endoscope device 1 (Step S113). For example, a user inputs the recording instruction into the endoscope device 1 by operating the operation unit 4. In the example shown in FIG. 11, the user inputs the recording instruction into the endoscope device 1 by pressing the button BT10. The information acceptance unit 185 accepts the recording instruction. At this time, the control unit 180 determines that the recording instruction has been input into the endoscope device 1.

When the control unit 180 determines that the recording instruction has not been input into the endoscope device 1 in Step S113, Step S101 is executed. Steps S101 to S105 and Steps S111 to S113 are repetitively executed until the recording instruction is input into the endoscope device 1. When the control unit 180 determines that the recording instruction has been input into the endoscope device 1 in Step S113, Step S107 is executed.

The display control unit 184 does not need to display the distance information on the display unit 5. Accordingly, the display control unit 184 may display only an image acquired by the imaging device 28 in Step S104. The distance information is not superimposed on an image in Step S104, and the comparison information is superimposed on an image in Step S112. The endoscope device 1 does not display the distance information, but displays the comparison information. Even when the distance information is not displayed, the endoscope device 1 can select and record a suitable image for calculating 3D coordinates.

In a case in which the distance information is displayed, the positional relationship between the camera and a subject is comprehensible to a user. In a case in which the index does not meet the selection condition, the user can easily set the composition of photography by referring to the distance information. On the other hand, a skilled user can set the composition of photography to some extent without referring to the distance information. As long as the user can figure out whether the composition of photography is suitable for calculating 3D coordinates, the user can adjust the composition of photography. Therefore, the display control unit 184 may display the comparison information without displaying the distance information.

In a case in which the index calculated by the index calculation unit 182 does not meet the selection condition, the control unit 180 may disable input of the recording instruction into the endoscope device 1. The control unit 180 may enable input of the recording instruction into the endoscope device 1 only when the index meets the selection condition.

For example, in a case in which the index does not meet the selection condition, the information acceptance unit 185 does not accept the recording instruction. The information acceptance unit 185 accepts the recording instruction only when the index meets the selection condition. While the index meets the selection condition, a user can input the recording instruction into the endoscope device 1 at any timing.

An image-processing method according to each aspect of the present invention includes a measurement step (Step S102), an index calculation step (Step S105), a comparison step (Step S111), an output step (Step S112), and a selection step (Step S107). The measurement unit 181 measures the distance at each of two or more points in one or more images of a subject in the measurement step. The distance indicates a 3D distance from a camera that acquires the one or more images to each of the two or more points. The index calculation unit 182 calculates a first index or a second index on the basis of the distance in the index calculation step. The first index increases as the camera nears the subject. The second index decreases as the camera nears the subject. The comparison unit 186 compares the first index or the second index with a threshold value in the comparison step. The display control unit 184 (output unit) outputs comparison information to the display unit 5 (information-reporting device) in an output step. The comparison information indicates the result of comparing the first index with a threshold value or the result of comparing the second index with a threshold value. The selection unit 187 selects at least one image included in the one or more images in the selection step after the output step is executed. The at least one image is an image used for calculating the first index or the second index.

In the first modified example of the second embodiment, the endoscope device 1 notifies a user of the comparison information. When the recording instruction is input into the endoscope device 1 by the user, the endoscope device 1 records an image on a recording medium. The user checks the comparison information and inputs the recording instruction into the endoscope device 1 when a suitable image for calculating 3D coordinates in a subject is acquired. Therefore, the endoscope device 1 can increase the possibility that a suitable image for calculating 3D coordinates in a subject is selected.

Second Modified Example of Second Embodiment

A second modified example of the second embodiment of the present invention will be described. The endoscope device 1 has the 3D measurement function and calculates the size of a subject. The endoscope device 1 includes the CPU 18 shown in FIG. 7.

Figure 12:
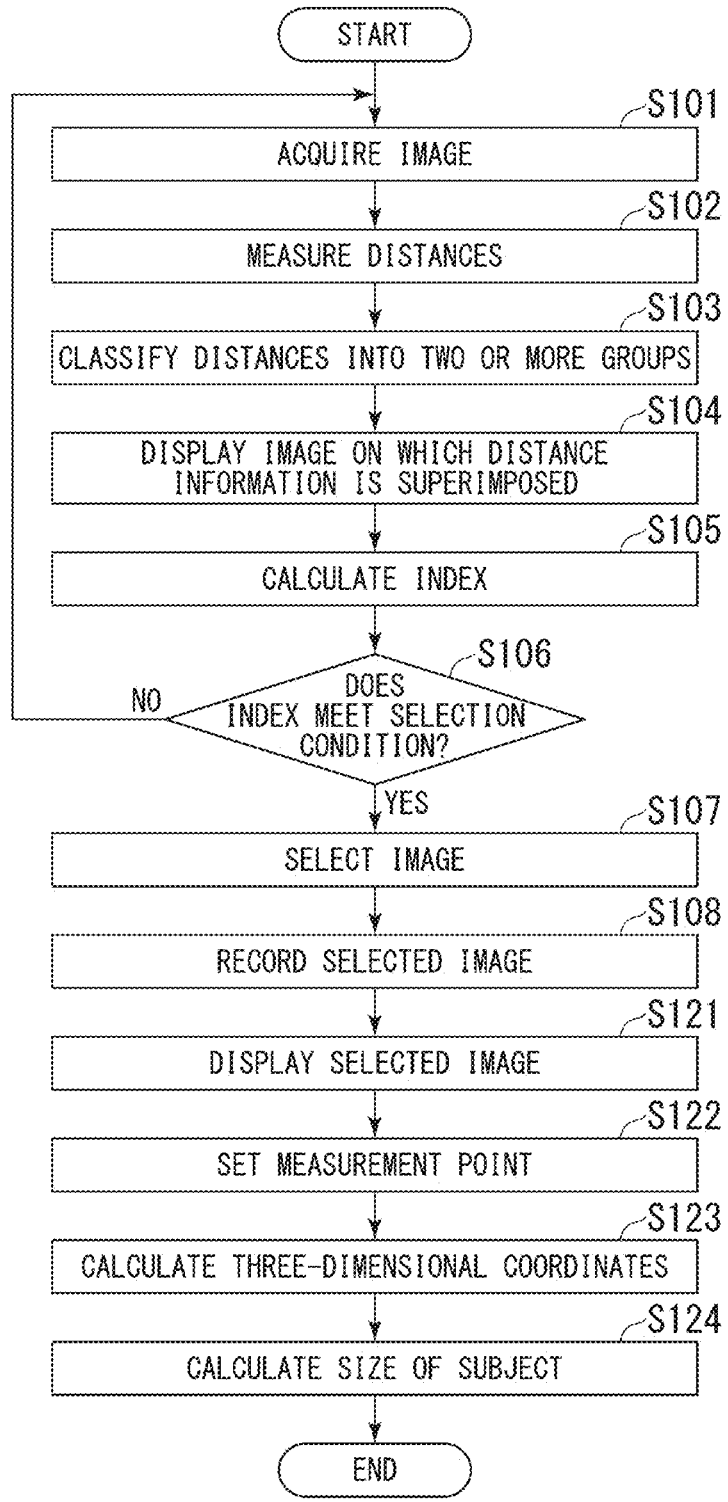
FIG. 12 is a flow chart showing a procedure of image processing in a second modified example of the second embodiment of the present invention.

Image processing in the second modified example of the second embodiment will be described by using FIG. 12. FIG. 12 shows a procedure of the image processing. The same processing as that shown in FIG. 8 will not be described.

After Step S108, the 3D measurement function is enabled. The display control unit 184 displays the image selected in Step S107 on the display unit 5 (Step S121). The endoscope device 1 may execute Step S121 without executing Step S108.

A user inputs position information into the endoscope device 1 by operating the operation unit 4. The position information indicates the position of a measurement point on the image displayed in Step S121. The measurement point indicates a position at which the size of a subject is measured. The information acceptance unit 185 accepts the position information. The measurement unit 181 sets the measurement point at the position indicated by the position information. The user inputs position information of each of two or more measurement points into the endoscope device 1. Therefore, the measurement unit 181 sets the two or more measurement points on the image displayed in Step S121 (Step S122).

After Step S122, the measurement unit 181 calculates 3D coordinates of two or more points on the subject. The two or more points correspond to the two or more measurement points set in Step S122. For example, the measurement unit 181 calculates 3D coordinates by using a stereo image including a first 2D image and a second 2D image (Step S123).

After Step S123, the measurement unit 181 calculates the size of the subject on the basis of the 3D coordinates calculated in Step S123 (Step S124). When Step S124 is executed, the image processing is completed.

For example, the measurement unit 181 calculates the 3D distance between two points on the subject. The measurement unit 181 may calculate the area of a three-dimensional region prescribed by three or more points on the subject. The measurement unit 181 may calculate the 3D distance between one point on the subject and a three-dimensional straight line prescribed by two points on the subject. The measurement unit 181 may calculate the 3D distance between one point on the subject and a three-dimensional region prescribed by three points on the subject. Each of the above-described points corresponds to a measurement point.

The endoscope device 1 may have the 3D reconfiguration function. The CPU 18 may generate a three-dimensional model (3D model) of the subject by executing 3D reconfiguration processing that uses two or more images. The 3D model indicates a three-dimensional shape (3D shape) of the subject. The display control unit 184 may display the 3D model on the display unit 5 in Step S121. The measurement unit 181 may set two or more measurement points in the 3D model in Step S122.

Steps S111 to S113 shown in FIG. 10 may be executed instead of Step S106.

In the second modified example of the second embodiment, the endoscope device 1 calculates the size of a subject by using the image selected in Step S107. Therefore, the possibility that the endoscope device 1 successfully calculates 3D coordinates increases.

Third Modified Example of Second Embodiment

A third modified example of the second embodiment of the present invention will be described. The endoscope device 1 records an image acquired by the imaging device 28 on a recording medium as a video. When the endoscope device 1 reproduces the video, the endoscope device 1 executes similar image processing to that in the second embodiment. The endoscope device 1 includes the CPU 18 shown in FIG. 7.

Figure 13:
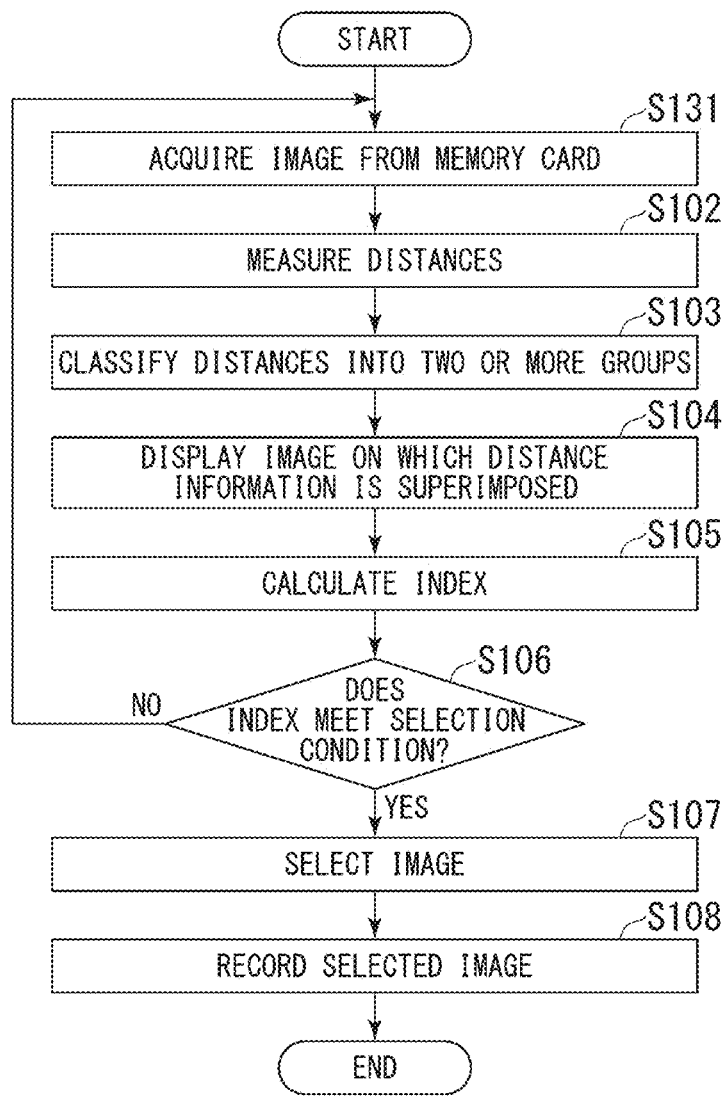
FIG. 13 is a flow chart showing a procedure of image processing in a third modified example of the second embodiment of the present invention.

Image processing in the third modified example of the second embodiment will be described by using FIG. 13. FIG. 13 shows a procedure of the image processing. The same processing as that shown in FIG. 8 will not be described.

For example, a video including two or more images acquired by the imaging device 28 is recorded on the memory card 42. The control unit 180 reads one image constituting the video from the memory card 42. In this way, the control unit 180 acquires the image (Step S131). After Step S131, Step S102 is executed.

Steps S111 to S113 shown in FIG. 10 may be executed instead of Step S106.

Steps S121 to S124 shown in FIG. 12 may be executed after Step S108 is executed.

The above-described video may be recorded on a recording medium in the PC 41. The PC 41 may execute similar processing to that shown in FIG. 12. The above-described video may be recorded on a recording medium in a network device such as a cloud server. The endoscope device 1 may perform communication with the network device and may acquire the video from the network device.

In the third modified example of the second embodiment, the endoscope device 1 can increase the possibility that a suitable image for calculating 3D coordinates in a subject is selected as in the second embodiment.

Third Embodiment

A third embodiment of the present invention will be described. In the second embodiment, the endoscope device 1 measures distances in the entire image covered in the imaging visual field of the camera. There is a case in which a user pays attention to only part of the image. In the second embodiment, there is a case in which the endoscope device 1 calculates a first distance and a second distance. The first distance indicates the distance at a point of a first region payed attention to by the user. The second distance indicates the distance at a point of a second region that is not payed attention to by the user. Even though the first distance in the first region payed attention to by the user is suitable, there is a possibility that an image is not selected due to the unsuitability of the second distance. Alternatively, there is a possibility that an image is selected when the second distance in the second region that is not payed attention to by the user is suitable and the first distance is unsuitable. Therefore, there is a possibility that the endoscope device 1 does not select a suitable image for calculating 3D coordinates of a point in the first region payed attention to by the user.

In the third embodiment, the endoscope device 1 sets a measurement region in an image acquired by the imaging device 28. The measurement region corresponds to a region payed attention to by a user. The endoscope device 1 executes, in the measurement region, similar image processing to that in the second embodiment.

Figure 14:
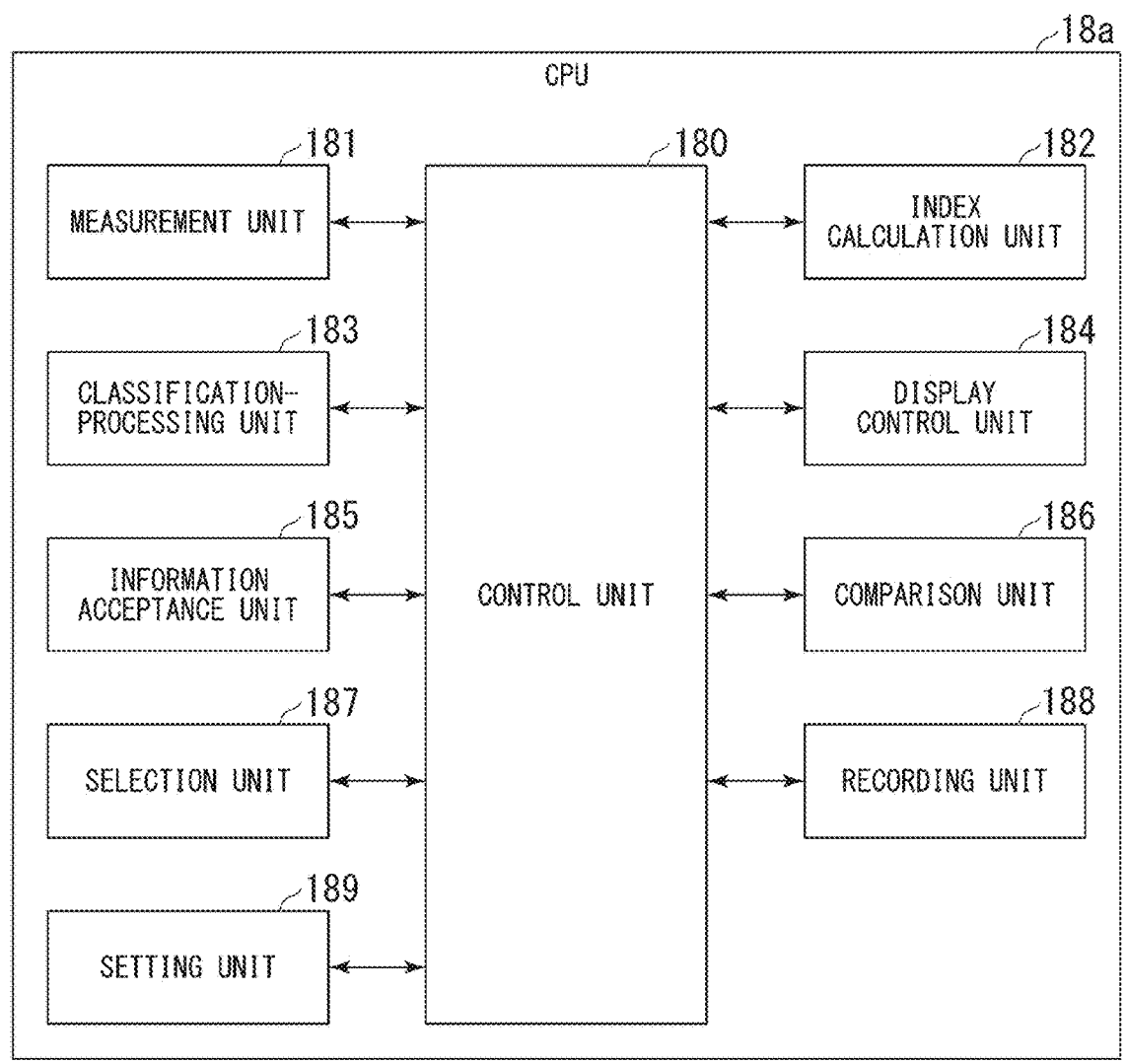
FIG. 14 is a block diagram showing a functional configuration of a CPU included in an endoscope device according to a third embodiment of the present invention.

The CPU 18 shown in FIG. 7 is changed to a CPU 18*a* shown in FIG. 14. FIG. 14 shows a functional configuration of the CPU 18*a*. The CPU 18*a* has functional units including a control unit 180, a measurement unit 181, an index calculation unit 182, a classification-processing unit 183, a display control unit 184, an information acceptance unit 185, a comparison unit 186, a selection unit 187, a recording unit 188, and a setting unit 189. At least one of the blocks shown in FIG. 14 may be constituted by a different circuit from the CPU 18*a*. The same configuration as that shown in FIG. 7 will not be described.

Each unit shown in FIG. 14 may be constituted by at least one of a processor and a logic circuit. Each unit shown in FIG. 14 may include one or a plurality of processors. Each unit shown in FIG. 14 may include one or a plurality of logic circuits.

The setting unit 189 sets a measurement region in an image acquired by the imaging device 28 (setting step). The measurement region is part of the entire region of an image acquired by the imaging device 28. The entire region corresponds to the entire imaging visual field of the camera. The measurement region is smaller than the entire region. The display control unit 184 displays an image acquired by the imaging device 28 on the display unit 5 and displays the measurement region on the image (region display step).

A user inputs region information into the endoscope device 1 by operating the operation unit 4. The region information indicates the position of the measurement region in an image acquired by the imaging device 28. The information acceptance unit 185 accepts the region information. The setting unit 189 sets the measurement region on the basis of the region information.

Figure 15:
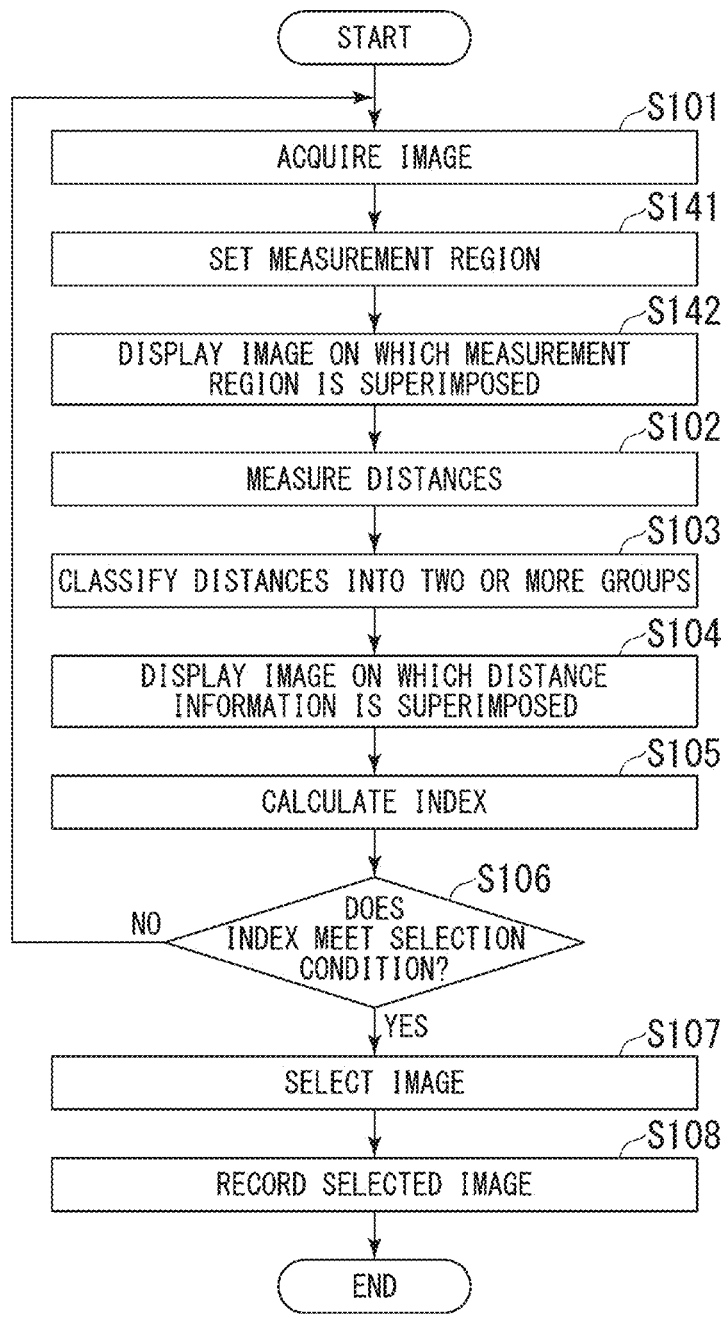
FIG. 15 is a flow chart showing a procedure of image processing in the third embodiment of the present invention.

Image processing in the third embodiment will be described by using FIG. 15. FIG. 15 shows a procedure of the image processing. The same processing as that shown in FIG. 8 will not be described.

After Step S101, the setting unit 189 sets a measurement region in the image acquired in Step S101 (Step S141). Step S141 corresponds to the setting step.

For example, the display control unit 184 displays an image on the display unit 5 in Step S141. A user inputs the region information into the endoscope device 1 by operating the operation unit 4. In an example in which a cursor is displayed on an image, the user moves the cursor to an intended position on the image and performs a drag operation or the like. At this time, the information acceptance unit 185 accepts the position. In an example in which the display unit 5 is constituted as a touch panel, the user touches the screen of the display unit 5 and performs a pinch operation or the like. At this time, the information acceptance unit 185 accepts the position designated through the operation. The region information indicates the position accepted by the information acceptance unit 185. The setting unit 189 sets the measurement region on the basis of the position designated by the user.

After Step S141, the display control unit 184 displays an image on which the measurement region is superimposed on the display unit 5. Specifically, the display control unit 184 generates a graphic image signal indicating the measurement region and outputs the graphic image signal to the video-signal-processing circuit 12. Similar processing to that described above is executed, and the display unit 5 displays an image on which the measurement region is superimposed (Step S142). Step S142 corresponds to the region display step.

Figure 16:
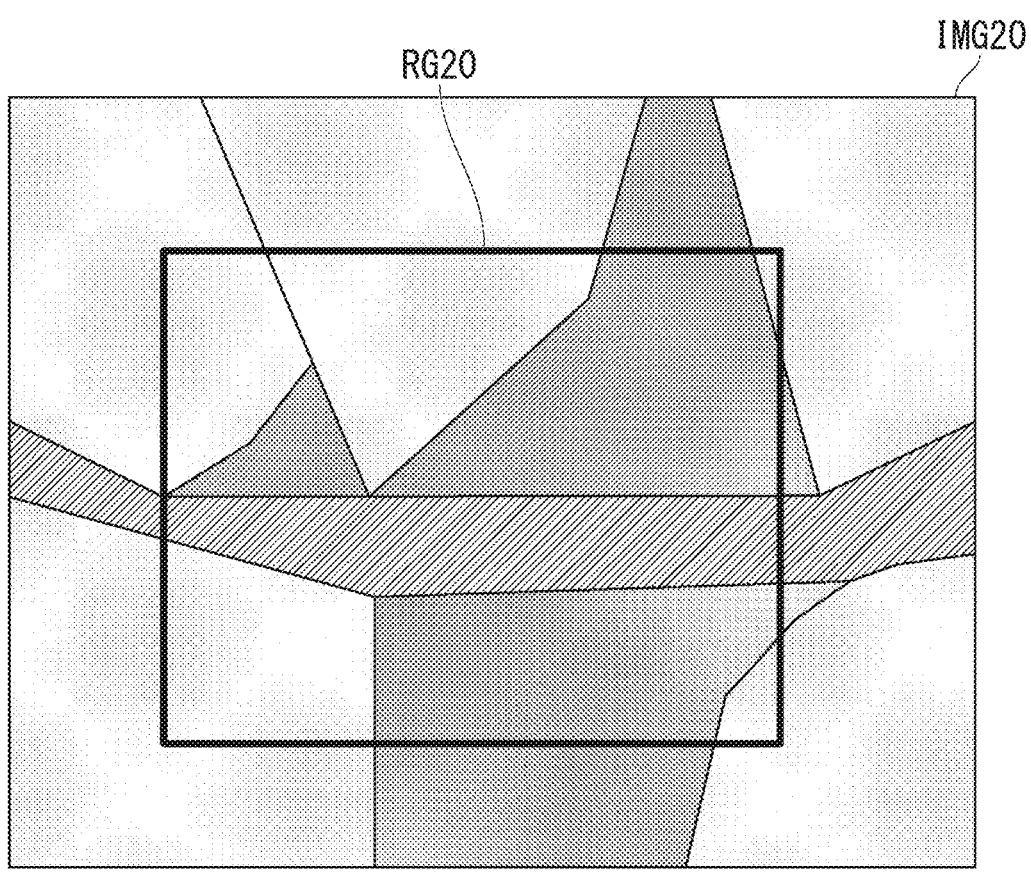
FIG. 16 is a diagram showing an example of an image displayed on a display unit in the third embodiment of the present invention.

FIG. 16 shows an example of an image displayed on the display unit 5 in Step S142. The display control unit 184 displays an image IMG20 on the display unit 5. The image IMG20 is a 2D image of a subject. In the example shown in FIG. 16, the display control unit 184 displays a measurement region RG20 on the display unit 5. The measurement region RG20 is superimposed on the image IMG20. In the example shown in FIG. 16, the display control unit 184 displays a box indicating the measurement region RG20 on the image IMG20. A user can adjust the composition of photography while checking the position of the measurement region RG20.

After Step S142, the measurement unit 181 measures the distance at each of two or more points of the measurement region in Step S102. In this case, the measurement unit 181 does not measure the distance at points of any region other than the measurement region.

The measurement unit 181 may measure the distances at one or more points of a region other than the measurement region in addition to the distances at the two or more points of the measurement region in Step S102. In such a case, the index calculation unit 182 calculates the index on the basis of only the distances at the two or more points of the measurement region.

There is a case in which the comparison unit 186 determines that the index calculated by the index calculation unit 182 does not meet the selection condition in Step S106 after Step S141 is executed. In this case, Step S141 is executed again. In a case in which the composition of photography does not change, the setting unit 189 may set the same measurement region as that which was previously set. Accordingly, a user does not need to input the region information into the endoscope device 1 again.

The measurement region may be a region set in advance. For example, the measurement region includes the center of an image and has a predetermined size. In such a case, a user does not need to input the region information into the endoscope device 1.

The display control unit 184 does not display the measurement region on the display unit 5. Accordingly, Step S142 does not need to be executed.

Steps S111 to S113 shown in FIG. 10 may be executed instead of Step S106.

Steps S121 to S124 shown in FIG. 12 may be executed after Step S108 is executed.

Step S131 shown in FIG. 13 may be executed instead of Step S101.

Each aspect of the present invention may include the following modified example. The setting unit 189 sets a measurement region in one or more images of a subject in the setting step (Step S141). The measurement region includes two or more points in the one or more images.

Each aspect of the present invention may include the following modified example. The display control unit 184 displays each of one or more images of a subject on the display unit 5 and displays the measurement region on an image displayed on the display unit 5 in the region display step (Step S142).

Each aspect of the present invention may include the following modified example. The setting unit 189 sets a measurement region on the basis of region information input into the operation unit 4 in the setting step (Step S141). The region information indicates the position of the measurement region in one or more images of a subject.

In the third embodiment, the endoscope device 1 sets a measurement region in an image acquired by the imaging device 28. The endoscope device 1 calculates the distance between the camera and a subject at a point of the measurement region. Therefore, the endoscope device 1 can increase the possibility that a suitable image for calculating 3D coordinates in the measurement region is selected. A user can designate a region payed attention to by the user as the measurement region. A region of interest such as damage or a dent is unlikely to be seen in the entire image. In many cases, the user adjusts the composition of photography such that a region of interest is positioned at the center of an image in order to easily check the region of interest. By limiting the measurement region, the distance information is calculated only in part of an image. Therefore, the load of calculation is reduced.

A region payed attention to by a user is designated as the measurement region. The possibility that the endoscope device 1 selects an unsuitable image for calculating 3D coordinates of a point in the measurement region and the user needs to designate a measurement region again is reduced. Therefore, the load of operations of the user is reduced.

First Modified Example of Third Embodiment

A first modified example of the third embodiment of the present invention will be described. The endoscope device 1 divides the entire region of an image acquired by the imaging device 28 into two or more regions (segments) by executing segmentation processing. The endoscope device 1 sets at least one of the two or more segments as a measurement region.

Figure 17:
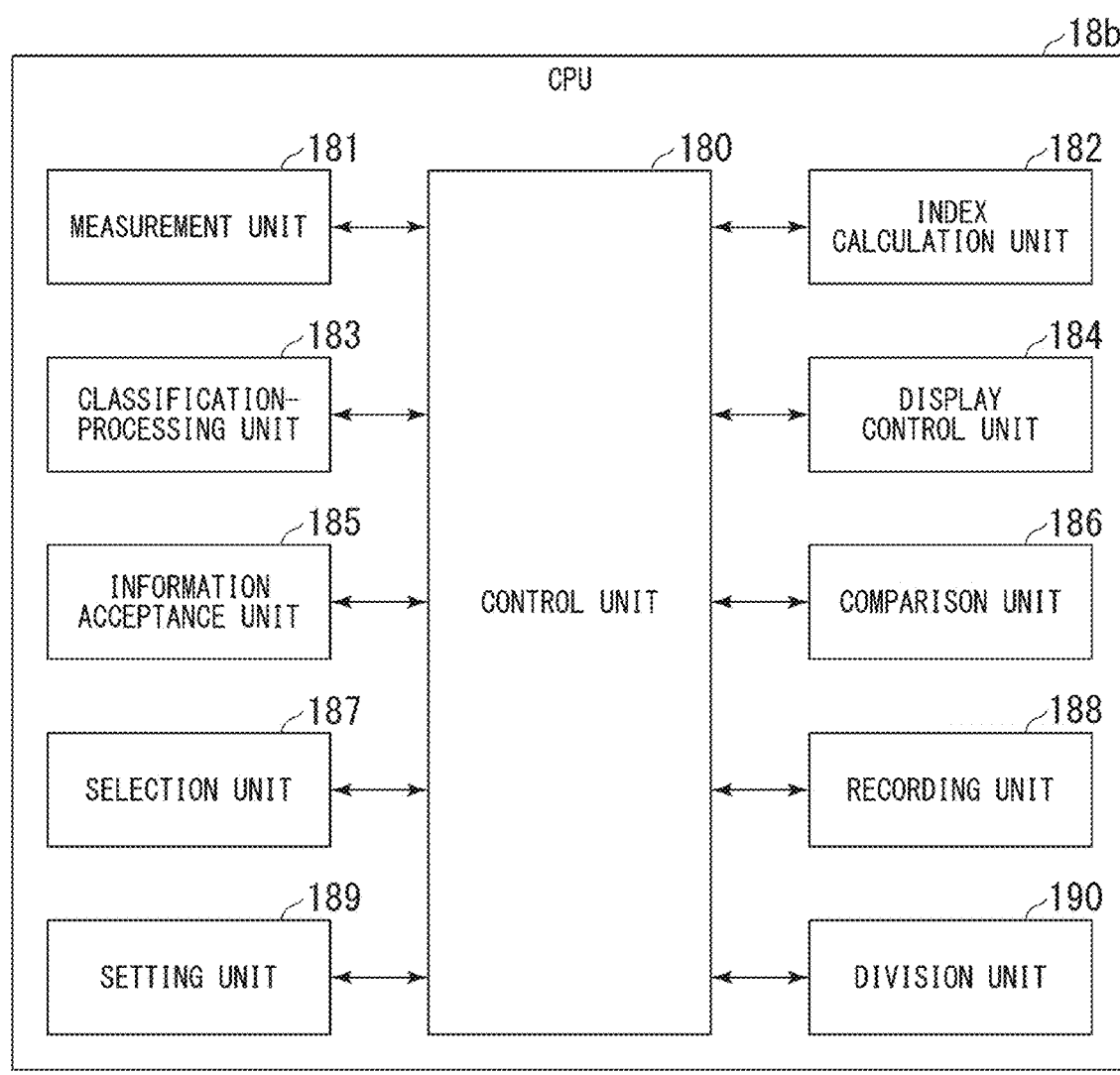
FIG. 17 is a block diagram showing a functional configuration of a CPU included in an endoscope device according to a first modified example of the third embodiment of the present invention.

The CPU 18a shown in FIG. 14 is changed to a CPU 18b shown in FIG. 17. FIG. 17 shows a functional configuration of the CPU 18b. The CPU 18b has functional units including a control unit 180, a measurement unit 181, an index calculation unit 182, a classification-processing unit 183, a display control unit 184, an information acceptance unit 185, a comparison unit 186, a selection unit 187, a recording unit 188, a setting unit 189, and a division unit 190. At least one of the blocks shown in FIG. 17 may be constituted by a different circuit from the CPU 18*b*. The same configuration as that shown in FIG. 14 will not be described.

Each unit shown in FIG. 17 may be constituted by at least one of a processor and a logic circuit. Each unit shown in FIG. 17 may include one or a plurality of processors. Each unit shown in FIG. 17 may include one or a plurality of logic circuits.

The division unit 190 divides the entire region of an image acquired by the imaging device 28 into two or more segments (partial regions) (division step). The entire region corresponds to the entire field angle of the image. The setting unit 189 sets a measurement region in at least one partial region.

Figure 18:
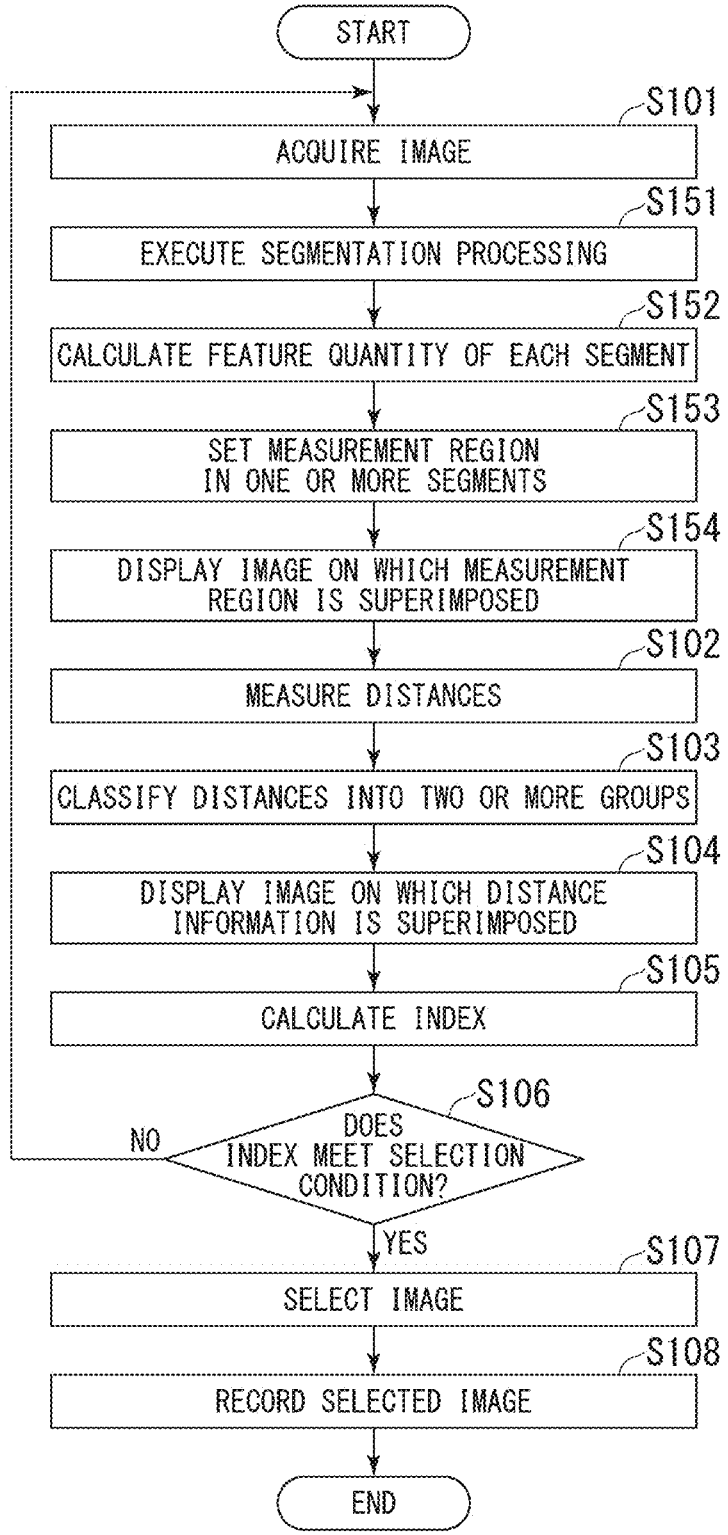
FIG. 18 is a flow chart showing a procedure of image processing in the first modified example of the third embodiment of the present invention.

Image processing in the first modified example of the third embodiment will be described by using FIG. 18. FIG. 18 shows a procedure of the image processing. The same processing as that shown in FIG. 8 will not be described.

After Step S101, the division unit 190 executes segmentation processing. Specifically, the division unit 190 determines a feature of the shape of a subject by using an image acquired by the imaging device 28. The division unit 190 divides (classifies) two or more points included in the image into two or more segments on the basis of the feature. For example, the division unit 190 allocates each of two or more points into one of two or more segments by using a convolutional neural network. In this way, the division unit 190 divides a region of the image into two or more segments (Step S151). Step S151 corresponds to the division step.

The division unit 190 may determine the state of a subject by using an image acquired by the imaging device 28. For example, the division unit 190 may detect an edge of a subject by performing image processing on the image. The division unit 190 may divide three or more points in the image into a first region and a second region. For example, the first region consists of points on the edge. The second region consists of points on a part other than the edge.

The division unit 190 may determine a feature of a subject on the basis of the brightness or the color of an image acquired by the imaging device 28. The division unit 190 may perform matching-processing on a stereo image of a subject and may detect a feature of the subject on the basis of a correlation coefficient obtained in the matching-processing. The division unit 190 may determine a feature of the subject by using a watershed algorithm, deep learning, or the like.

Each of the two or more points is classified into any one of the two or more segments. Each of the two or more segments includes one or more points.

The display control unit 184 displays an image on which the segments are superimposed on the display unit 5 in Step S151. Specifically, the display control unit 184 generates a graphic image signal indicating the segments and outputs the graphic image signal to the video-signal-processing circuit 12. Similar processing to that described above is executed, and the display unit 5 displays an image on which the segments are superimposed.

After Step S151, the setting unit 189 calculates a feature quantity of each of the two or more segments (Step S152).

For example, the setting unit 189 calculates the area of each of the two or more segments. The setting unit 189 may calculate the luminance as a feature quantity of each of the two or more segments. The setting unit 189 may calculate the contrast as a feature quantity of each of the two or more segments.

After Step S152, the setting unit 189 selects one or more segments included in the two or more segments on the basis of the feature quantity calculated in Step S152. The setting unit 189 sets a measurement region in the selected one or more segments (Step S153). Step S153 corresponds to the setting step.

For example, the setting unit 189 sets a measurement region in a segment having the greatest area. In general, the composition of photography is set such that a region payed attention to by a user looks large. By automatically setting a measurement region in a segment having the greatest area, the measurement unit 181 can measure the distance without waiting for setting of the measurement region by the user. The setting unit 189 may set a measurement region in a segment having the greatest luminance. The setting unit 189 may set a measurement region in a segment having the greatest contrast.

After Step S153, the display control unit 184 displays an image on which the measurement region is superimposed on the display unit 5. Specifically, the display control unit 184 generates a graphic image signal indicating the measurement region and outputs the graphic image signal to the video-signal-processing circuit 12. Similar processing to that described above is executed, and the display unit 5 displays an image on which the measurement region is superimposed (Step S154). Step S154 corresponds to the region display step. After Step S154, Step S102 is executed.

Figure 19:
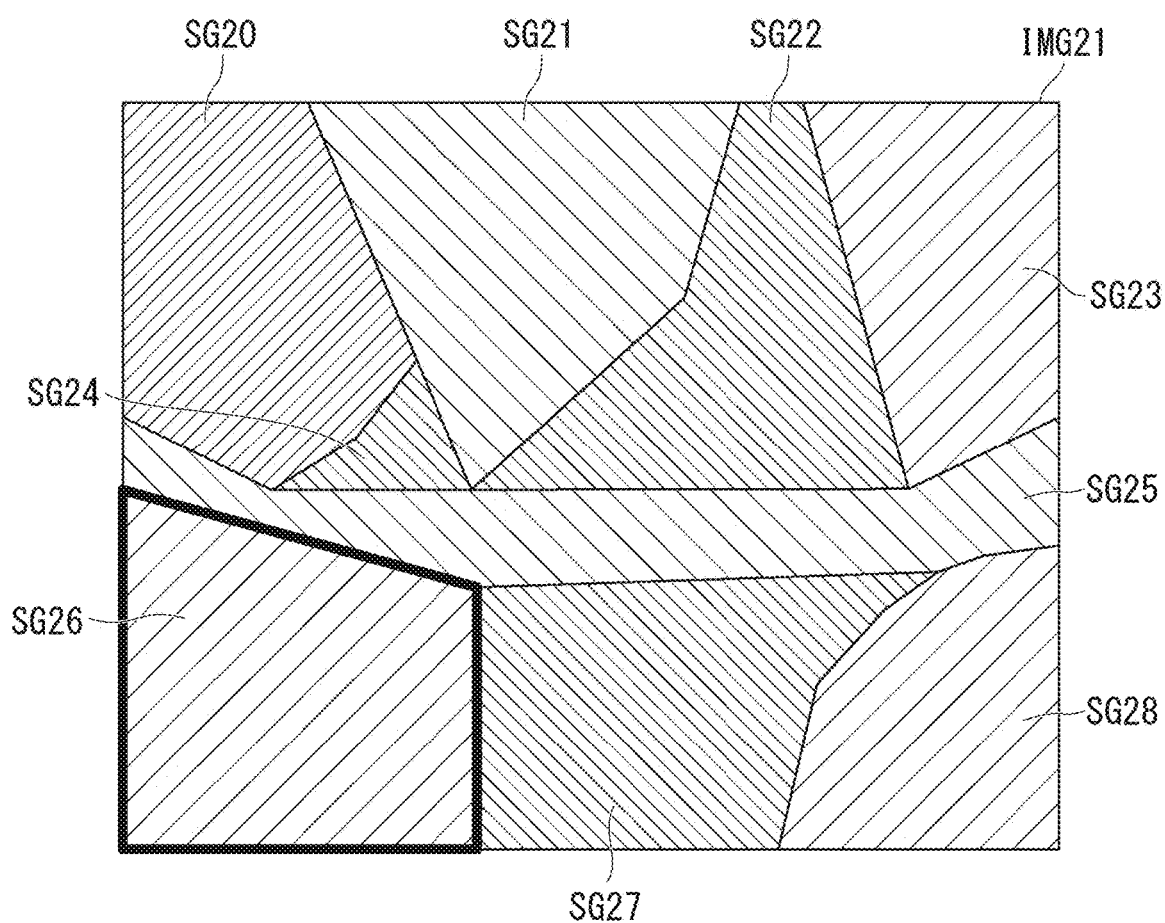
FIG. 19 is a diagram showing an example of an image displayed on a display unit in the first modified example of the third embodiment of the present invention.

FIG. 19 shows an example of an image displayed on the display unit 5 in Step S154. The display control unit 184 displays an image IMG21 on the display unit 5. The image IMG21 is a 2D image of a subject. In the example shown in FIG. 19, the display control unit 184 displays a segment SG20, a segment SG21, a segment SG22, a segment SG23, a segment SG24, a segment SG25, a segment SG26, a segment SG27, and a segment SG28 on the image IMG21. Each of the segments is superimposed on the image IMG21. These segments are displayed in different colors, patterns, or the like. The display control unit 184 does not need to superimpose each segment on the image IMG21. The display control unit 184 may display each segment in a different region from that in which the image IMG21 is displayed.

The display control unit 184 may display each segment at the time of setting a measurement region, but may display only a segment of the set measurement region in Step S154 at the time of measuring the distance. At this time, the display control unit 184 displays a segment of the measurement region on the image IMG21 or displays the segment of the measurement region in a different region from that in which the image IMG21 is displayed. Since a region other than the measurement region that should be payed attention to is not displayed, the visibility of the screen of the display unit 5 is improved.

The setting unit 189 calculates the area of each of the segments shown in FIG. 19. For example, the area represents the number of pixels included in each of the segments. The setting unit 189 sets a measurement region in a segment having the greatest area. For example, the area of the segment SG26 is greater than the area of any other segment. The setting unit 189 sets a measurement region in the segment SG26.

The display control unit 184 displays the measurement region on the display unit 5. In the example shown in FIG. 19, the display control unit 184 displays a box indicating the measurement region on the segment SG26. A user can check the position of the measurement region.

Step S154 does not need to be executed. The endoscope device 1 may execute Step S102 without executing Step S154 after Step S153 is executed. The display control unit 184 may display an image on which the distance information and the measurement region are superimposed on the display unit 5 in Step S104.

Steps S111 to S113 shown in FIG. 10 may be executed instead of Step S106.

Steps S121 to S124 shown in FIG. 12 may be executed after Step S108 is executed.

Step S131 shown in FIG. 13 may be executed instead of Step S101.

Each aspect of the present invention may include the following modified example. The division unit 190 divides the entire region of each of one or more images of a subject into two or more partial regions (segments) in the division step (Step S151). The setting unit 189 sets a measurement region in at least one partial region included in the two or more partial regions in the setting step (Step S153).

In the first modified example of the third embodiment, the endoscope device 1 sets at least one of two or more segments as a measurement region. A user does not need to perform an operation for designating a measurement region. Therefore, the burden on the user for setting a measurement region is alleviated.

Second Modified Example of Third Embodiment

A second modified example of the third embodiment of the present invention will be described. The endoscope device 1 divides the entire region of an image acquired by the imaging device 28 into two or more segments as in the first modified example of the third embodiment. The endoscope device 1 detects a feature region in the image by executing image processing or the like. For example, the feature region is a region in which there is damage. The feature region may be a region having a predetermined shape or a predetermined color. The endoscope device 1 sets one or more segments in which the feature region is detected as a measurement region. The endoscope device 1 includes the CPU 18b shown in FIG. 17.

After the division unit 190 executes the segmentation processing, the setting unit 189 detects a feature region in each of two or more segments. The feature region is not always detected in all the two or more segments. When the feature region is detected in one or more segments, the setting unit 189 sets a measurement region in the one or more segments.

Figure 20:
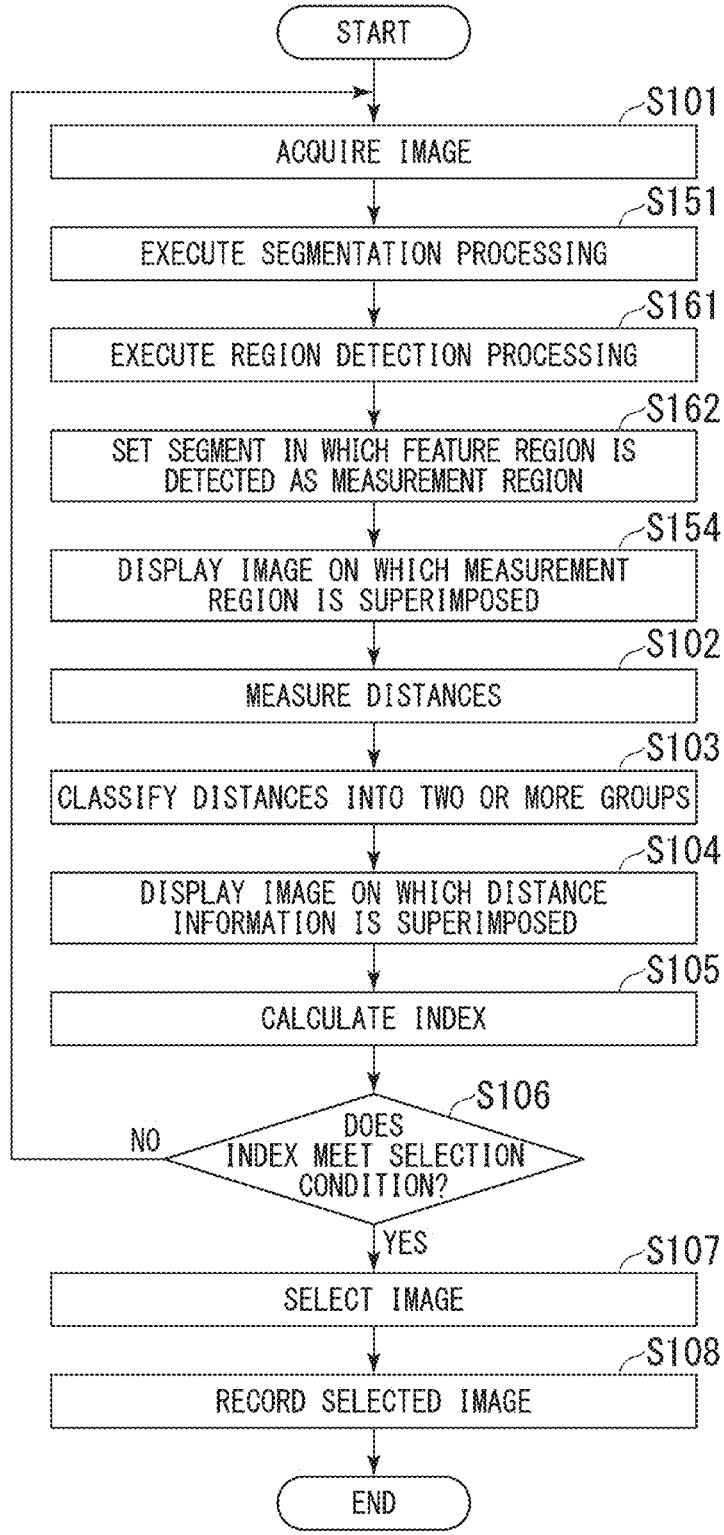
FIG. 20 is a flow chart showing a procedure of image processing in a second modified example of the third embodiment of the present invention.

Image processing in the second modified example of the third embodiment will be described by using FIG. 20. FIG. 20 shows a procedure of the image processing. The same processing as that shown in FIG. 18 will not be described.

After Step S151, the setting unit 189 executes region detection processing of detecting a feature region (Step S161).

After Step S161, the setting unit 189 selects one or more segments in which the feature region is detected. The setting unit 189 sets a measurement region in the selected segment (Step S162). Step S162 corresponds to the setting step.

After Step S162, the display control unit 184 displays an image on which the measurement region is superimposed on the display unit 5 in Step S154.

Figure 21:
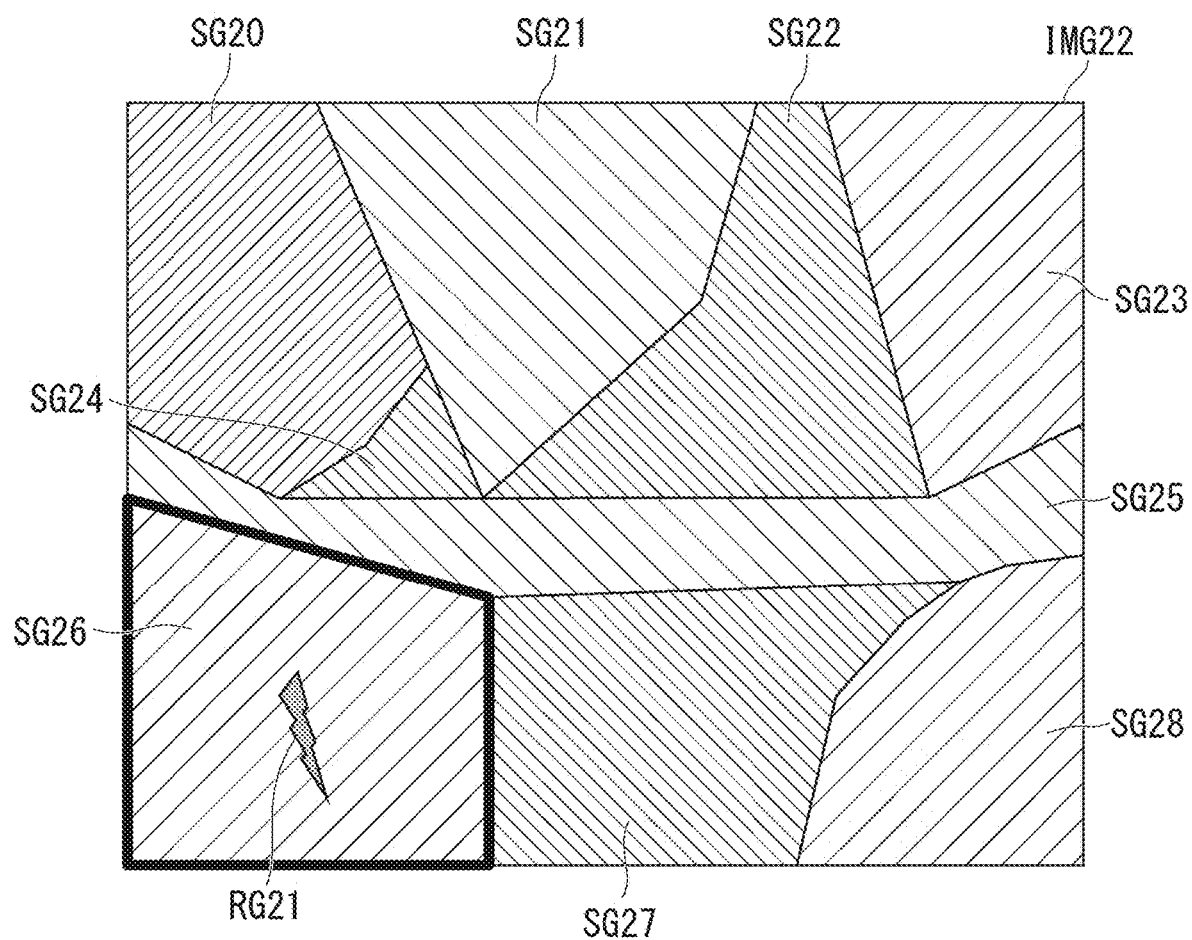
FIG. 21 is a diagram showing an example of an image displayed on a display unit in the second modified example of the third embodiment of the present invention.

FIG. 21 shows an example of an image displayed on the display unit 5 in Step S154. The display control unit 184 displays an image IMG22 on the display unit 5. The image IMG22 is a 2D image of a subject. In the example shown in FIG. 21, the display control unit 184 displays a segment SG20, a segment SG21, a segment SG22, a segment SG23, a segment SG24, a segment SG25, a segment SG26, a segment SG27, and a segment SG28 on the image IMG22. Each of the segments is superimposed on the image IMG22. These segments are displayed in different colors, patterns, or the like.

For example, the setting unit 189 detects a feature region RG21 in the segment SG26 by executing the region detection processing. The setting unit 189 sets a measurement region in the segment SG26.

The display control unit 184 displays the measurement region on the display unit 5. In the example shown in FIG. 21, the display control unit 184 displays a box indicating the measurement region on the segment SG26. A user can check the position of the measurement region.

Steps S111 to S113 shown in FIG. 10 may be executed instead of Step S106.

Steps S121 to S124 shown in FIG. 12 may be executed after Step S108 is executed.

Step S131 shown in FIG. 13 may be executed instead of Step S101.

In the second modified example of the third embodiment, the endoscope device 1 sets one or more segments including a feature region as a measurement region. A user does not need to perform an operation for designating a measurement region. Therefore, the burden on the user for setting a measurement region is alleviated.

Third Modified Example of Third Embodiment

A third modified example of the third embodiment of the present invention will be described. The endoscope device 1 divides the entire region of an image acquired by the imaging device 28 into two or more segments as in the first modified example of the third embodiment. The endoscope device 1 sets one or more segments designated by a user as a measurement region. The endoscope device 1 includes the CPU 18b shown in FIG. 17.

After the division unit 190 executes the segmentation processing, the display control unit 184 displays an image on the display unit 5. A user selects a segment by operating the operation unit 4. Specifically, the user inputs a selection instruction for selecting a segment into the endoscope device 1 by operating the operation unit 4. The information acceptance unit 185 accepts the selection instruction. The selection instruction indicates one or more segments designated by the user.

In an example in which a cursor is displayed on an image, a user moves the cursor to an intended position on the image and performs a click operation or the like. At this time, the information acceptance unit 185 accepts the position. In an example in which the display unit 5 is constituted as a touch panel, the user touches the screen of the display unit 5. The user may select a segment by pressing a button displayed on the display unit 5. At this time, the information acceptance unit 185 accepts the position designated through the operation. The setting unit 189 sets a measurement region in a segment including the position indicated by the selection instruction.

Figure 22:
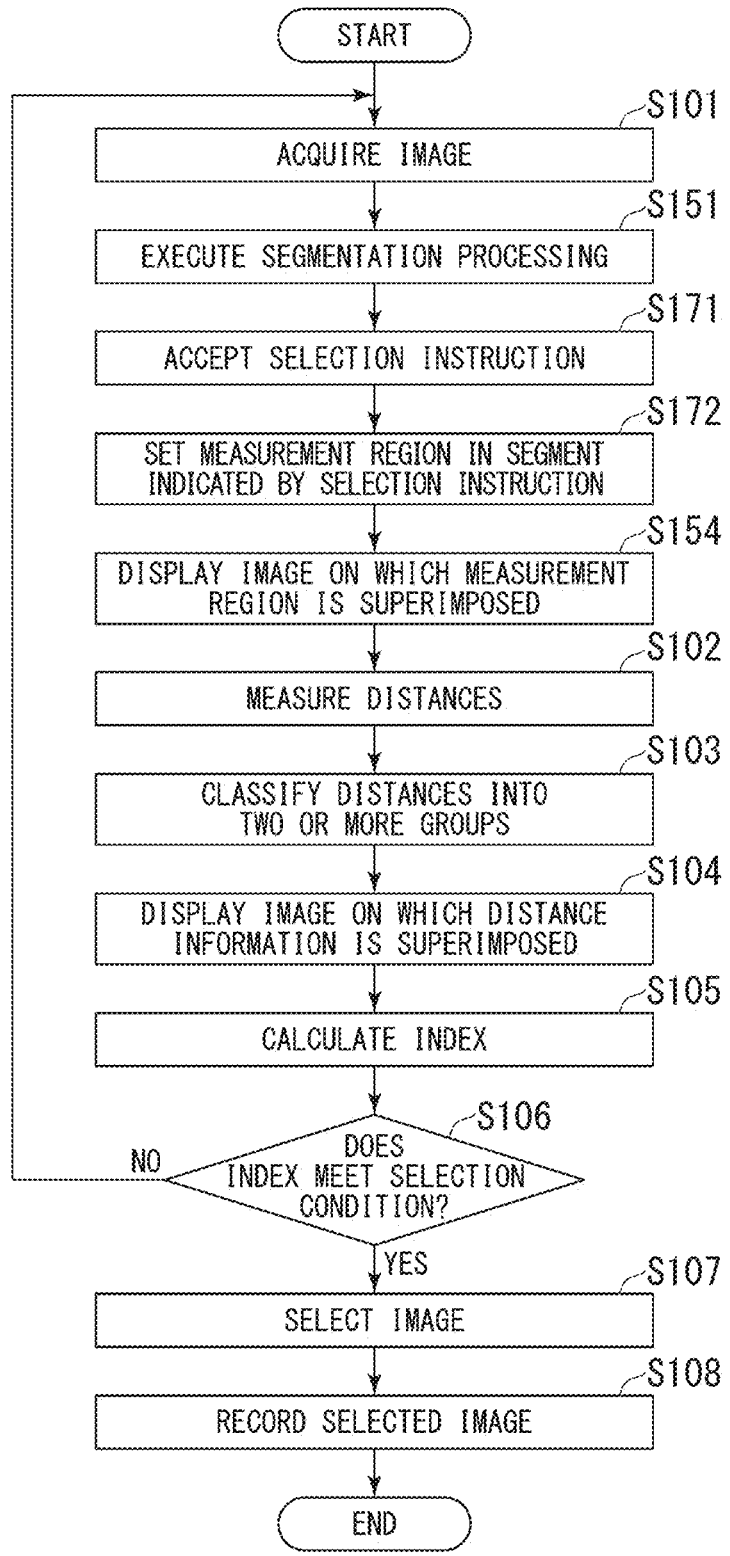
FIG. 22 is a flow chart showing a procedure of image processing in a third modified example of the third embodiment of the present invention.

Image processing in the third modified example of the third embodiment will be described by using FIG. 22. FIG. 22 shows a procedure of the image processing. The same processing as that shown in FIG. 18 will not be described.

After Step S151, the information acceptance unit 185 accepts a selection instruction (Step S171).

After Step S171, the setting unit 189 identifies a segment including the position indicated by the selection instruction. The setting unit 189 sets a measurement region in the identified segment (Step S172). After Step S172, Step S154 is executed.

Figure 23:
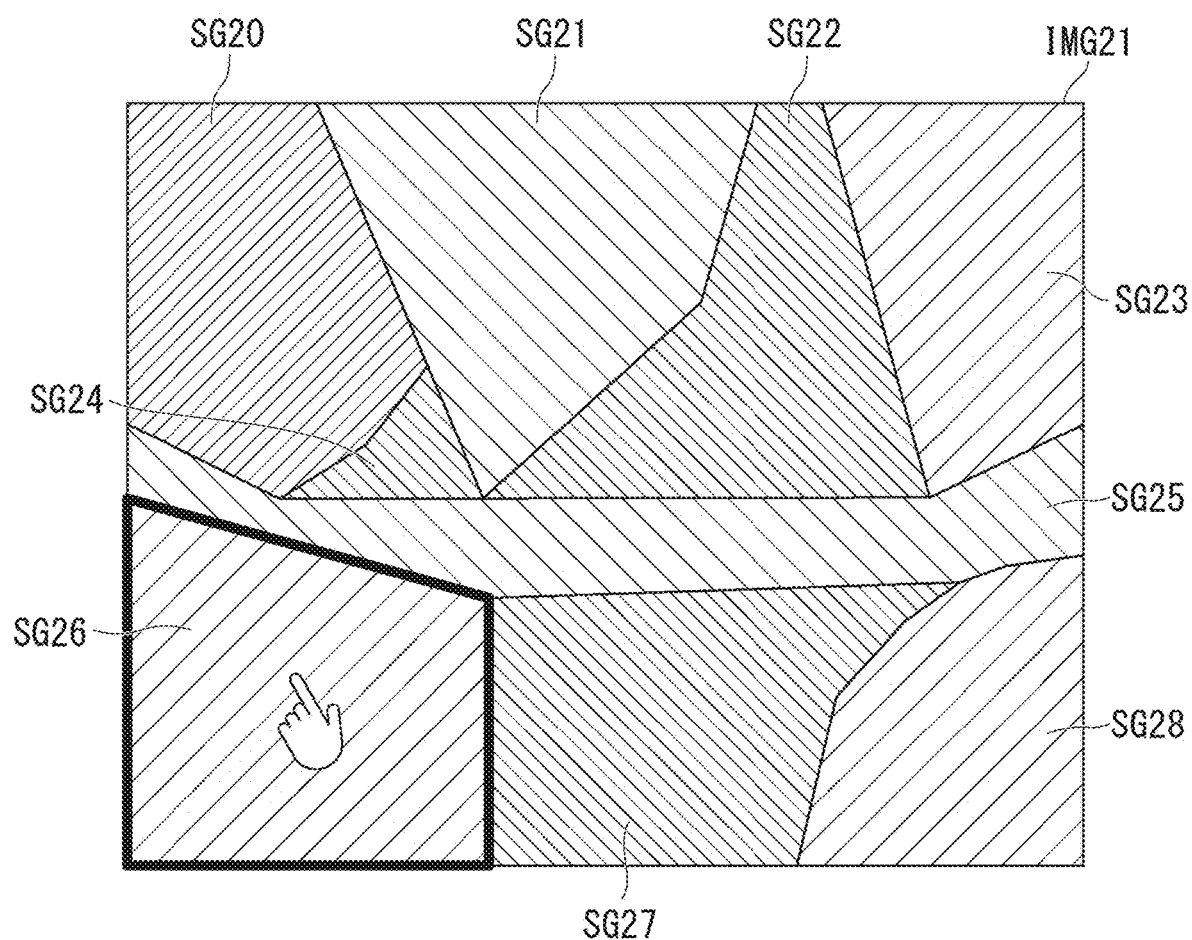
FIG. 23 is a diagram showing an example of an image displayed on a display unit in the third modified example of the third embodiment of the present invention.

FIG. 23 shows an example of an image displayed on the display unit 5 in Step S154. The display control unit 184 displays an image IMG21 on the display unit 5. The same parts as those shown in FIG. 19 will not be described.

A user inputs a selection instruction for selecting a segment into the endoscope device 1 by operating the operation unit 4. The information acceptance unit 185 accepts the selection instruction. In the example shown in FIG. 23, the selection instruction indicates a position in the segment SG26. The setting unit 189 identifies the segment SG26 including the position indicated by the selection instruction and sets a measurement region in the segment SG26.

The display control unit 184 displays the measurement region on the display unit 5. In the example shown in FIG. 23, the display control unit 184 displays a box indicating the measurement region on the segment SG26. A user can check the position of the measurement region.

When the comparison unit 186 determines that the index calculated by the index calculation unit 182 does not meet the selection condition in Step S106, Steps S101 to S106, Step S151, Step S171, Step S172, and Step S154 are executed again. In a case in which the composition of photography does not change very much, the setting unit 189 may set a measurement region in a segment that is at the same position as that of the segment identified when Step S172 was executed last time. In this case, Step S171 does not need to be executed.

Steps S111 to S113 shown in FIG. 10 may be executed instead of Step S106.

Steps S121 to S124 shown in FIG. 12 may be executed after Step S108 is executed.

Step S131 shown in FIG. 13 may be executed instead of Step S101.

In the third modified example of the third embodiment, the endoscope device 1 sets one or more segments designated by a user as a measurement region. The user performs an operation of designating any position in a segment. Since the user does not need to accurately designate a position on an image, the burden on the user for setting a measurement region is alleviated.

It is sometimes difficult to set the composition of photography such that a segment payed attention to by a user is maximized in a specific inspection target. Since the user can designate a segment, the endoscope device 1 can process an image intended by the user.

Fourth Embodiment

A fourth embodiment of the present invention will be described. The endoscope device 1 executes similar processing to the image processing in the second embodiment and records two or more suitable images for calculating 3D coordinates on a recording medium. The endoscope device 1 selects the best image of the two or more images. The endoscope device 1 includes the CPU 18 shown in FIG. 7.

The selection unit 187 selects two or more images that meet the selection condition described above. The recording unit 188 records the two or more images selected by the selection unit 187 on a recording medium. The selection unit 187 selects an image associated with the best index among the two or more images. In this way, the selection unit 187 selects the most suitable image for calculating 3D coordinates.

Figure 24:
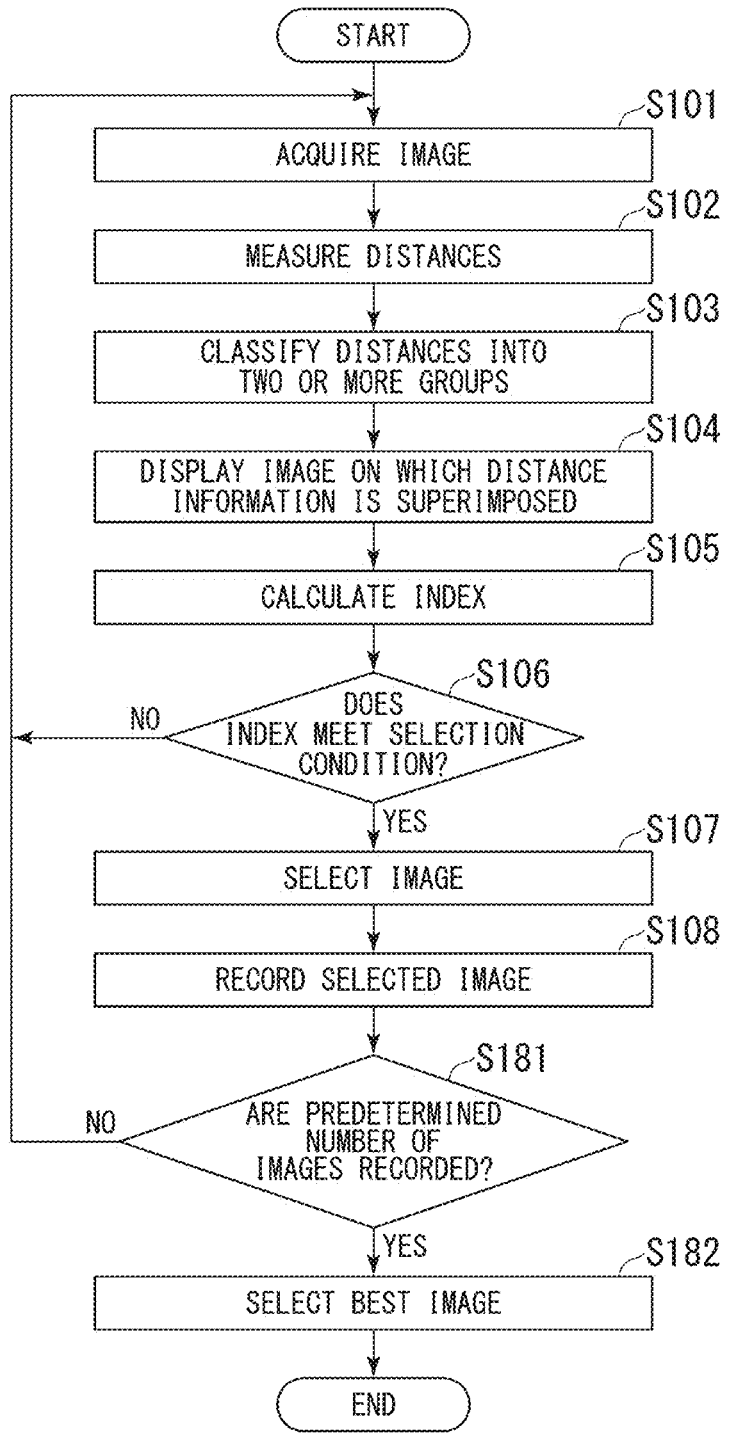
FIG. 24 is a flow chart showing a procedure of image processing in a fourth embodiment of the present invention.

Image processing in the fourth embodiment will be described by using FIG. 24. FIG. 24 shows a procedure of the image processing. The same processing as that shown in FIG. 8 will not be described.

After Step S108, the control unit 180 determines whether a predetermined number of images are recorded on the recording medium (Step S181). The predetermined number is two or more. For example, the predetermined number is ten.

When the control unit 180 determines that the predetermined number of images are not recorded on the recording medium in Step S181, Step S101 is executed. Steps S101 to S108 and Step S181 are repetitively executed until the predetermined number of images are recorded on the recording medium.

When the control unit 180 determines that the predetermined number of images are recorded on the recording medium in Step S181, the selection unit 187 compares the indices of the two or more images recorded on the recording medium with each other. The selection unit 187 selects one image associated with the best index (Step S182). When Step S182 is executed, the image processing is completed.

For example, the index calculation unit 182 calculates a first index in Step S105. The first index increases as the camera nears a subject. Each of the above-described two or more images has the first index greater than a threshold value. Alternatively, the index calculation unit 182 calculates a second index in Step S105. The second index decreases as the camera nears the subject. Each of the above-described two or more images has the second index less than a threshold value.

The selection unit 187 selects an image having the greatest first index in Step S182. Alternatively, the selection unit 187 selects an image having the least second index in Step S182.

The display control unit 184 displays an image on which the distance information is superimposed on the display unit 5 in Step S104. A user refers to the distance information and changes the composition of photography, which increases the possibility that a suitable image for calculating 3D coordinates is acquired.

There is a case in which two or more consecutive images are recorded on the recording medium in Step S108. Even when the composition does not change very much, many images may be recorded on the recording medium. Therefore, the recording capacity may be insufficient.

When N consecutive images meet the selection condition, the recording unit 188 may record only one of the N images on the recording medium. The number N is two or more. For example, the number N is ten. In this way, the recording capacity is less likely to run short.

The recording unit 188 may calculate the amount of movement of a subject between the image selected in Step S107 and the image recorded last time. The recording unit 188 may record the image selected in Step S107 on the recording medium only when the amount of movement is greater than a predetermined amount. For example, the predetermined amount is 10 pixels. In this way, the recording capacity is less likely to run short.

Before a user inputs photography instruction into the endoscope device 1, acquisition of images and display of images may be repetitively executed. The user may input the photography instruction into the endoscope device 1 by operating the operation unit 4. The information acceptance unit 185 may accept the photography instruction. When the information acceptance unit 185 accepts the photography instruction, Step S102 may be executed.

A user may input a recording instruction into the endoscope device 1 by operating the operation unit 4. The information acceptance unit 185 may accept the recording instruction. When the control unit 180 determines that the predetermined number of images are not recorded on the recording medium in Step S181 and the information acceptance unit 185 accepts the recording instruction, Step S182 may be executed.

After Step S182, the display control unit 184 may display the image selected in Step S182 on the display unit 5. A user may check the image displayed on the display unit 5. The user may input a selection instruction for selecting an image into the endoscope device 1 by operating the operation unit 4. The information acceptance unit 185 may accept the selection instruction. When the information acceptance unit 185 accepts the selection instruction, the image selected in Step S182 becomes enabled.

Steps S111 to S113 shown in FIG. 10 may be executed instead of Step S106.

Steps S121 to S124 shown in FIG. 12 may be executed after Step S182 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 and Step S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

In the fourth embodiment, the endoscope device 1 selects the best image of two or more suitable images for calculating 3D coordinates. A user does not need to carefully set the composition of photography. The user may roughly set the composition of photography. Therefore, the burden on the user is alleviated.

Modified Example of Fourth Embodiment

A modified example of the fourth embodiment of the present invention will be described. The endoscope device 1 calculates two or more types of indices and records two or more suitable images for calculating 3D coordinates on a recording medium for each of the indices. The endoscope device 1 selects the best image of the two or more images for each of the indices. The endoscope device 1 displays the image selected for each of the indices. In this way, the endoscope device 1 displays two or more images. A user selects one of the two or more displayed images. The endoscope device 1 includes the CPU 18 shown in FIG. 7.

Figure 25:
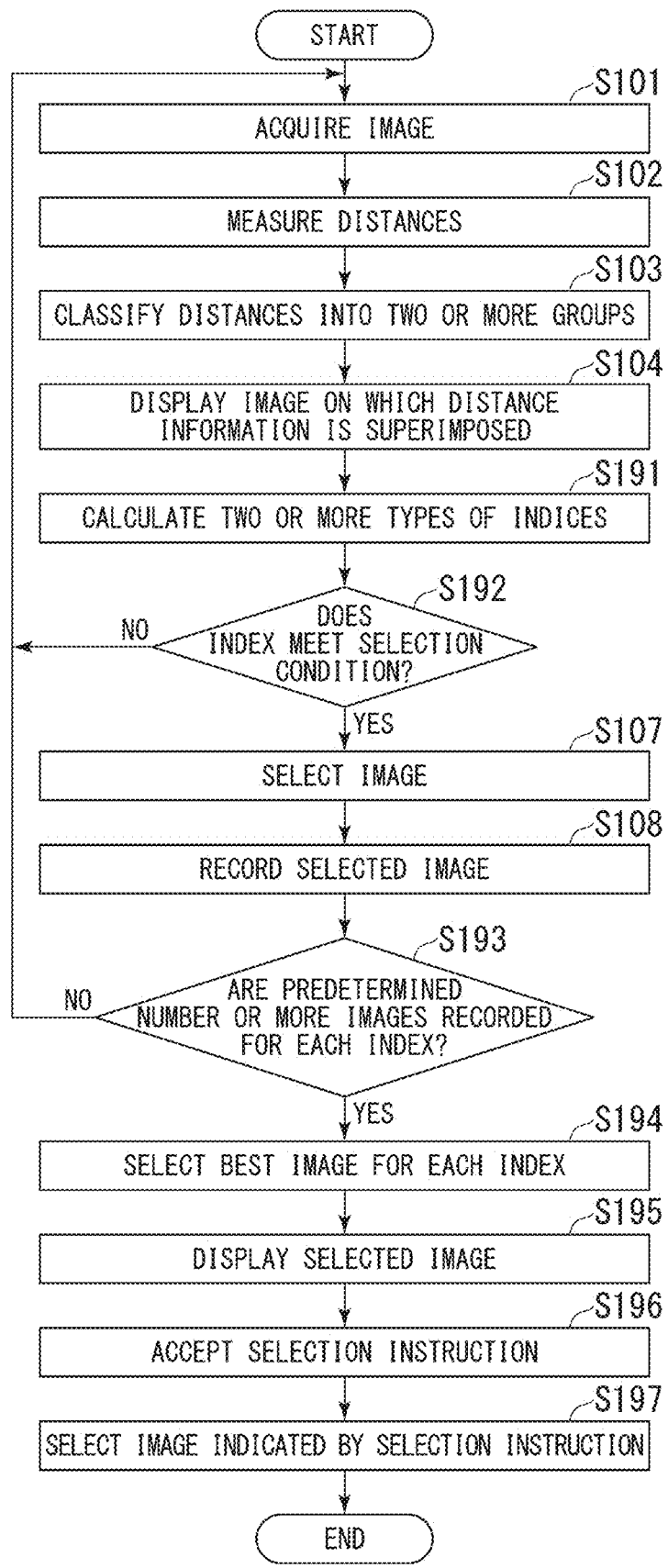
FIG. 25 is a flow chart showing a procedure of image processing in a modified example of the fourth embodiment of the present invention.

Image processing in the modified example of the fourth embodiment will be described by using FIG. 25. FIG. 25 shows a procedure of the image processing. The same processing as that shown in FIG. 8 will not be described.

After Step S104, the index calculation unit 182 calculates two or more types of indices on the basis of the distance measured in Step S102. For example, the index calculation unit 182 calculates an index A and an index B. The index calculation unit 182 associates the two or more types of indices with an image used for calculating the distance. The two or more types of indices are associated with each image acquired by the imaging device 28 (Step S191). Step S191 corresponds to the index calculation step.

After Step S191, the comparison unit 186 compares each of the two or more types of indices calculated by the index calculation unit 182 with a threshold value. The comparison unit 186 determines whether each of the indices meets the selection condition. For example, the comparison unit 186 determines whether the index A meets the selection condition and determines whether the index B meets the selection condition. The threshold value compared with the index A may be different from that compared with the index B (Step S192). Step S192 corresponds to the comparison step.

When the comparison unit 186 determines that all the two or more types of indices do not meet the selection condition in Step S192, Step S101 is executed. When the comparison unit 186 determines that one or more types of indices meet the selection condition in Step S192, the selection unit 187 selects an image associated with the one or more types of indices in Step S107.

After Step S107, the recording unit 188 records the image selected by the selection unit 187 on the recording medium in Step S108. For example, when the index A meets the selection condition, the recording unit 188 records an image associated with the index A on the recording medium in Step S108. When the index B meets the selection condition, the recording unit 188 records an image associated with the index B on the recording medium in Step S108. When the index A and the index B meet the selection condition, the recording unit 188 records an image associated with the index A and the index B on the recording medium in Step S108.

After Step S108, the control unit 180 determines whether a predetermined number or more images are recorded on the recording medium for each of the indices. For example, the control unit 180 determines whether the predetermined number or more images associated with the index A are recorded on the recording medium. In addition, the control unit 180 determines whether the predetermined number or more images associated with the index B are recorded on the recording medium (Step S193). The predetermined number is two or more. For example, the predetermined number is ten.

When the control unit 180 determines that the predetermined number or more images are not recorded on the recording medium regarding one or more types of indices in Step S193, Step S101 is executed. When the control unit 180 determines that the predetermined number or more images are recorded on the recording medium regarding all the two or more types of indices in Step S193, the selection unit 187 executes similar processing to Step S182 shown in FIG. 24 for each of the indices and selects the best image for each of the indices. For example, the control unit 180 selects an image associated with the best index A among the two or more images. In addition, the control unit 180 selects an image associated with the best index B among the two or more images (Step S194).

After Step S194, the display control unit 184 displays the image selected in Step S194 on the display unit 5. For example, the display control unit 184 displays the image associated with the best index A on the display unit 5 and displays the image associated with the best index B on the display unit 5 (Step S195).

The display control unit 184 may display the index associated with the image selected in Step S194 on the display unit 5. For example, the display control unit 184 may display the index on the image. In other words, the display control unit 184 may display the image on which the index is superimposed on the display unit 5. A user can check the index.

After the image associated with each of the two or more types of indices is displayed, a user inputs a selection instruction for selecting an image into the endoscope device 1 by operating the operation unit 4. The information acceptance unit 185 accepts the selection instruction (Step S196). The selection instruction indicates any one of two or more images displayed on the display unit 5. The selection instruction may indicate at least two of two or more images displayed on the display unit 5.

After Step S196, the selection unit 187 selects an image indicated by the selection instruction (Step S197). When Step S197 is executed, the image processing is completed.

Steps S111 to S113 shown in FIG. 10 may be executed instead of Step S192. In this case, the comparison unit 186 generates the comparison information for each of the indices in Step S111.

Steps S121 to S124 shown in FIG. 12 may be executed after Step S197 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 and Step S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

In the modified example of the fourth embodiment, the endoscope device 1 presents two or more suitable images for calculating 3D coordinates to a user. The user can select one of the two or more images.

Fifth Embodiment

A fifth embodiment of the present invention will be described. The endoscope device 1 has the 3D reconfiguration function. The endoscope device 1 executes the 3D reconfiguration processing and generates a 3D model of a subject. The 3D model indicates a 3D shape of the subject. The endoscope device 1 displays the 3D model.

Figure 26:
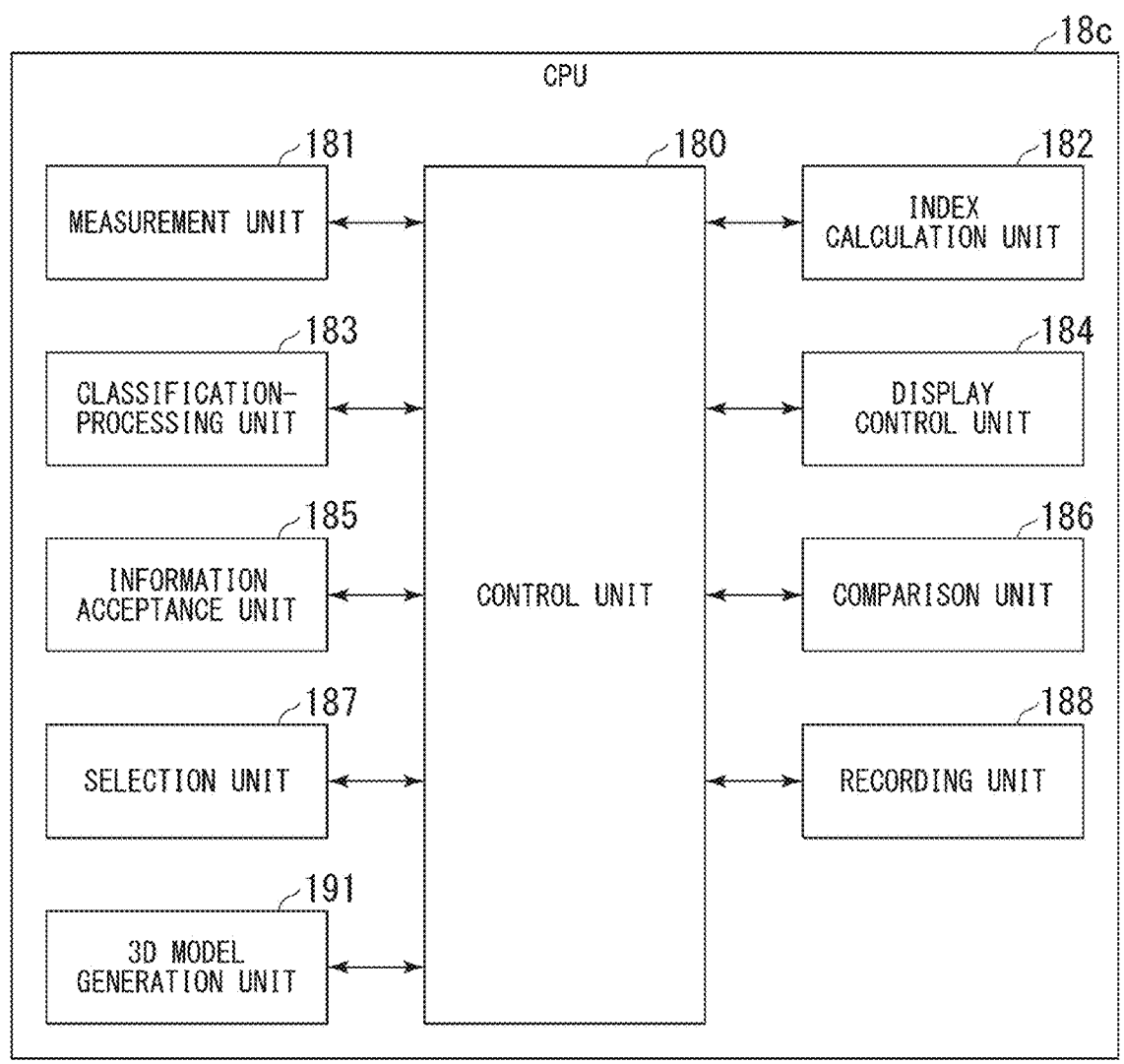
FIG. 26 is a block diagram showing a functional configuration of a CPU included in an endoscope device according to a fifth embodiment of the present invention.

The CPU 18 shown in FIG. 7 is changed to a CPU 18c shown in FIG. 26. FIG. 26 shows a functional configuration of the CPU 18c. The CPU 18c has functional units including a control unit 180, a measurement unit 181, an index calculation unit 182, a classification-processing unit 183, a display control unit 184, an information acceptance unit 185, a comparison unit 186, a selection unit 187, a recording unit 188, and a 3D model generation unit 191. At least one of the blocks shown in FIG. 26 may be constituted by a different circuit from the CPU 18c. The same configuration as that shown in FIG. 7 will not be described.

Each unit shown in FIG. 26 may be constituted by at least one of a processor and a logic circuit. Each unit shown in FIG. 26 may include one or a plurality of processors. Each unit shown in FIG. 26 may include one or a plurality of logic circuits.

The 3D model generation unit 191 calculates 3D coordinates of two or more points on a subject on the basis of one or more images acquired by the imaging device 28 and generates a 3D model including the 3D coordinates of the two or more points (shape calculation step). For example, the 3D model generation unit 191 generates a 3D model by using a stereo image. The 3D model generation unit 191 functions as a shape calculation unit. The display control unit 184 displays a 3D shape of a subject on the display unit 5 by displaying the 3D model on the display unit 5 (shape display step).

In a case in which a stereo image is used, a stereo optical system is mounted as an optical adaptor in the distal end 20 of the insertion unit 2. The stereo optical system includes a first optical system and a second optical system. The stereo optical system causes two optical images acquired through two different optical systems to be incident on the imaging device 28. When the stereo optical system is produced, the positional relationship between the first optical system and the second optical system is acquired. In addition, when the stereo optical system is produced, the relationship of the imaging direction between the first optical system and the second optical system is acquired. Accordingly, when a stereo image is generated, a parameter corresponding to each of the position of the camera and the posture of the camera is known. The 3D model generation unit 191 calculates 3D coordinates of two or more points on a subject by using the parameter.

Figure 27:
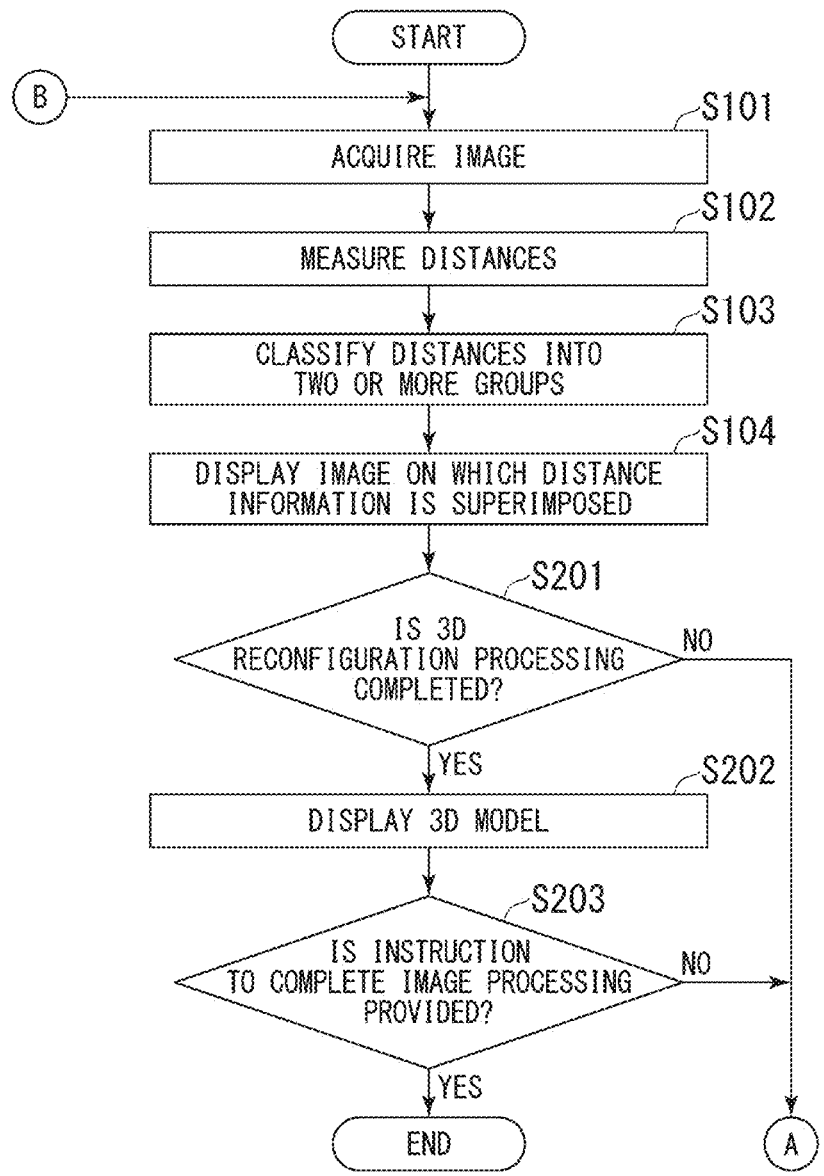
FIG. 27 is a flow chart showing a procedure of image processing in the fifth embodiment of the present invention.
Figure 28:
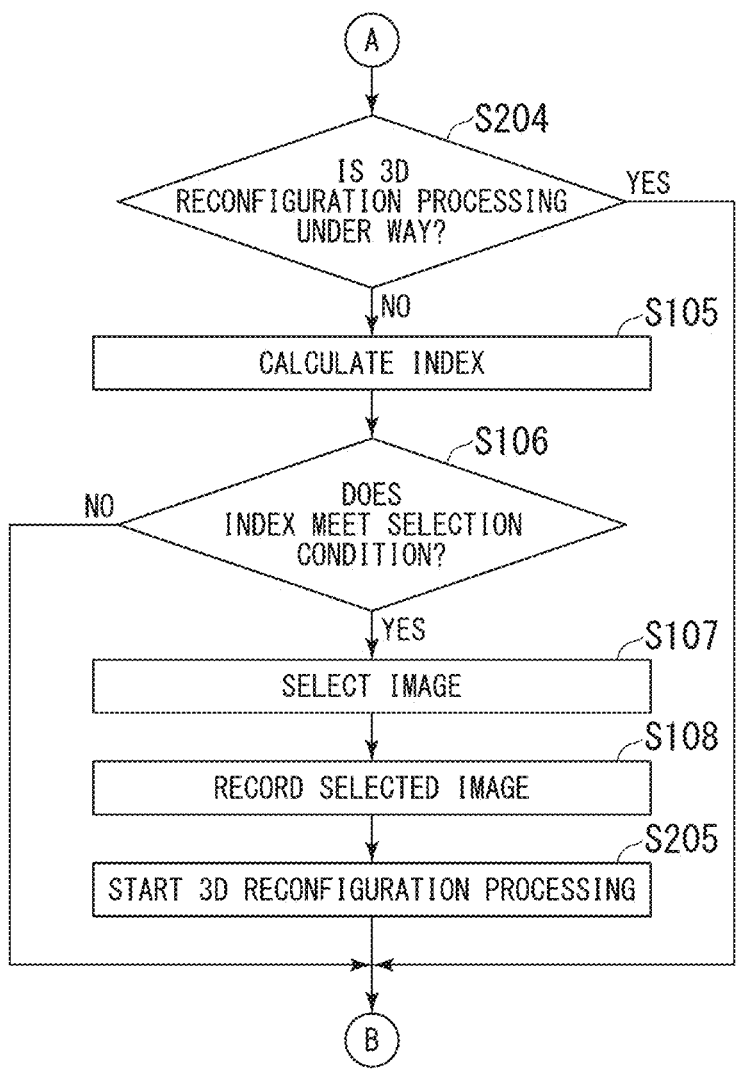
FIG. 28 is a flow chart showing a procedure of the image processing in the fifth embodiment of the present invention.

Image processing in the fifth embodiment will be described by using FIG. 27 and FIG. 28. FIG. 27 and FIG. 28 show a procedure of the image processing. The same processing as that shown in FIG. 8 will not be described.

After Step S104, the control unit 180 determines whether the 3D reconfiguration processing started in Step S205 described later is completed (Step S201).

Before the 3D model generation unit 191 starts the 3D reconfiguration processing described later, the control unit 180 determines that the 3D reconfiguration processing is not completed. If the 3D model generation unit 191 has started the 3D reconfiguration processing in Step S205 and has not completed the 3D reconfiguration processing, the control unit 180 determines that the 3D reconfiguration processing is not completed. If the 3D model generation unit 191 has completed the 3D reconfiguration processing and has not started next 3D reconfiguration processing, the control unit 180 determines that the 3D reconfiguration processing is completed.

When the control unit 180 determines that the 3D reconfiguration processing is not completed in Step S201, Step S204 is executed. When the control unit 180 determines that the 3D reconfiguration processing is completed in Step S201, the display control unit 184 displays the 3D model generated by the 3D model generation unit 191 on the display unit 5 (Step S202). Step S202 corresponds to the shape display step. The display control unit 184 displays an image of a subject and the 3D model on the display unit 5 at the same time.

Figure 29:
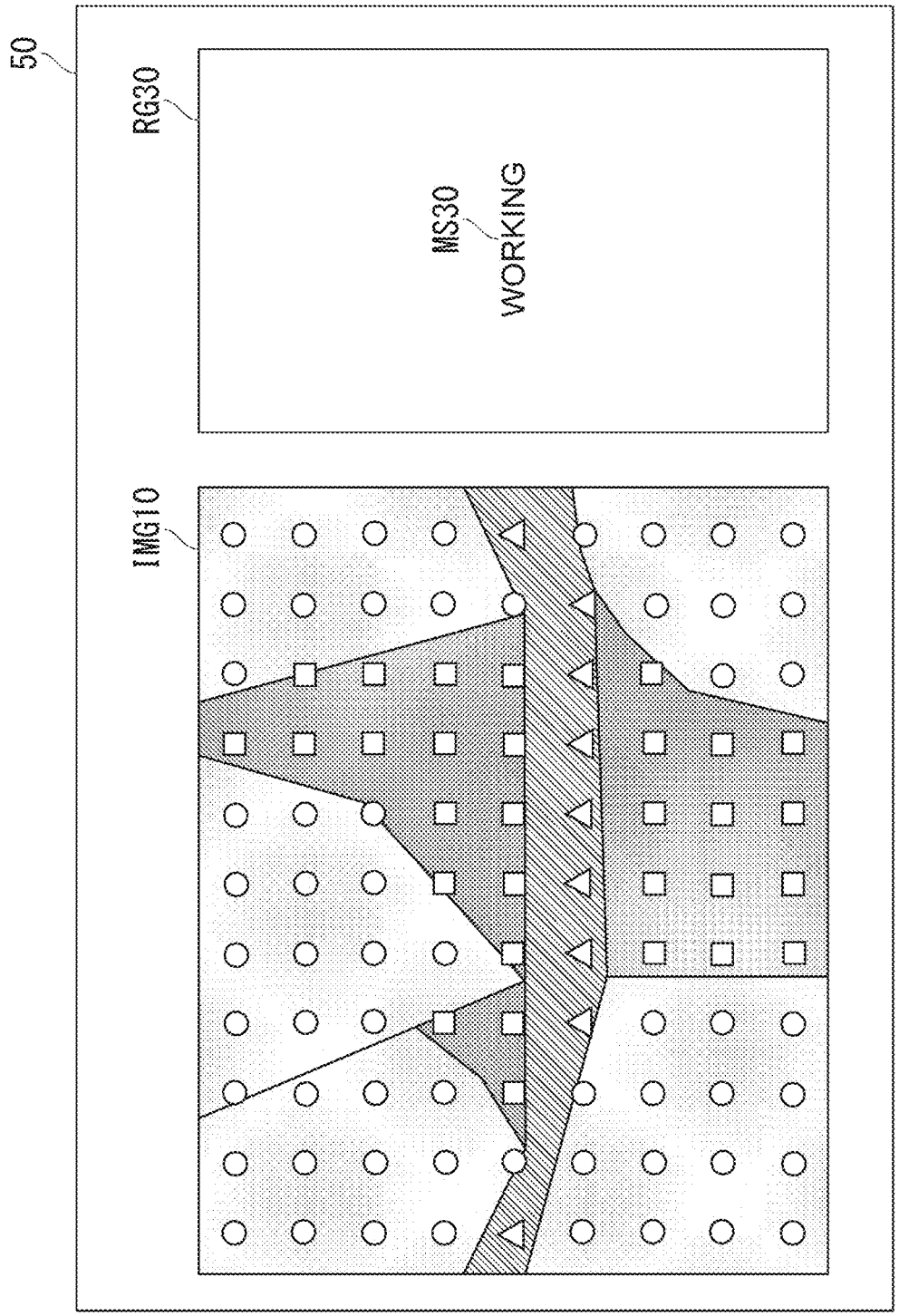
FIG. 29 is a diagram showing an example of an image displayed on a display unit in the fifth embodiment of the present invention.

FIG. 29 shows an example of an image displayed on the display unit 5 in Step S104. The display unit 5 includes a display screen 50. The display control unit 184 displays an image IMG10 on the display screen 50. The image IMG10 is the same as that shown in FIG. 9. When the 3D reconfiguration processing is not completed, the display control unit 184 displays a message MS30 in a region RG30 of the display screen 50. The message MS30 indicates that the 3D reconfiguration processing is under way.

Figure 30:
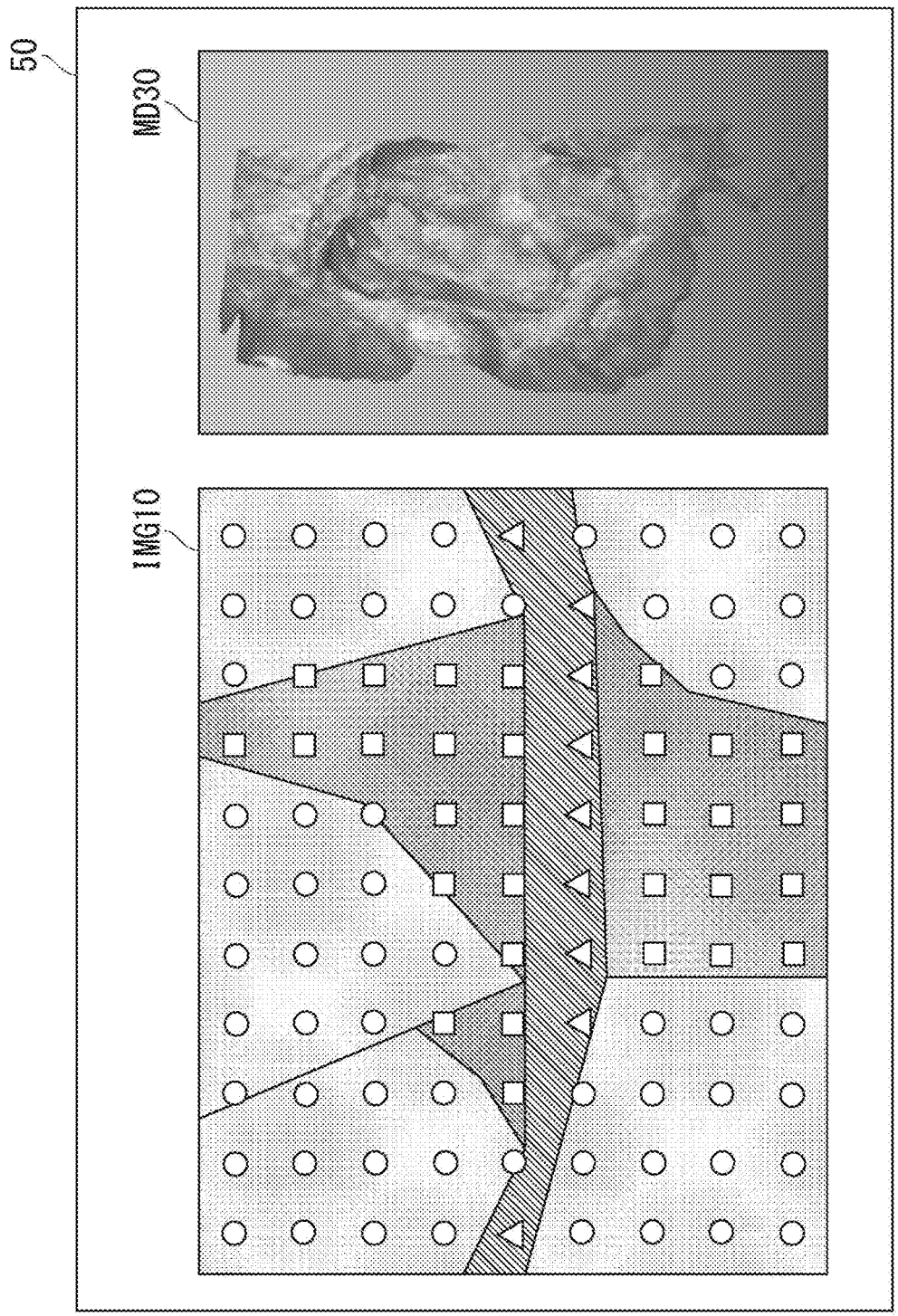
FIG. 30 is a diagram showing an example of an image displayed on the display unit in the fifth embodiment of the present invention.

FIG. 30 shows an example of an image displayed on the display unit 5 in Step S202. The display control unit 184 displays an image IMG10 and a 3D model MD30 on the display screen 50. The image IMG10 is the same as that shown in FIG. 9. The 3D model MD30 is displayed in the region RG30 shown in FIG. 29. The display control unit 184 displays the image IMG10 in a first region of the display screen 50 and displays the 3D model MD30 in a second region of the display screen 50. The second region is different from the first region. The 3D model MD30 does not overlap the image IMG10.

A user can determine the state of a subject by checking the 3D model MD30. For example, the user can determine whether there is an abnormality such as damage on a subject. The display control unit 184 displays the 3D model MD30 of a subject seen from a viewpoint of an endoscope on the display unit 5. Therefore, the user can easily check the posture of the camera with respect to the surface of a subject. In addition, the user may rotate the 3D model MD30 of a subject by operating the operation unit 4. In this way, the user can change the viewpoint of the endoscope to a viewpoint at which a feature of a subject is more easily acquired.

There is a case in which the measurement unit 181 cannot calculate 3D coordinates in a region of a subject. In this case, the region is not displayed in the 3D model MD30. A user can determine whether a 3D model of a region payed attention to by the user is obtained. When a 3D model is not displayed in the region RG30, there is a possibility that the measurement unit 181 is calculating 3D coordinates. Since the message MS30 shown in FIG. 29 is displayed, the user can distinguish a case in which the measurement unit 181 is calculating 3D coordinates and a case in which the measurement unit 181 cannot calculate 3D coordinates from each other.

There is a case in which 3D coordinates calculated by the measurement unit 181 include some noise. In this case, the influence of the noise appears in the 3D model MD30. A user can determine whether the noise is small. The user can determine whether an appropriate 3D model is obtained by executing the above-described determination. The user can check the 3D model MD30 along with the image IMG10. When the measurement unit 181 is calculating 3D coordinates, the user can continue an inspection without suspending the inspection. When the user determines that an appropriate 3D model MD30 is not obtained, the user can set the composition of photography again.

The display control unit 184 may change the size of the image IMG10 in accordance with whether the 3D model MD30 is displayed. For example, the 3D model MD30 is not displayed in the second embodiment described above. In this case, the display control unit 184 may display the image IMG10 on the display screen 50 such that the image IMG10 becomes larger than the image IMG10 shown in FIG. 30. The display control unit 184 may display the image IMG10 and the 3D model MD30 on the display screen 50 such that part of the image IMG10 and part of the 3D model MD30 overlap each other. The display control unit 184 may alternately switch between the image IMG10 and the 3D model MD30. In this way, the display control unit 184 can display the image IMG10 and the 3D model MD30, each of which has a suitable size for performing both an inspection using the image IMG10 and the check of the 3D model MD30.

The display control unit 184 may display a 3D model of a subject seen from a different viewpoint from that of an endoscope on the display unit 5. In this way, a user can easily determine whether an appropriate 3D model is obtained.

If a 3D model is displayed on the display unit 5 and a user is satisfied with the quality of the 3D model, the user inputs a completion instruction into the endoscope device 1 by operating the operation unit 4. The information acceptance unit 185 accepts the completion instruction. The control unit 180 determines whether the information acceptance unit 185 has accepted the completion instruction. In this way, the control unit 180 determines whether an instruction to complete the image processing is provided (Step S203).

If the information acceptance unit 185 has accepted the completion instruction, the control unit 180 determines that the instruction to complete the image processing is provided. If the information acceptance unit 185 has not accepted the completion instruction, the control unit 180 determines that the instruction to complete the image processing is not provided.

When the control unit 180 determines that the instruction to complete the image processing is provided in Step S203, the image processing is completed. When the control unit 180 determines that the instruction to complete the image processing is not provided in Step S203, the control unit 180 determines whether the 3D reconfiguration processing is under way (Step S204).

Before the 3D model generation unit 191 starts the 3D reconfiguration processing described later, the control unit 180 determines that the 3D reconfiguration processing is not under way. If the 3D model generation unit 191 has started the 3D reconfiguration processing in Step S205 and has not completed the 3D reconfiguration processing, the control unit 180 determines that the 3D reconfiguration processing is under way. If the 3D model generation unit 191 has completed the 3D reconfiguration processing and has not started next 3D reconfiguration processing, the control unit 180 determines that the 3D reconfiguration processing is not under way.

When the control unit 180 determines that the 3D reconfiguration processing is under way in Step S204, Step S101 is executed. When the control unit 180 determines that the 3D reconfiguration processing is not under way in Step S204, Step S105 is executed.

After Step S108, the 3D model generation unit 191 starts the 3D reconfiguration processing (Step S205). Step S205 corresponds to the shape calculation step. After Step S205, Step S101 is executed.

The 3D model generation unit 191 executes the 3D reconfiguration processing by using an algorithm for calculating a precise 3D shape. For example, the 3D reconfiguration processing requires an execution time of several seconds. The 3D model generation unit 191 executes the 3D reconfiguration processing in the background. Therefore, the 3D reconfiguration processing is executed simultaneously with measurement of the distance and calculation of the index.

For example, the calculation resources of the endoscope device 1 are limited, and the endoscope device 1 is unable to execute two or more pieces of the 3D reconfiguration processing at the same time. Next 3D reconfiguration processing is not executed until the 3D model generation unit 191 completes the 3D reconfiguration processing.

The selection unit 187 selects an image that meets the selection condition described above in Step S107. The recording unit 188 records the image on a recording medium in Step S108. The 3D model generation unit 191 starts the 3D reconfiguration processing using the image in Step S205.

While the 3D model generation unit 191 executes the 3D reconfiguration processing, the control unit 180 determines that the 3D reconfiguration processing is not completed in Step S201. Therefore, the 3D model generated in the 3D reconfiguration processing is not displayed on the display unit 5. While the 3D model generation unit 191 executes the 3D reconfiguration processing, the control unit 180 determines that the 3D reconfiguration processing is under way in Step S204. Therefore, an image that meets the selection condition described above is not selected, and new 3D reconfiguration processing is not started.

After the 3D model generation unit 191 completes the 3D reconfiguration processing, the control unit 180 determines that the 3D reconfiguration processing is completed in Step S201. Therefore, the display control unit 184 displays the 3D model on the display unit 5 in Step S202. The displayed 3D model continues to be displayed until a next 3D model is completed. After the 3D model generation unit 191 completes the 3D reconfiguration processing and the selection unit 187 selects an image that meets the selection condition in Step S107, the 3D model generation unit 191 starts the 3D reconfiguration processing using the image in Step S205.

Figure 31:
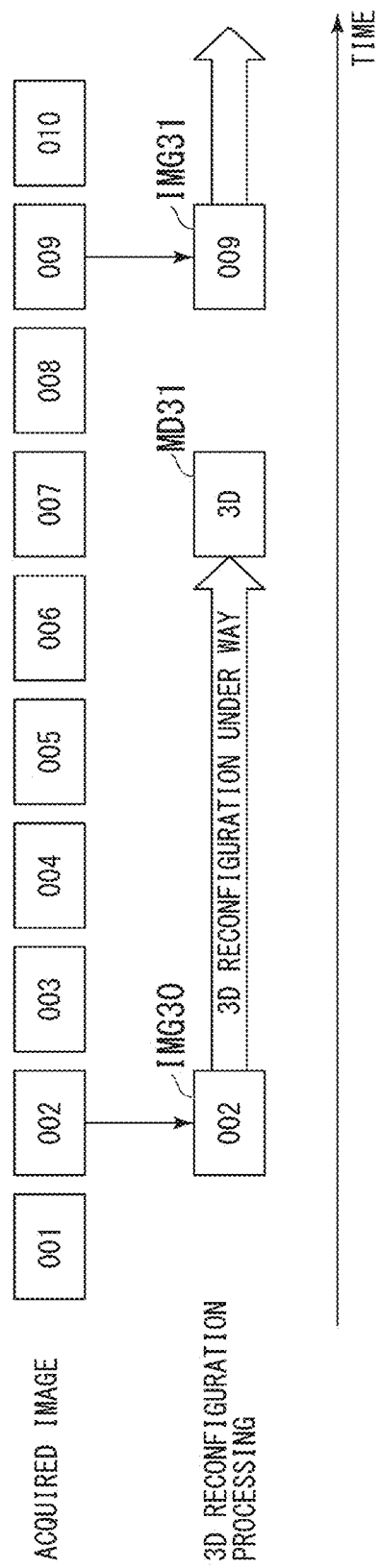
FIG. 31 is a diagram showing a situation in which 3D reconfiguration processing is executed in the fifth embodiment of the present invention.

FIG. 31 shows a situation in which the 3D reconfiguration processing is executed. The imaging device 28 sequentially acquires two or more images. The two or more images are shown. In the example shown in FIG. 31, ten images are shown. The right direction shown in FIG. 31 indicates time. The position of each image in FIG. 31 indicates a time point at which each image is acquired.

In the example shown in FIG. 31, an image IMG30 is recorded on a recording medium in Step S108. For example, the image IMG30 is a stereo image including two 2D images. The 3D model generation unit 191 executes the 3D reconfiguration processing by using the image IMG30.

While the 3D model generation unit 191 executes the 3D reconfiguration processing, the imaging device 28 sequentially acquires images. While the 3D model generation unit 191 executes the 3D reconfiguration processing, an image that meets the selection condition is not selected.

While the 3D model generation unit 191 executes the 3D reconfiguration processing, Step S104 is repetitively executed. The display control unit 184 displays an image on which the distance information is superimposed on the display unit 5 in Step S104. A user refers to the distance information and can change the composition of photography.

In the example shown in FIG. 31, the 3D model generation unit 191 generates a 3D model MD31 and completes the 3D reconfiguration processing. The display control unit 184 displays the 3D model MD31 on the display unit 5.

A user checks the 3D model MD31. If the user is not satisfied with the quality of the 3D model MD31, the user does not input the completion instruction into the endoscope device 1. In this case, the user can change the composition of photography. An image that meets the selection condition is recorded on a recording medium again. In the example shown in FIG. 31, an image IMG31 is recorded on the recording medium in Step S108. The 3D model generation unit 191 executes the 3D reconfiguration processing by using the image IMG31.

Steps S111 to S113 shown in FIG. 10 may be executed instead of Step S106.

Steps S121 to S124 shown in FIG. 12 may be executed after Step S202 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 and Step S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

In a case in which the 3D model generation unit 191 executes the 3D reconfiguration processing in the entire region of an image, a processing time may be long. In a case in which the measurement region is set in Step S141, Step S153, Step S162, or Step S172, a necessary processing time for the 3D reconfiguration processing is shortened.

Each aspect of the present invention may include the following modified example. The 3D model generation unit 191 (shape calculation unit) calculates a 3D shape (3D model) of a subject by using at least one image recorded on a recording medium in the shape calculation step (Step S205).

Each aspect of the present invention may include the following modified example. The display control unit 184 displays the 3D shape (3D model) on the display unit 5 in the shape display step (Step S202).

In the fifth embodiment, the endoscope device 1 displays a 3D model of a subject. A user can determine the state of a subject by checking the 3D model. In addition, the user can determine whether an appropriate 3D model is obtained.

While the 3D reconfiguration processing is executed, the endoscope device 1 measures the distance and displays the distance information. A user can adjust the composition without waiting for completion of the 3D reconfiguration processing. Therefore, the endoscope device 1 can shorten a processing time. The processing time indicates a period of time during which the endoscope device 1 acquires a 3D model having the quality that satisfies the user.

Sixth Embodiment

A sixth embodiment of the present invention will be described. The endoscope device 1 generates a 3D model of a subject as in the fifth embodiment. The endoscope device 1 sequentially records two or more images that meet the selection condition described above on a recording medium. The endoscope device 1 sequentially executes the 3D reconfiguration processing twice or more and sequentially generates two or more 3D models. The endoscope device 1 displays the two or more 3D models. The endoscope device 1 includes the CPU 18c shown in FIG. 26.

The 3D model generation unit 191 generates a 3D model of a subject as in the fifth embodiment (shape calculation step). The display control unit 184 displays the 3D model on the display unit 5 as in the fifth embodiment (shape display step). The display control unit 184 displays the image used for generating the 3D model on the display unit 5 (image display step). Before the 3D reconfiguration processing is executed, or when the 3D reconfiguration processing is executed, the display control unit 184 displays the image on the display unit 5.

Figure 32:
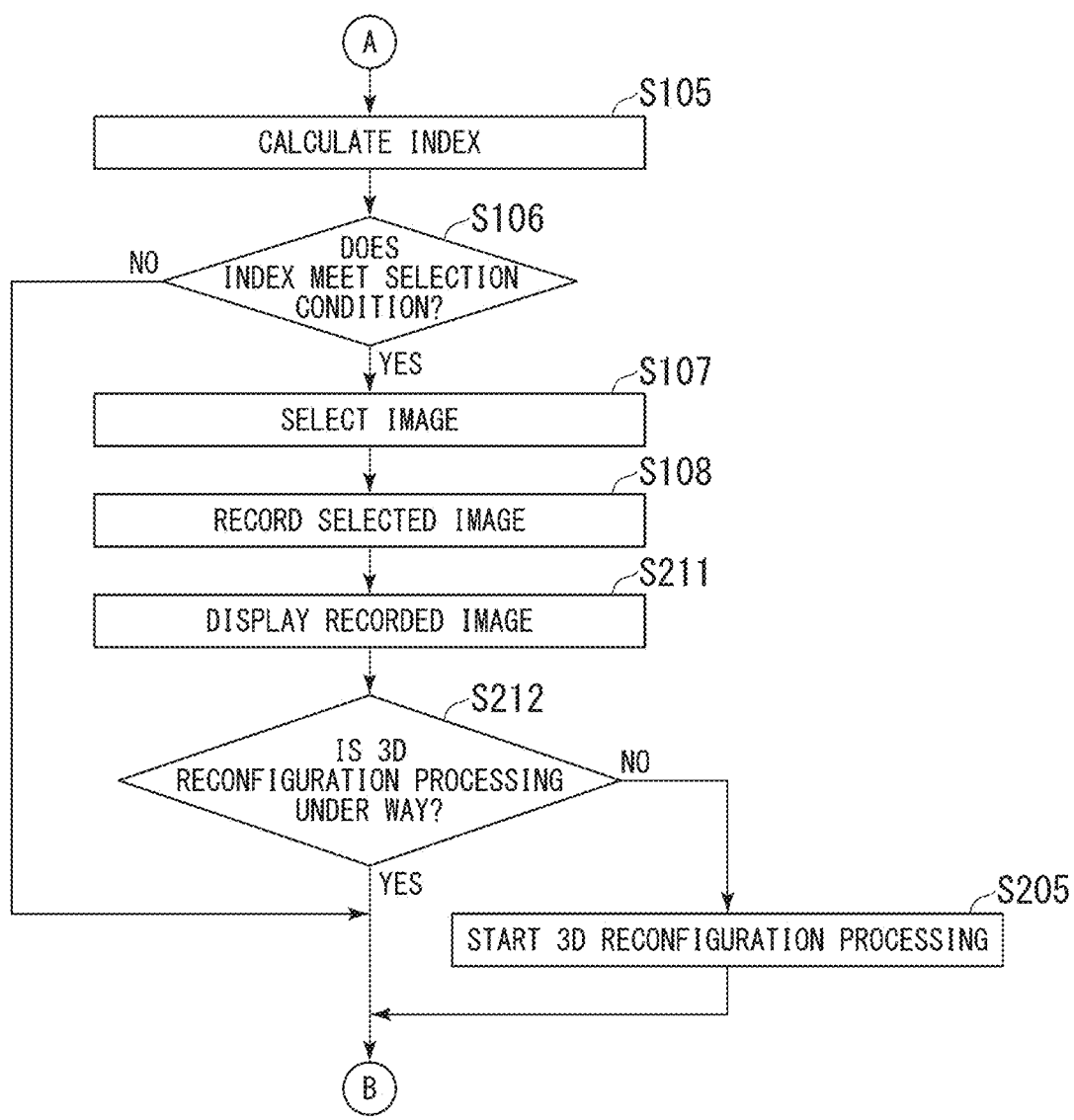
FIG. 32 is a flow chart showing a procedure of image processing in a sixth embodiment of the present invention.

Image processing in the sixth embodiment will be described by using FIG. 27 and FIG. 32. FIG. 27 and FIG. 32 show a procedure of the image processing. The processing shown in FIG. 27 is the same as that in the fifth embodiment. Therefore, the processing shown in FIG. 27 will not be described. In addition, the same processing as that shown in FIG. 8 will not be described.

After Step S108, the display control unit 184 displays the image recorded on the recording medium in Step S108 on the display unit 5 (Step S211). Step S211 corresponds to the image display step.

After Step S211, the control unit 180 determines whether the 3D reconfiguration processing is under way (Step S212). Step S212 is similar to Step S204 shown in FIG. 28.

When the control unit 180 determines that the 3D reconfiguration processing is under way in Step S212, Step S101 is executed. When the control unit 180 determines that the 3D reconfiguration processing is not under way in Step S212, Step S205 is executed.

The selection unit 187 selects an image that meets the selection condition described above in Step S107. The recording unit 188 records the image on the recording medium in Step S108. The 3D model generation unit 191 starts the 3D reconfiguration processing using the image in Step S205.

While the 3D model generation unit 191 executes the 3D reconfiguration processing, the control unit 180 determines that the 3D reconfiguration processing is not completed in Step S201. Therefore, the 3D model generated in the 3D reconfiguration processing is not displayed on the display unit 5.

While the 3D model generation unit 191 executes the 3D reconfiguration processing, the recording unit 188 records the image that meets the selection condition on the recording medium in Step S108. While the 3D model generation unit 191 executes the 3D reconfiguration processing, the control unit 180 determines that the 3D reconfiguration processing is under way in Step S212. Therefore, new 3D reconfiguration processing using an image that meets the selection condition described above is not started.

After the 3D model generation unit 191 completes the 3D reconfiguration processing, the control unit 180 determines that the 3D reconfiguration processing is completed in Step S201. Therefore, the display control unit 184 displays a 3D model on the display unit 5 in Step S202. The displayed 3D model continues to be displayed until a next 3D model is completed. After the 3D model generation unit 191 completes the 3D reconfiguration processing, the control unit 180 determines that the 3D reconfiguration processing is not under way in Step S212. The 3D model generation unit 191 starts new 3D reconfiguration processing in Step S205. At this time, the 3D model generation unit 191 uses an image in the order in which the image is recorded on the recording medium in Step S108, in other words, the order in which the image is displayed in Step S211.

Figure 33:
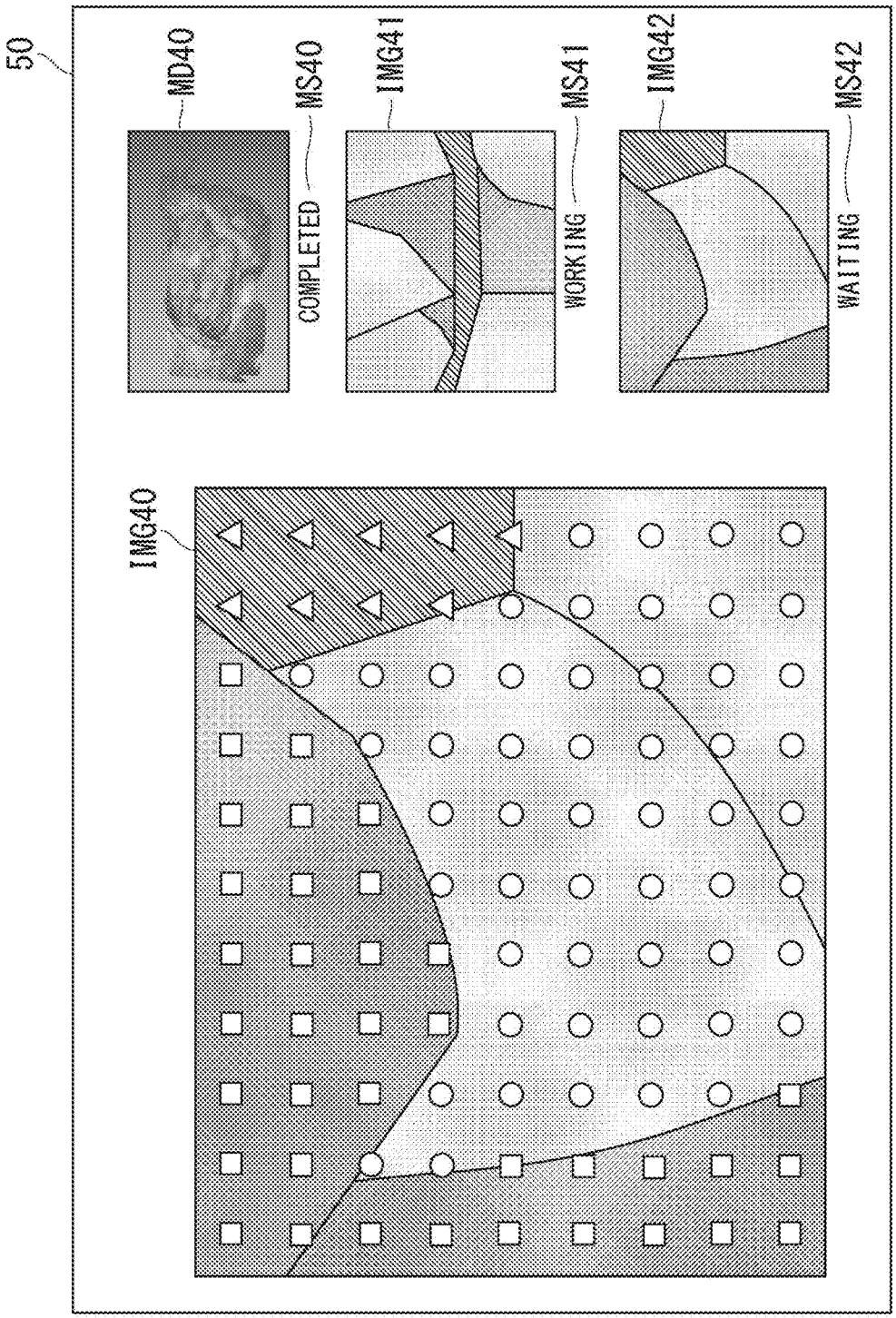
FIG. 33 is a diagram showing an example of an image displayed on a display unit in the sixth embodiment of the present invention.

FIG. 33 shows an example of an image displayed on the display unit 5 in Step S202 and Step S211. The display control unit 184 displays an image IMG40 on the display screen 50. The image IMG40 is a 2D image of a subject. The image IMG40 is an image on which the distance information is superimposed as with the image IMG10 shown in FIG. 9.

The display control unit 184 displays a 3D model MD40 on the display screen 50. In addition, the display control unit 184 displays an image IMG41 and an image IMG42 recorded on the recording medium in Step S108 on the display screen 50. The display control unit 184 displays a message MS40, a message MS41, and a message MS42 on the display screen 50. The message MS40 indicates that the 3D reconfiguration processing of generating the 3D model MD40 is completed. The message MS41 indicates that the endoscope device 1 is executing the 3D reconfiguration processing using the image IMG41. The message MS42 indicates that the endoscope device 1 is waiting for the start of the 3D reconfiguration processing using the image IMG42.

Figure 34:
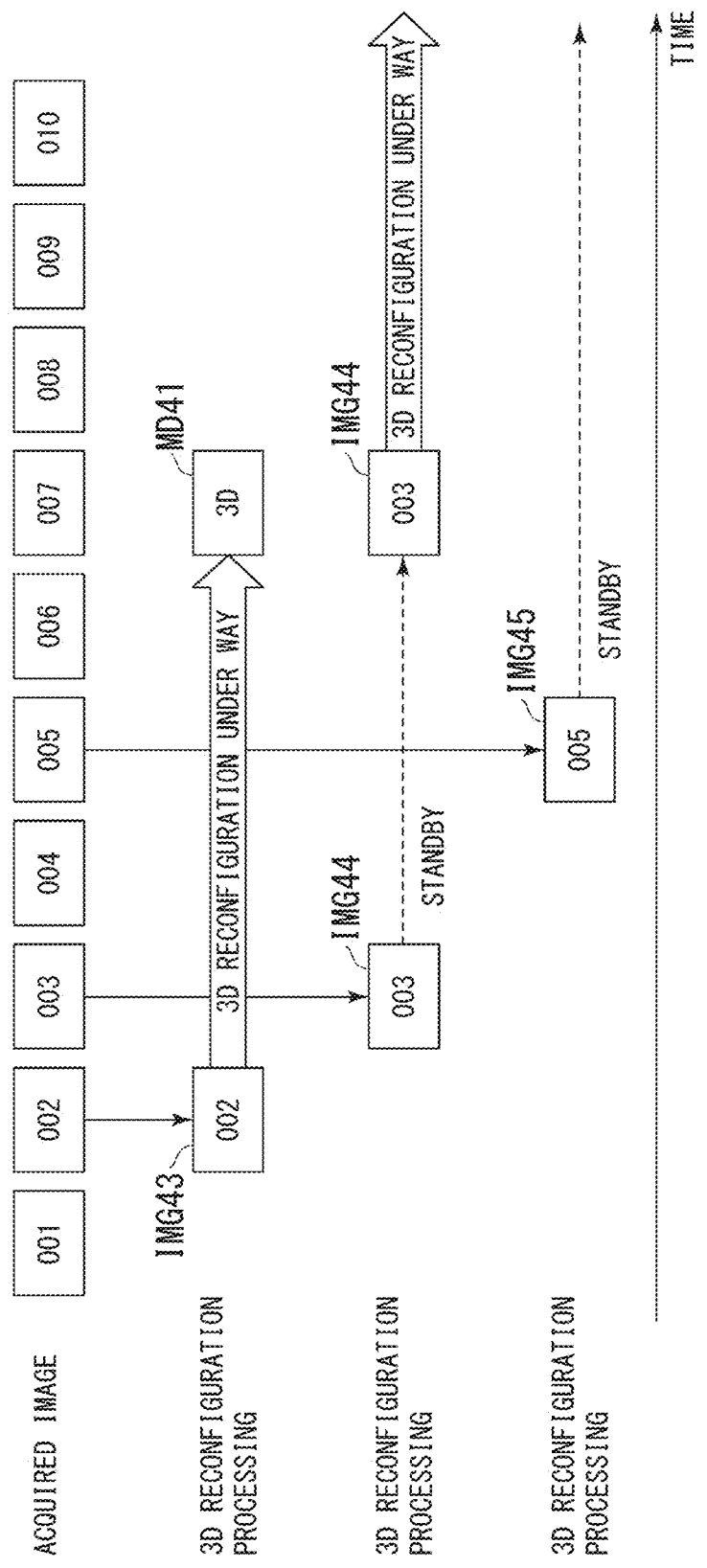
FIG. 34 is a diagram showing a situation in which 3D reconfiguration processing is executed in the sixth embodiment of the present invention.

FIG. 34 shows a situation in which the 3D reconfiguration processing is executed. The imaging device 28 sequentially acquires two or more images. The two or more images are shown. In the example shown in FIG. 34, ten images are shown. The right direction shown in FIG. 34 indicates time. The position of each image in FIG. 34 indicates a time point at which each image is acquired.

In the example shown in FIG. 34, an image IMG43 is recorded on a recording medium in Step S108. For example, the image IMG43 is a stereo image including two 2D images. The 3D model generation unit 191 executes the 3D reconfiguration processing by using the image IMG43.

While the 3D model generation unit 191 executes the 3D reconfiguration processing, the imaging device 28 sequentially acquires images. While the 3D model generation unit 191 executes the 3D reconfiguration processing, an image IMG44 and an image IMG45 are recorded on a recording medium. The image IMG44 and the image IMG45 meet the selection condition. While the 3D model generation unit 191 executes the 3D reconfiguration processing, the endoscope device 1 waits for the start of the 3D reconfiguration processing using the image IMG44. In addition, the endoscope device 1 waits for the start of the 3D reconfiguration processing using the image IMG45.

While the 3D model generation unit 191 executes the 3D reconfiguration processing, Step S104 is repetitively executed. The display control unit 184 displays an image on which the distance information is superimposed on the display unit 5 in Step S104. A user refers to the distance information and can change the composition of photography.

In the example shown in FIG. 34, the 3D model generation unit 191 generates a 3D model MD41 and completes the 3D reconfiguration processing. The display control unit 184 displays the 3D model MD41 on the display unit 5.

A user checks the 3D model MD41. If the user is not satisfied with the quality of the 3D model MD41, the user does not input the completion instruction into the endoscope device 1. After the 3D model generation unit 191 completes the 3D reconfiguration processing, the 3D model generation unit 191 executes the 3D reconfiguration processing by using the image IMG44. The endoscope device 1 waits for the start of the 3D reconfiguration processing using the image IMG45. While the 3D reconfiguration processing is executed, the user can change the composition of photography.

In the example shown in FIG. 34, the 3D model generation unit 191 executes the 3D reconfiguration processing in the order in which two or more images are selected, in other words, the order in which the two or more images are recorded on the recording medium. In the example shown in FIG. 34, the image IMG43, the image IMG44, and the image IMG45 are recorded on the recording medium in this order. The 3D model generation unit 191 executes the 3D reconfiguration processing using the image IMG43 first recorded on the recording medium. After the 3D reconfiguration processing using the image IMG43 is completed, the 3D model generation unit 191 executes the 3D reconfiguration processing using the image IMG44. After the 3D reconfiguration processing using the image IMG44 is completed, the 3D model generation unit 191 executes the 3D reconfiguration processing using the image IMG45.

Steps S111 to S113 shown in FIG. 10 may be executed instead of Step S106.

Steps S121 to S124 shown in FIG. 12 may be executed after Step S202 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 andStep S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

Each aspect of the present invention may include the following modified example. The display control unit 184 displays at least one image recorded on a recording medium on the display unit 5 in the image display step (Step S211).

In the sixth embodiment, the endoscope device 1 sequentially displays two or more 3D models of a subject. A user can determine the state of a subject by checking the two or more 3D models. In addition, the user can determine whether an appropriate 3D model is obtained. While the 3D reconfiguration processing is executed, the endoscope device 1 can record a suitable image for calculating 3D coordinates on a recording medium.

While the 3D reconfiguration processing is executed, a user checks an image used for the 3D reconfiguration processing of which the start is waited. In this way, the user can continue an inspection while confirming whether a suitable number of images for the inspection are acquired or predicting which image is used in next 3D reconfiguration processing.

First Modified Example of Sixth Embodiment

A first modified example of the sixth embodiment of the present invention will be described. The endoscope device 1 sequentially executes the 3D reconfiguration processing twice or more and sequentially generates two or more 3D models as in the sixth embodiment. The endoscope device 1 displays the two or more 3D models. When images of which the number is greater than the number of images used for the 3D reconfiguration processing are available, the endoscope device 1 selects an image used for the 3D reconfiguration processing. The endoscope device 1 executes the 3D reconfiguration processing by using the selected image. The endoscope device 1 includes the CPU 18c shown in FIG. 26.

The 3D model generation unit 191 generates a 3D model of a subject as in the fifth embodiment (shape calculation step). The display control unit 184 displays the 3D model on the display unit 5 as in the fifth embodiment (shape display step). The display control unit 184 displays the image used for generating the 3D model on the display unit 5 as in the sixth embodiment (image display step). Before the 3D reconfiguration processing is executed, or when the 3D reconfiguration processing is executed, the display control unit 184 displays the image on the display unit 5.

The selection unit 187 selects one or more images of at least one image recorded on a recording medium (image selection step). At this time, the selection unit 187 determines the priority of images and selects an image in accordance with the priority. For example, the selection unit 187 determines the priority on the basis of the index calculated by the index calculation unit 182. The 3D model generation unit 191 executes the 3D reconfiguration processing by using the image selected by the selection unit 187.

Figure 35:
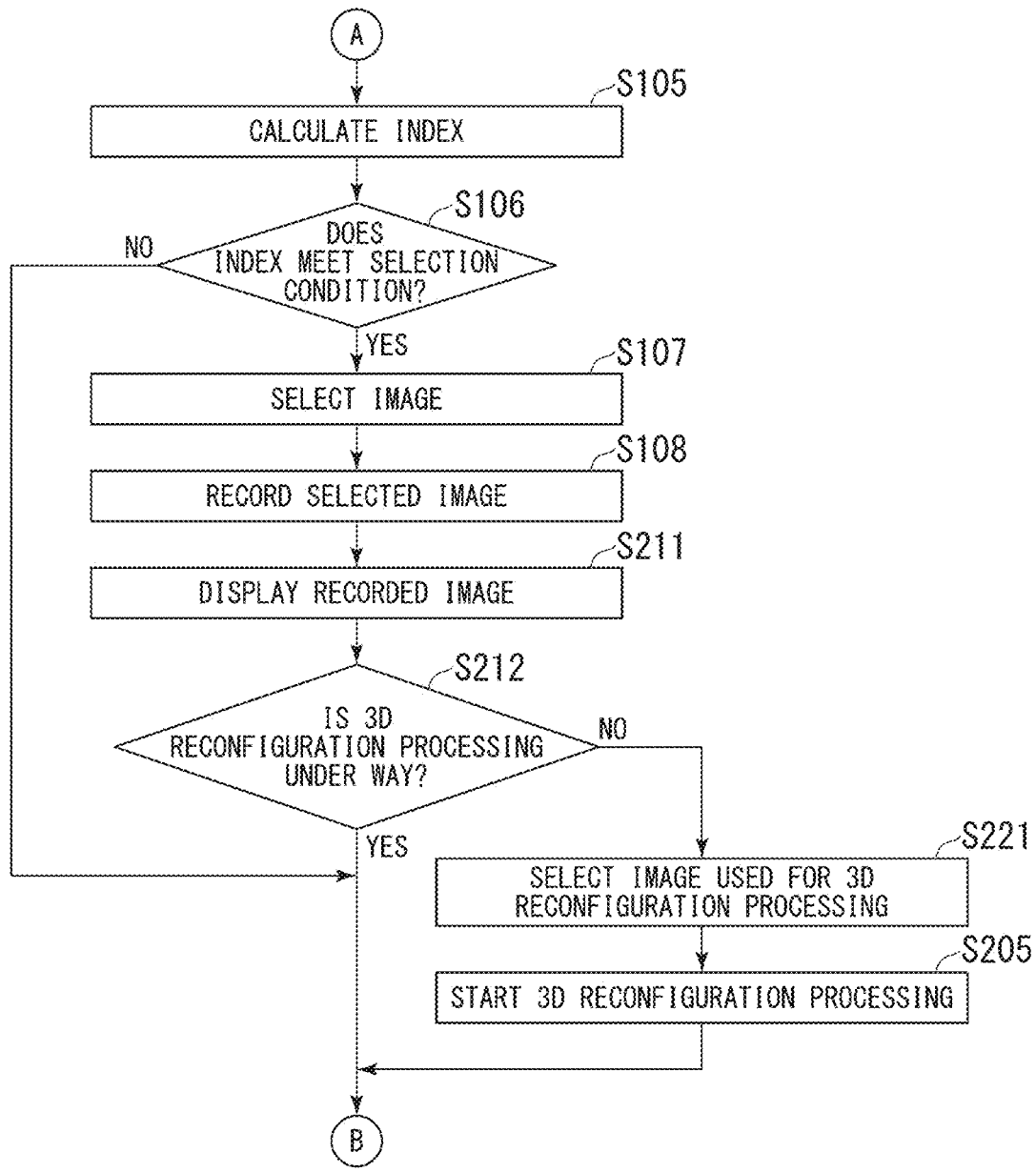
FIG. 35 is a flow chart showing a procedure of image processing in a first modified example of the sixth embodiment of the present invention.

Image processing in the first modified example of the sixth embodiment will be described by using FIG. 27 and FIG. 35. FIG. 27 and FIG. 35 show a procedure of the image processing. The processing shown in FIG. 27 is the same as that in the fifth embodiment. Therefore, the processing shown in FIG. 27 will not be described. In addition, the same processing as that shown in FIG. 32 will not be described.

When the control unit 180 determines that the 3D reconfiguration processing is not under way in Step S212, the selection unit 187 selects an image used for the 3D reconfiguration processing (Step S221). Step S221 corresponds to the image selection step. After Step S221, Step S205 is executed.

The selection unit 187 checks the number of images that have not been used for the 3D reconfiguration processing among at least one image recorded on the recording medium. When the number is one, the selection unit 187 selects one image that has not been used for the 3D reconfiguration processing. When the number is two or more, the selection unit 187 determines the priority of two or more images that have not been used for the 3D reconfiguration processing. The selection unit 187 selects one image in accordance with the priority. For example, the selection unit 187 selects an image associated with the best index among the two or more images. The 3D model generation unit 191 starts the 3D reconfiguration processing using the image selected by the selection unit 187.

Figure 36:
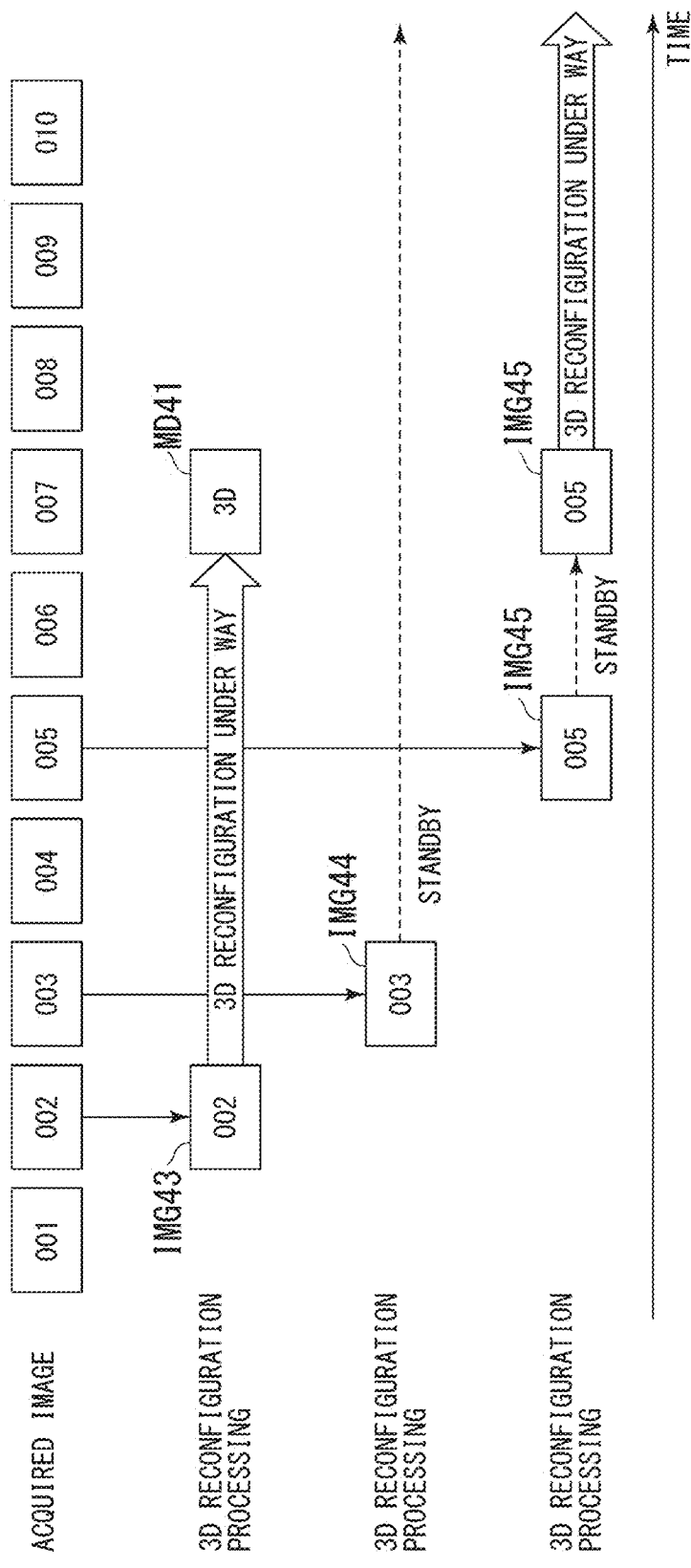
FIG. 36 is a diagram showing a situation in which 3D reconfiguration processing is executed in the first modified example of the sixth embodiment of the present invention.

FIG. 36 shows a situation in which the 3D reconfiguration processing is executed. The imaging device 28 sequentially acquires two or more images. The two or more images are shown in FIG. 36. In the example shown in FIG. 36, ten images are shown. The right direction shown in FIG. 36 indicates time. The position of each image in FIG. 36 indicates a time point at which each image is acquired.

In the example shown in FIG. 36, an image IMG43 is recorded on a recording medium in Step S108. For example, the image IMG43 is a stereo image including two 2D images. The 3D model generation unit 191 executes the 3D reconfiguration processing by using the image IMG43.

While the 3D model generation unit 191 executes the 3D reconfiguration processing, the imaging device 28 sequentially acquires images. While the 3D model generation unit 191 executes the 3D reconfiguration processing, an image IMG44 and an image IMG45 are recorded on a recording medium. The image IMG44 and the image IMG45 meet the selection condition. While the 3D model generation unit 191 executes the 3D reconfiguration processing, the endoscope device 1 waits for the start of the 3D reconfiguration processing using the image IMG44. In addition, the endoscope device 1 waits for the start of the 3D reconfiguration processing using the image IMG45.

In the example shown in FIG. 36, the 3D model generation unit 191 generates a 3D model MD41 and completes the 3D reconfiguration processing. The display control unit 184 displays the 3D model MD41 on the display unit 5.

When the 3D model generation unit 191 completes the 3D reconfiguration processing, the image IMG44 and the image IMG45 are already recorded on the recording medium. The image IMG44 and the image IMG45 have not been used for the 3D reconfiguration processing yet. For example, the index of the image IMG45 is better than that of the image IMG44. The selection unit 187 selects the image IMG45. The 3D model generation unit 191 executes the 3D reconfiguration processing by using the image IMG45. The endoscope device 1 waits for the start of the 3D reconfiguration processing using the image IMG44.

In the example shown in FIG. 36, when two or more images are recorded on the recording medium, the 3D model generation unit 191 executes the 3D reconfiguration processing in accordance with the priority of the two or more images. In the example shown in FIG. 36, the image IMG43, the image IMG44, and the image IMG45 are recorded on the recording medium in this order. The 3D model generation unit 191 executes the 3D reconfiguration processing using the image IMG43 first recorded on the recording medium. After the 3D reconfiguration processing using the image IMG43 is completed, the selection unit 187 determines the priority of the image IMG44 and the image IMG45 and selects the image IMG45. The 3D model generation unit 191 executes the 3D reconfiguration processing using the image IMG45.

The selection unit 187 may determine the priority of three or more images that have not been used for the 3D reconfiguration processing. The selection unit 187 may select two or more of the three or more images. The 3D model generation unit 191 may execute the 3D reconfiguration processing by using the two or more images selected by the selection unit 187.

Steps S111 to S113 shown in FIG. 10 may be executed instead of Step S106.

Steps S121 to S124 shown in FIG. 12 may be executed after Step S202 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 and Step S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

Each aspect of the present invention may include the following modified example. The selection unit 187 selects one or more of at least one image recorded on a recording medium in the image selection step (Step S221). The 3D model generation unit 191 (shape calculation unit) calculates, in the shape calculation step (Step S205), a 3D shape of a subject by using one or more images selected in the image selection step.

In the first modified example of the sixth embodiment, the endoscope device 1 selects one or more images in accordance with the priority of at least one image recorded on a recording medium. The endoscope device 1 executes the 3D reconfiguration processing by using the selected one or more images. The endoscope device 1 can execute the 3D reconfiguration processing by preferentially using an image having relatively high quality.

Second Modified Example of Sixth Embodiment

A second modified example of the sixth embodiment of the present invention will be described. The endoscope device 1 sequentially executes the 3D reconfiguration processing twice or more and sequentially generates two or more 3D models as in the sixth embodiment. The endoscope device 1 displays the two or more 3D models. When images of which the number is greater than the number of images used for the 3D reconfiguration processing are available, the endoscope device 1 accepts an instruction to select an image from a user. The endoscope device 1 selects an image on the basis of the instruction. The endoscope device 1 executes the 3D reconfiguration processing by using the selected image. The endoscope device 1 includes the CPU 18c shown in FIG. 26.

Figure 37:
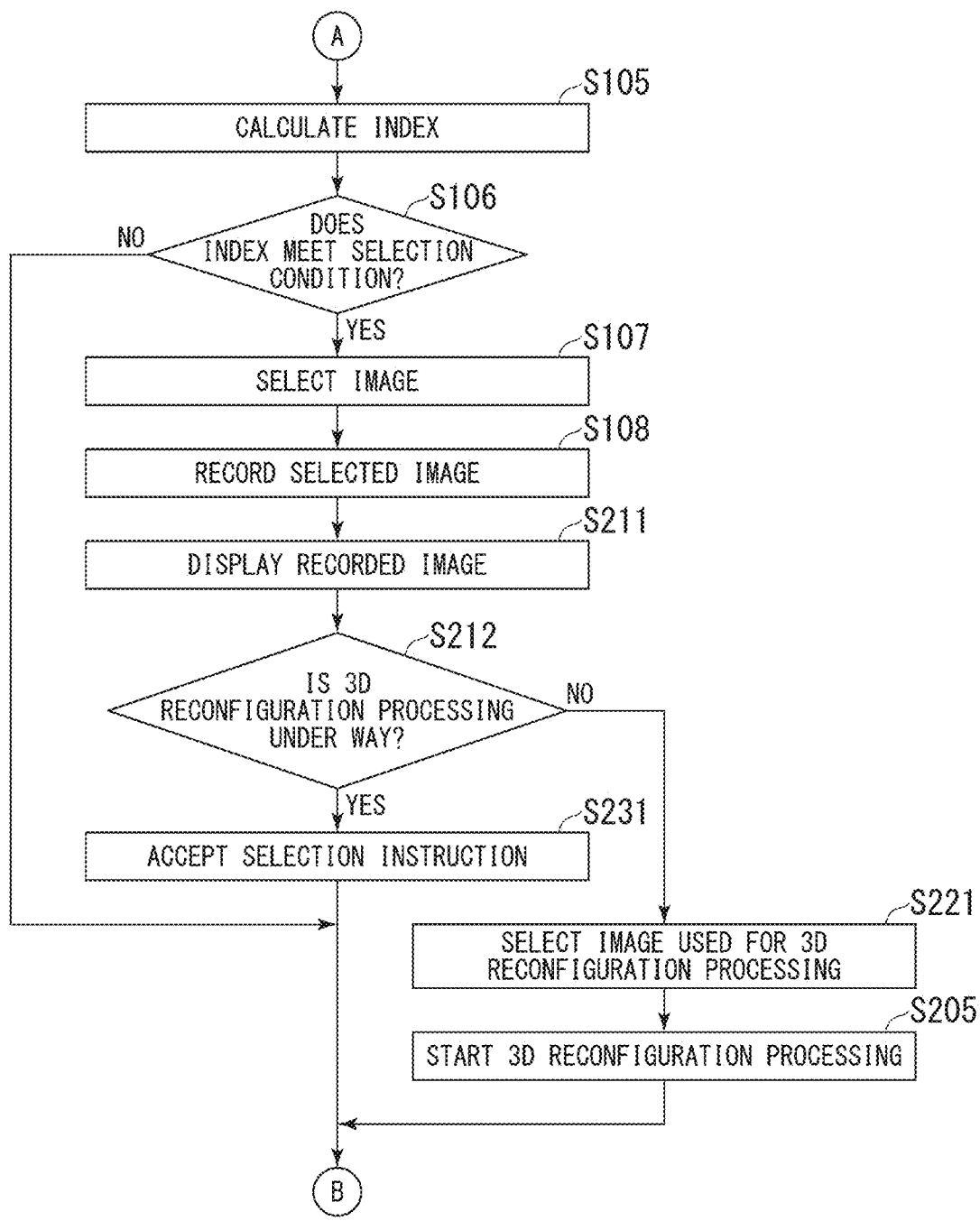
FIG. 37 is a flow chart showing a procedure of image processing in a second modified example of the sixth embodiment of the present invention.

Image processing in the second modified example of the sixth embodiment will be described by using FIG. 27 and FIG. 37. FIG. 27 and FIG. 37 show a procedure of the image processing. The processing shown in FIG. 27 is the same as that in the fifth embodiment. Therefore, the processing shown in FIG. 27 will not be described. In addition, the same processing as that shown in FIG. 35 will not be described.

When the control unit 180 determines that the 3D reconfiguration processing is under way in Step S212, the display control unit 184 displays a message instructing a user to select an image used for the 3D reconfiguration processing on the display unit 5. This processing is not shown in FIG. 37. The user inputs a selection instruction for selecting an image into the endoscope device 1 by operating the operation unit 4. The information acceptance unit 185 accepts the selection instruction (Step S231). The selection instruction indicates any one of one or more images displayed on the display unit 5. After Step S231, Step S101 is executed.

Figure 38:
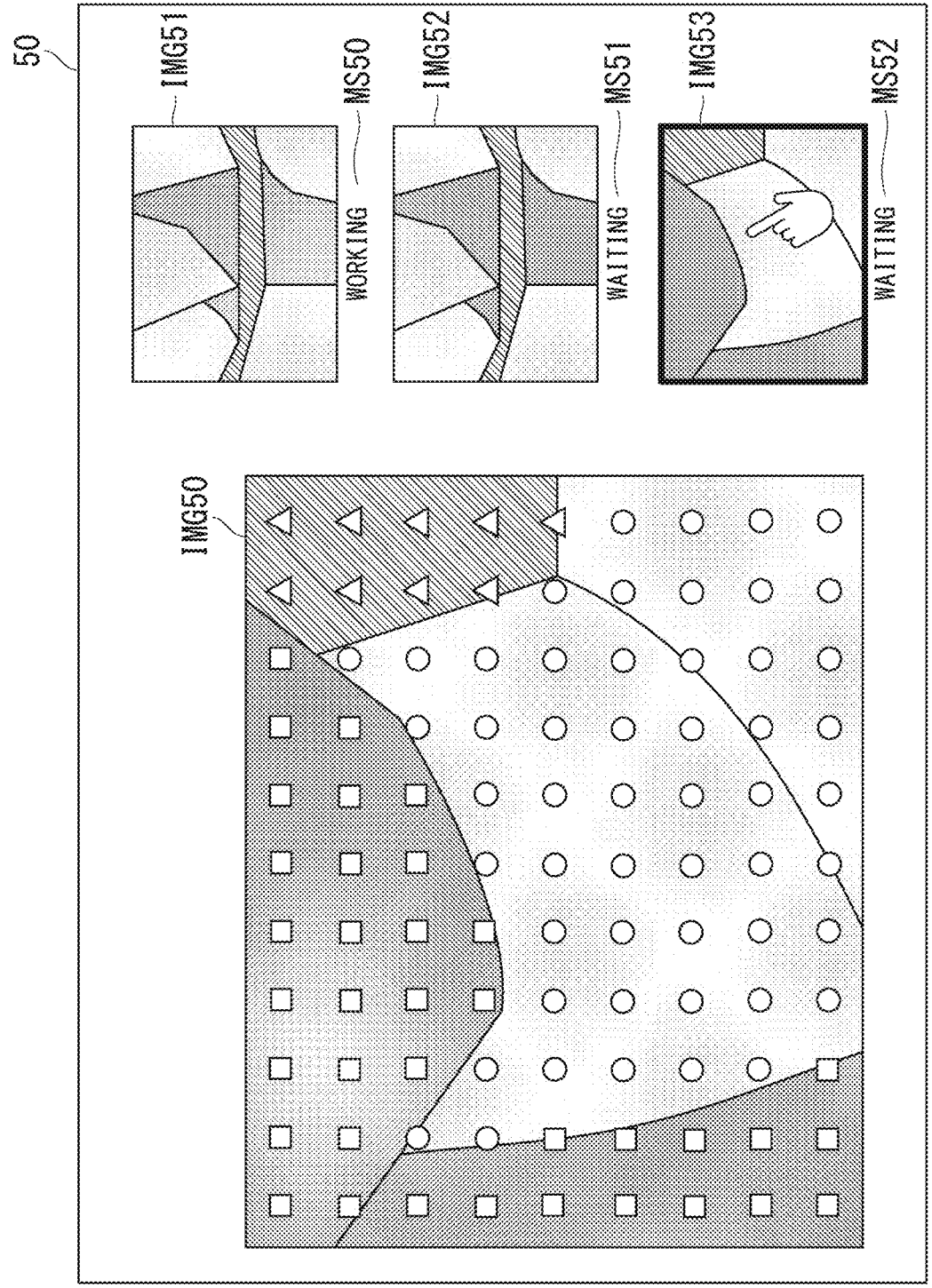
FIG. 38 is a diagram showing an example of an image displayed on a display unit in the second modified example of the sixth embodiment of the present invention.

FIG. 38 shows an example of an image displayed on the display unit 5 in Step S202 and Step S211. The display control unit 184 displays an image IMG50 on the display screen 50. The image IMG50 is a 2D image of a subject. The image IMG50 is an image on which the distance information is superimposed as with the image IMG10 shown in FIG. 9.

The display control unit 184 displays an image IMG51, an image IMG52, and an image IMG53 recorded on the recording medium in Step S108 on the display screen 50. The display control unit 184 displays a message MS50, a message MS51, and a message MS52 on the display screen 50. The message MS50 indicates that the endoscope device 1 is executing the 3D reconfiguration processing using the image IMG51. The message MS51 indicates that the endoscope device 1 is waiting for the start of the 3D reconfiguration processing using the image IMG52. The message MS52 indicates that the endoscope device 1 is waiting for the start of the 3D reconfiguration processing using the image IMG53.

A user confirms that the 3D reconfiguration processing using the image IMG52 or the image IMG53 has not started yet. The user checks the image IMG52 and the image IMG53 and selects one of the image IMG52 and the image IMG53. In the example shown in FIG. 38, the user selects the image IMG53. At this time, the user operates the operation unit 4 and inputs a selection instruction into the endoscope device 1. The information acceptance unit 185 accepts the selection instruction indicating the image IMG53.

The display control unit 184 displays information indicating that the image IMG53 is selected on the display screen 50. In the example shown in FIG. 38, the display control unit 184 displays a box surrounding the image IMG53. A use can confirm that the image IMG53 is used in next 3D reconfiguration processing.

The selection unit 187 executes the following processing in Step S221. The selection unit 187 determines whether Step S231 has been executed. When Step S231 has not been executed, the selection unit 187 selects one image by using similar method to that in the first modified example of the sixth embodiment. When Step S231 has been executed, the selection unit 187 selects one image indicated by the selection instruction accepted in Step S231.

A user may input a selection instruction for selecting two or more of three or more images that have not been used for the 3D reconfiguration processing into the endoscope device 1. The selection unit 187 may select the two or more images indicated by the selection instruction. The 3D model generation unit 191 may execute the 3D reconfiguration processing by using the two or more images selected by the selection unit 187.

When the information acceptance unit 185 accepts the selection instruction, the 3D model generation unit 191 may stop the 3D reconfiguration processing that is under way. A 3D model is not generated in the stopped 3D reconfiguration processing. Thereafter, the selection unit 187 may select one or more images indicated by the selection instruction, and the 3D model generation unit 191 may execute the 3D reconfiguration processing by using the one or more images.

Steps S111 to S113 shown in FIG. 10 may be executed instead of Step S106.

Steps S121 to S124 shown in FIG. 12 may be executed after Step S202 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 and Step S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

In the second modified example of the sixth embodiment, the endoscope device 1 selects one or more images among at least one image recorded on a recording medium. At this time, the endoscope device 1 selects one or more images indicated by a selection instruction. The endoscope device 1 executes the 3D reconfiguration processing by using the selected one or more images. The endoscope device 1 can execute the 3D reconfiguration processing by preferentially using an image designated by a user.

Third Modified Example of Sixth Embodiment

A third modified example of the sixth embodiment of the present invention will be described. The endoscope device 1 acquires two or more images in two or more different states. The positions of the camera are different from each other between the two or more states, and the postures of the camera are different from each other between the two or more states. The endoscope device 1 generates a three-dimensional map (3D map) indicating a 3D shape of a subject by using the two or more images. The endoscope device 1 displays the generated 3D map.

Figure 39:
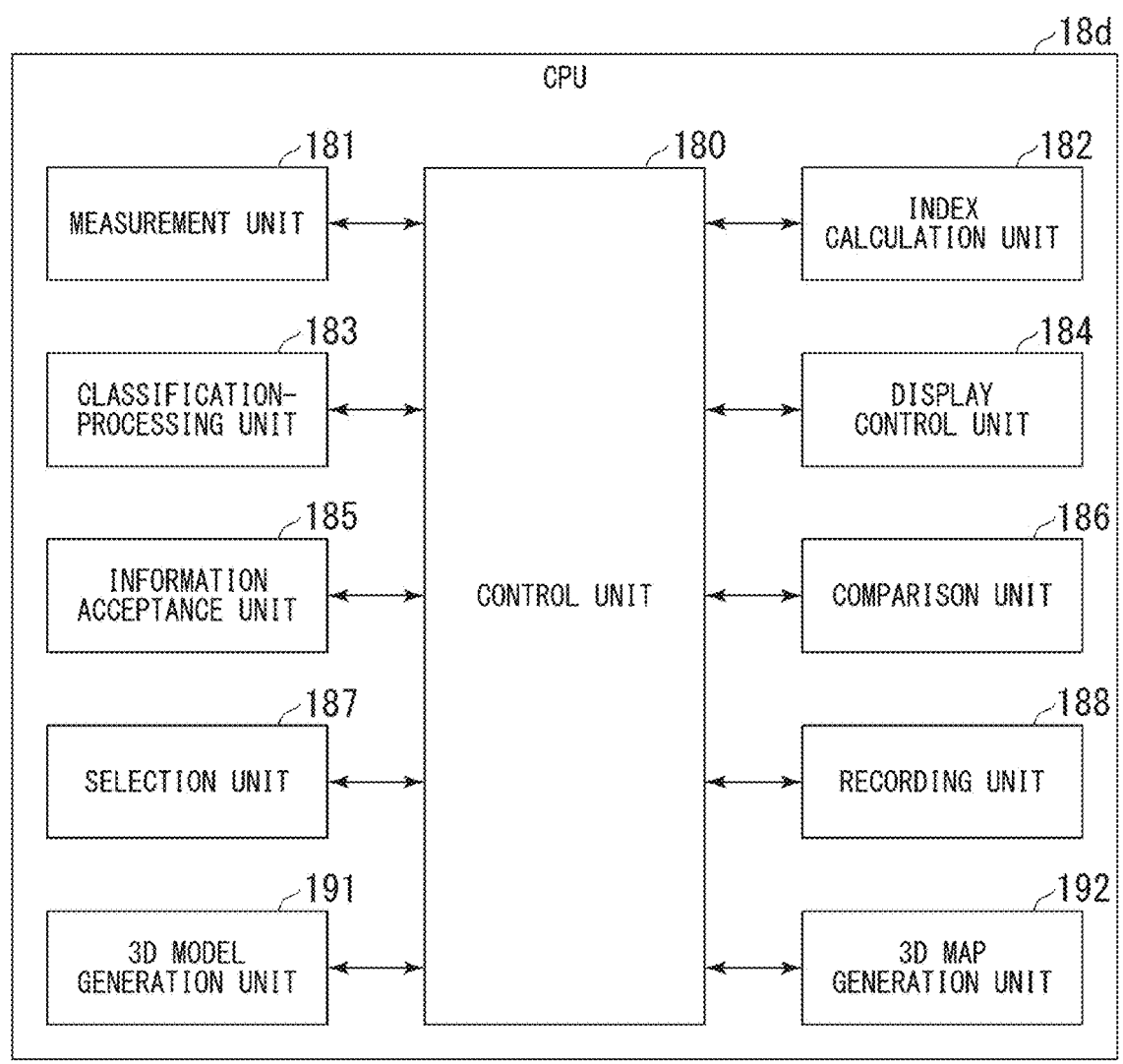
FIG. 39 is a block diagram showing a functional configuration of a CPU included in an endoscope device according to a third modified example of the sixth embodiment of the present invention.

The CPU 18c shown in FIG. 26 is changed to a CPU 18d shown in FIG. 39. FIG. 39 shows a functional configuration of the CPU 18d. The CPU 18d has functional units including a control unit 180, a measurement unit 181, an index calculation unit 182, a classification-processing unit 183, a display control unit 184, an information acceptance unit 185, a comparison unit 186, a selection unit 187, a recording unit 188, a 3D model generation unit 191, and a 3D map generation unit 192. At least one of the blocks shown in FIG. 39 may be constituted by a different circuit from the CPU 18d. The same configuration as that shown in FIG. 26 will not be described.

Each unit shown in FIG. 39 may be constituted by at least one of a processor and a logic circuit. Each unit shown in FIG. 39 may include one or a plurality of processors. Each unit shown in FIG. 39 may include one or a plurality of logic circuits.

The 3D map generation unit 192 calculates 3D coordinates of two or more points on a subject by using two or more images acquired by the imaging device 28. At this time, the 3D map generation unit 192 calculates two or more relative positions of the camera and two or more relative postures of the camera. Each of the positions indicates the position of the camera when the imaging device 28 acquires each of the images. Each of the postures indicates the posture of the camera when the imaging device 28 acquires each of the images. The 3D map generation unit 192 generates a 3D map including the 3D coordinates of the two or more points. For example, the 3D map generation unit 192 generates a 3D map by using a technique called simultaneous localization and mapping (SLAM) or structure from motion (SfM).

For example, the 3D map is constituted by point cloud data, surface data, or volume data. The 3D map generated by the 3D map generation unit 192 is stored on a recording medium in the PC 41 or on the memory card 42.

The 3D map includes the 3D coordinates of the two or more points. The 3D map may include 3D coordinates of three or more points. The 3D map includes an X-coordinate, a Y-coordinate, and a Z-coordinate of each point. For example, the X-axis and the Y-axis are perpendicular to the optical axis of the optical system of the camera that acquires two or more images. For example, the Z-axis is parallel to the optical axis.

The 3D model generation unit 191 generates a 3D model corresponding to a first region of a subject. The 3D map generation unit 192 generates a 3D map corresponding to a second region of the subject. For example, the second region is larger than the first region. At least part of the first region and at least part of the second region may overlap each other.

The display control unit 184 displays the 3D map on the display unit 5. In this way, the display control unit 184 displays position information indicating two or more positions on the subject on the display unit 5 (position-information display step).

Figure 40:
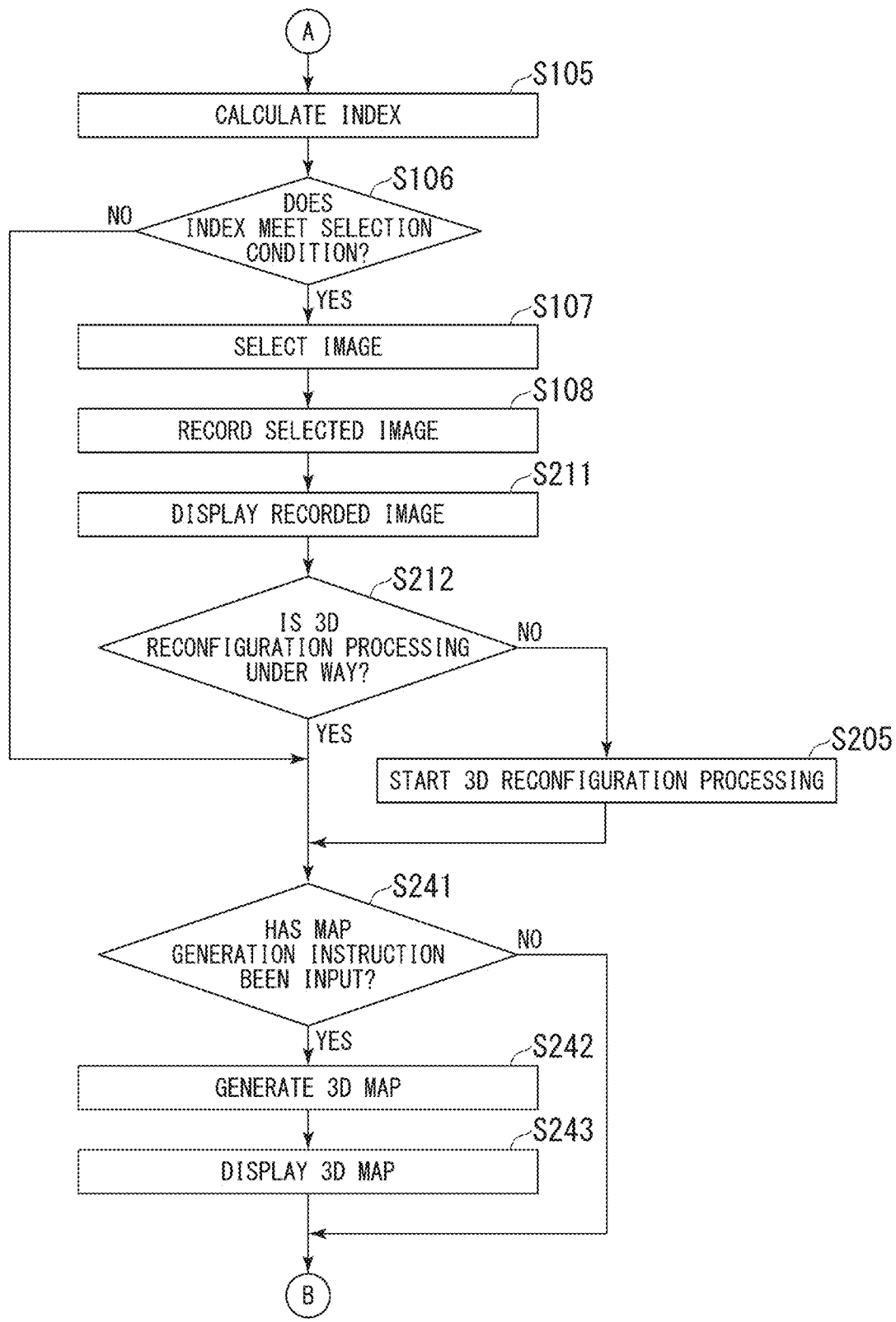
FIG. 40 is a flow chart showing a procedure of image processing in the third modified example of the sixth embodiment of the present invention.

Image processing in the third modified example of the sixth embodiment will be described by using FIG. 27 and FIG. 40. FIG. 27 and FIG. 40 show a procedure of the image processing. The processing shown in FIG. 27 is the same as that in the fifth embodiment. Therefore, the processing shown in FIG. 27 will not be described. In addition, the same processing as that shown in FIG. 32 will not be described.

When Step S101 is executed, the recording unit 188 records the image acquired in Step S101 on a recording medium. Therefore, two or more consecutive images are recorded on the recording medium.

The display control unit 184 displays a 3D model on the display unit 5 in Step S202. There is a case in which a user intends to acquire an image again by using the same composition as that of an image used for generating the 3D model. In such a case, the user inputs a generation instruction for generating a 3D map into the endoscope device 1.

After Step S205, the control unit 180 determines whether the generation instruction has been input into the endoscope device 1 (Step S241). For example, a user inputs the generation instruction into the endoscope device 1 by operating the operation unit 4. The information acceptance unit 185 accepts the generation instruction. At this time, the control unit 180 determines that the generation instruction has been input into the endoscope device 1.

When the comparison unit 186 determines that the index calculated by the index calculation unit 182 does not meet the selection condition in Step S106, or when the control unit 180 determines that the 3D reconfiguration processing is under way in Step S212, Step S241 is executed.

When the control unit 180 determines that the generation instruction has not been input into the endoscope device 1 in Step S241, Step S101 is executed. When the control unit 180 determines that the generation instruction has been input into the endoscope device 1 in Step S241, the 3D map generation unit 192 generates a 3D map by using the two or more images recorded on the recording medium in Step S101. For example, the 3D map generation unit 192 generates a 3D map by using all the images recorded in Step S101 (Step S242).

Each of the two or more images used for generating a 3D map does not necessarily meet the selection condition described above. In other words, each of the two or more images is not necessarily the same as the image recorded on the recording medium in Step S108.

After Step S242, the display control unit 184 displays the 3D map generated in Step S242 on the display unit 5 (Step S243). Step S243 corresponds to the position-information display step. After Step S243, Step S101 is executed.

When the generation instruction is input into the endoscope device 1, the 3D model generation unit 191 may stop the 3D reconfiguration processing that is under way. After the 3D map is generated, the 3D model generation unit 191 may start the 3D reconfiguration processing again.

FIG. 41 shows an example of an image displayed on the display unit 5 in Step S243. The display control unit 184 displays an image IMG40, a 3D model MD40, an image IMG41, and an image IMG42 on the display screen 50 as in the example shown in FIG. 33. The display control unit 184 displays a message MS40, a message MS41, and a message MS42 on the display screen 50 as in the example shown in FIG. 33.

The display control unit 184 displays a button BT60 on the display screen 50 in Step S104. The button BT60 is a button used for inputting the generation instruction. When a 3D map needs to be displayed, a user inputs the generation instruction into the endoscope device 1 by pressing the button BT60. At this time, the 3D map generation unit 192 generates a 3D map.

The display control unit 184 displays a 3D map MP60 on the display screen 50. The 3D map MP60 does not overlap the image IMG40. The display control unit 184 may display the image IMG40 and the 3D map MP60 on the display screen 50 such that part of the image IMG40 and part of the 3D map MP60 overlap each other.

The display control unit 184 displays information indicating the position and the posture of the camera on the 3D map MP60. The camera is configured to acquire an image used for generating the 3D model MD40.

The display control unit 184 may acquire time information attached to two or more images used for generating the 3D map MP60. The display control unit 184 may identify the image acquired last among the two or more images on the basis of the time information. The display control unit 184 may display information indicating the position and the posture of the camera that acquires the identified image on the 3D map MP60. The identified image is acquired at a time point close to the time point at which the image IMG40 currently displayed on the display unit 5 is acquired.

A user can check a region of a subject currently captured by the camera by checking the 3D map MP60. The user can refer to the 3D map MP60 in order to restore the composition of photography to that previously used for acquiring an image.

The endoscope device 1 may include a rotary encoder and two rollers. The two rollers are disposed so as to locate the insertion unit 2 therebetween. The two rollers are in contact with the insertion unit 2. The two rollers rotate as the insertion unit 2 moves. The rotary encoder determines the amount of rotation of at least one of the two rollers, thus determining the length (distance) of the insertion unit 2 inserted into a space in an inspection target. The length corresponds to an imaging position.

The display control unit 184 may display information indicating the relationship between the imaging position and an image acquired at the imaging position on the display unit 5. A user may refer to the information in order to restore the composition of photography to that previously used for acquiring an image. The display control unit 184 may display the latest information or previous information.

When the insertion unit 2 is inserted into a space in an inspection target, a user inputs a bending instruction for bending the insertion unit 2 into the endoscope device 1 by operating the operation unit 4. The information acceptance unit 185 accepts the bending instruction. The bending instruction indicates a direction (bending direction) in which the insertion unit 2 bends and indicates the amount (bending amount) by which the insertion unit 2 bends. The control unit 180 executes control for bending the insertion unit 2 in the bending direction indicated by the bending amount.

The display control unit 184 may display information related to the bending amount on the display unit 5. A user may refer to the information in order to restore the composition of photography to that previously used for acquiring an image.

Steps S111 to S113 shown in FIG. 10 may be executed instead of Step S106.

Steps S121 to S124 shown in FIG. 12 may be executed after Step S202 is executed.

Step S131 shown in FIG. 13 may be executed instead of Step S101.

Step S141 and Step S142 shown in FIG. 15 may be executed between Step S101 and Step S102.

Steps S151 to S154 shown in FIG. 18 may be executed between Step S101 and Step S102.

Step S151, Step S161, Step S162, and Step S154 shown in FIG. 20 may be executed between Step S101 and Step S102.

Step S151, Step S171, Step S172, and Step S154 shown in FIG. 22 may be executed between Step S101 and Step S102.

When the control unit 180 determines that the 3D reconfiguration processing is not under way in Step S212, Step S221 shown in FIG. 35 may be executed. Step S205 may be executed after Step S221 is executed. When the control unit 180 determines that the 3D reconfiguration processing is under way in Step S212, Step S231 shown in FIG. 37 may be executed. Steps S241 to S243 may be executed after Step S231 is executed.

Steps S241 to S243 may be executed in the image processing shown in FIG. 8, FIG. 10, FIG. 13, FIG. 15, FIG. 18, FIG. 20, or FIG. 22. For example, Steps S241 to S243 may be executed after Step S108 is executed.

Steps S241 to S243 may be executed in the image processing shown in FIG. 12. For example, Steps S241 to S243 may be executed after Step S124 is executed.

Steps S241 to S243 may be executed in the image processing shown in FIG. 24. For example, Steps S241 to S243 may be executed after Step S182 is executed.

Steps S241 to S243 may be executed in the image processing shown in FIG. 25. For example, Steps S241 to S243 may be executed after Step S197 is executed.

Steps S241 to S243 may be executed in the image processing shown in FIG. 28. For example, Steps S241 to S243 may be executed after Step S205 is executed.

Each aspect of the present invention may include the following modified example. The display control unit 184 displays position information indicating two or more positions on a subject on the display unit 5 in the position-information display step (Step S243).

In the third modified example of the sixth embodiment, the endoscope device 1 generates and displays a 3D map. A user may refer to the 3D map in order to restore the composition of photography to that previously used for acquiring an image. When the user checks a 3D model and determines that an appropriate 3D model is not obtained, the user checks a position at which an image used for generating the 3D model is acquired on the 3D map. The user can return an endoscope to the position and can perform work again.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image-processing method performed by a processor, the image-processing method comprising:
    measuring a distance at each of two or more points in one or more images of a subject,
        wherein the distance indicates a three-dimensional distance from a camera that acquires the one or more images to each of the two or more points;
    calculating a first index or a second index on the basis of the distance,
        wherein the first index increases as the camera nears the subject, and
        wherein the second index decreases as the camera nears the subject;
    comparing the first index or the second index with a threshold value; and
    selecting at least one image included in the one or more images when the first index is greater than the threshold value or the second index is less than the threshold value,
        wherein the at least one image is an image used for calculating the first index greater than the threshold value or calculating the second index less than the threshold value,
    wherein the measuring, the calculating and the comparing are executed for a first image included in the one or more images, and
    wherein the measuring, the calculating and the comparing are executed for a second image, included in the one or more images and different from the first image, when the first index is less than or equal to the threshold value or the second index is greater than or equal to the threshold value.

2. The image-processing method according to claim 1, further comprising controlling a display to display distance information,
    wherein the distance information indicates the distance at the each of the two or more points.

3. The image-processing method according to claim 2,
    wherein controlling the display to display the distance information comprises controlling the display to display the one or more images on which the distance information is superimposed.

4. The image-processing method according to claim 1, further comprising:
    classifying the distance at the each of the two or more points into two or more groups including a first group and a second group,
        wherein a range of the distance classified into the first group is different from a range of the distance classified into the second group; and
    controlling a display to display first distance information in a first state and to display second distance information in a second state different from the first state,
        wherein the first distance information indicates the distance classified into the first group, and
        wherein the second distance information indicates the distance classified into the second group.

5. The image-processing method according to claim 1, further comprising recording the at least one image on a recording medium.

6. The image-processing method according to claim 5, further comprising calculating a three-dimensional shape of the subject by using the at least one image recorded on the recording medium.

7. The image-processing method according to claim 6, further comprising controlling a display to display the three-dimensional shape.

8. The image-processing method according to claim 6, further comprising controlling a display to display the at least one image.

9. The image-processing method according to claim 6, further comprising selecting one or more images of the at least one image,
    wherein calculating the three-dimensional shape comprises calculating the three-dimensional shape by using the one or more images selected.

10. The image-processing method according to claim 1, further comprising setting a measurement region in the one or more images,
    wherein the measurement region includes the two or more points.

11. The image-processing method according to claim 10, further comprising controlling a display to display each of the one or more images and to display the measurement region on each of the one or more images.

12. The image-processing method according to claim 10,
    wherein setting the measurement region comprises setting the measurement region on the basis of region information input into an input device, and
    wherein the region information indicates a position of the measurement region in the one or more images.

13. The image-processing method according to claim 10, further comprising dividing an entire region of each of the one or more images into two or more partial regions,
    wherein setting the measurement region comprises setting the measurement region in at least one partial region included in the two or more partial regions.

14. The image-processing method according to claim 1,
    wherein calculating the first index or the second index comprises calculating the first index or the second index on the basis of the number of points at which the distance is less than a predetermined value among the two or more points, the number of points at which the distance is greater than a predetermined value among the two or more points, an average value of the distances at the two or more points, or a minimum value of the distances at the two or more points.

15. The image-processing method according to claim 1, further comprising controlling a display to display position information indicating two or more positions on the subject.

16. An image-processing method performed by a processor, the image-processing method comprising:
- measuring a distance at each of two or more points in one or more images of a subject,
  - wherein the distance indicates a three-dimensional distance from a camera that acquires the one or more images to each of the two or more points;
- calculating a first index or a second index on the basis of the distance,
  - wherein the first index increases as the camera nears the subject, and
  - wherein the second index decreases as the camera nears the subject;
- comparing the first index or the second index with a threshold value;
- outputting, to an information-reporting device, comparison information indicating a result of comparing the first index with the threshold value or a result of comparing the second index with the threshold value; and
- selecting at least one image included in the one or more images after outputting the comparison information,
  - wherein the at least one image is an image used for calculating the first index or the second index,
- wherein the measuring, the calculating and the comparing are executed for a first image included in the one or more images, and
- wherein the measuring, the calculating and the comparing are executed for a second image, included in the one or more images and different from the first image, when the first index is less than or equal to the threshold value or the second index is greater than or equal to the threshold value.

17. An image-processing device comprising:
- a processor comprising hardware, wherein the processor is configured to:
  - measure a distance at each of two or more points in one or more images of a subject,
    - wherein the distance indicates a three-dimensional distance from a camera that acquires the one or more images to each of the two or more points;
  - calculate a first index or a second index on the basis of the distance,
    - wherein the first index increases as the camera nears the subject, and
    - wherein the second index decreases as the camera nears the subject;
  - compare the first index or the second index with a threshold value; and
  - select at least one image included in the one or more images when the first index is greater than the threshold value or the second index is less than the threshold value,
    - wherein the at least one image is an image used for calculating the first index greater than the threshold value or calculating the second index less than the threshold value,
- wherein the measuring, the calculating and the comparing are executed for a first image included in the one or more images, and
- wherein the measuring, the calculating and the comparing are executed for a second image, included in the one or more images and different from the first image, when the first index is less than or equal to the threshold value or the second index is greater than or equal to the threshold value.

18. A non-transitory computer-readable recording medium storing a program that causes a computer to at least execute:
- measuring a distance at each of two or more points in one or more images of a subject,
  - wherein the distance indicates a three-dimensional distance from a camera that acquires the one or more images to each of the two or more points;
- calculating a first index or a second index on the basis of the distance,
  - wherein the first index increases as the camera nears the subject, and
  - wherein the second index decreases as the camera nears the subject;
- comparing the first index or the second index with a threshold value; and
- selecting at least one image included in the one or more images when the first index is greater than the threshold value or the second index is less than the threshold value,
  - wherein the at least one image is an image used for calculating the first index greater than the threshold value or calculating the second index less than the threshold value,
- wherein the measuring, the calculating and the comparing are executed for a first image included in the one or more images, and
- wherein the measuring, the calculating and the comparing are executed for a second image, included in the one or more images and different from the first image, when the first index is less than or equal to the threshold value or the second index is greater than or equal to the threshold value.

* * * * *